US011921315B2

(12) United States Patent
Yeo et al.

(10) Patent No.: US 11,921,315 B2
(45) Date of Patent: Mar. 5, 2024

(54) LIGHT FIXTURE AND LIGHT FIXTURE ASSEMBLIES WITH ELECTRICALLY CONTROLLED LIGHTING DISTRIBUTIONS FOR INSTALLED PANEL SYSTEMS

(71) Applicant: Fusion Optix, Inc., Woburn, MA (US)

(72) Inventors: Terence Yeo, Boston, MA (US); Michael Demas, Charlestown, MA (US); Timothy Kelly, Brookline, MA (US)

(73) Assignee: Fusion Optix, Inc., Woburn, MA (US)

( * ) Notice: Subject to any disclaimer, the term of this patent is extended or adjusted under 35 U.S.C. 154(b) by 118 days.

(21) Appl. No.: 17/741,770

(22) Filed: May 11, 2022

(65) Prior Publication Data

US 2022/0373144 A1 Nov. 24, 2022

Related U.S. Application Data

(63) Continuation-in-part of application No. 17/693,226, filed on Mar. 11, 2022, and a continuation-in-part of
(Continued)

(51) Int. Cl.
*F21V 8/00* (2006.01)
*F21S 4/28* (2016.01)
(Continued)

(52) U.S. Cl.
CPC ............. *G02B 6/0055* (2013.01); *F21S 4/28* (2016.01); *F21S 8/024* (2013.01); *F21S 8/026* (2013.01);
(Continued)

(58) Field of Classification Search
CPC ........ G02B 6/0055; F21S 8/026; F21S 8/024; F21S 4/28
See application file for complete search history.

(56) References Cited

U.S. PATENT DOCUMENTS 10,676,925 B2 6/2020 Baxter et al.
2014/0226327 A1 8/2014 Yaphe et al.

*Primary Examiner* — Karabi Guharay

(57) ABSTRACT

A light fixture delivering electrically controlled lighting distributions for mounting within an installed panel system typically used in ceiling and wall constructions and incorporating acoustic, drywall or wood panels. The light fixture can provide low-glare or wide spread "batwing" ambient light or more directional wall wash, task and accent lighting. The light fixture comprises one or more LED boards and an optical element which can be back-lit or edge-lit. The light fixture body is configurable, comprising a 3-dimensional extruded elongate body with its ends cut at a configured angle. The body typically comprises additional side support features that support and enclose the edge of installed panels. In the case of a T-bar based ceiling grid system the side support features may also replicate the function and appearance of T-bar horizontal and vertical portions. The body comprises features to retain and align LED boards, reflectors and a back-lit or edge-lit optical element. In the edge-lit configuration the optical element may also be a light guide. The edge-lit design also enables the height of the lighting assembly body to be equivalent to or less than the height of T-bar main beams or cross tees. This is very important in applications where there is zero or little available plenum space above the ceiling grid. Because the lighting assembly can also provide structural support within the installed panel system it can replace one or more T-bars and can also be used to connect one or more T-bars or other structural grid elements. The lighting fixture can be mounted at an oblique or diagonal angle to the typical square grid layouts, or in a corner of a ceiling grid T-bar cell at the intersection of one or more T-bars. Additionally, more than one elongate bodies can be connected to form square, crosses, curves or arcs or more complex shapes. The electrical power may additionally be configured to control lighting distributions of the fixtures independently of one another.

71 Claims, 42 Drawing Sheets

Related U.S. Application Data application No. 17/669,057, filed on Feb. 10, 2022, and a continuation-in-part of application No. 17/669,026, filed on Feb. 10, 2022, and a continuation-in-part of application No. 17/665,464, filed on Feb. 4, 2022, which is a continuation-in-part of application No. 17/591,579, filed on Feb. 2, 2022, said application No. 17/693,226 is a continuation-in-part of application No. 17/476,212, filed on Sep. 15, 2021, now Pat. No. 11,543,582, which is a continuation of application No. 17/107,941, filed on Nov. 30, 2020, now Pat. No. 11,163,104, said application No. 17/669,026 is a continuation-in-part of application No. 16/877,482, filed on May 18, 2020, now Pat. No. 11,396,751, said application No. 17/693,226 is a continuation-in-part of application No. 16/877,482, filed on May 18, 2020, now Pat. No. 11,396,751, said application No. 17/669,057 is a continuation-in-part of application No. 16/877,482, filed on May 18, 2020, now Pat. No. 11,396,751, said application No. 17/591,579 is a continuation-in-part of application No. 16/877,482, filed on May 18, 2020, now Pat. No. 11,396,751, which is a continuation-in-part of application No. 16/239,804, filed on Jan. 4, 2019, now abandoned, said application No. 17/107,941 is a continuation-in-part of application No. 16/039,320, filed on Jul. 18, 2018, now Pat. No. 10,852,466.

(60) Provisional application No. 63/225,590, filed on Jul. 26, 2021, provisional application No. 63/000,649, filed on Mar. 27, 2020, provisional application No. 63/000,718, filed on Mar. 27, 2020, provisional application No. 62/849,199, filed on May 17, 2019, provisional application No. 62/534,187, filed on Jul. 18, 2017.

(51) Int. Cl.
  *F21S 8/02* (2006.01)
  *F21V 7/00* (2006.01)
  *F21Y 105/00* (2016.01)
  *F21Y 115/10* (2016.01)

(52) U.S. Cl.
  CPC .......... *F21V 7/0016* (2013.01); *G02B 6/0036* (2013.01); *F21Y 2105/00* (2013.01); *F21Y 2115/10* (2016.08)

(i) Single Edge-lit with co-extruded reflective edge (ii) Double Edge-lit (iii) Flat Back-lit (iv) Back-lit with reflective legs (i) Diffuse Planar (No surface features)

(ii) Diffuse laser etched (iii) Diffuse prism (iv) Diffuse sawtooth (v) Diffuse layer (laminated)

(vi) Diffuse surface (coated)

(vii) Diffuse patterned

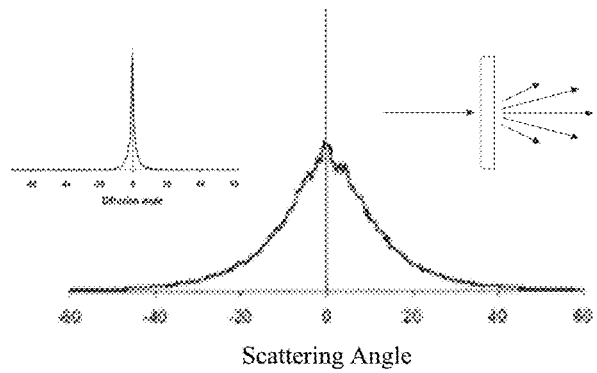

Scattering Angle

| Input Face | Scattering Type | Thickness (Height) | ASTM D1003 | | | Scattering (FWHM) | | Gloss (60%) | |
|---|---|---|---|---|---|---|---|---|---|
| | | | T% | H% | C% | TD | MD | Side A | Side B |
| Edge Lit | Clear Etched Light Guide | 4.5mm | 89.4 | 12.5 | 98.6 | 1° | 1° | 129.9 | 110.2 |
| Edge Lit | Edge-lit Signage Acrylic | 4.0mm | 92.6 | 4.1 | 99.8 | 1° | 1° | 139.7 | 140.5 |
| Edge Lit | Diffuse planar | 4.7mm | 90.6 | 97.1 | 9.1 | 10° | 16° | 62.4 | 63.5 |
| Edge Lit | Diffuse laser etched | 4.5mm | 92.8 | 94.5 | 3.7 | 20° | 18° | 85.7 | 64.3 |
| Edge Lit | Diffuse lenticular | 4.6mm | 86.9 | 92.3 | 23.6 | 25° | 2° | 86.5 | 11.9 |
| Edge Lit | Diffuse sawtooth | 4.4mm | 82.6 | 97.6 | 4.3 | 5° | 17° | 74.7 | 5.9 |
| Edge Lit | Diffuse sawtooth | 3.8mm | 91.7 | 84.9 | 13 | 5° | 17° | 78.5 | 5.9 |
| Edge Lit | Diffuse sawtooth | 4.8mm | 91.6 | 80.2 | 17.8 | 5° | 17° | 74.7 | 5.9 |
| Edge Lit | Diffuse layer (laminated) | 4.6mm | 91.5 | 86.3 | 15.2 | 11° | 10° | 88.4 | 55.6 |
| Edge Lit | Diffuse layer (laminated) | 4.6mm | 90.2 | 90.6 | 7.3 | 15° | 14° | 90.2 | 45.2 |
| Edge Lit | Diffuse layer (laminated) | 4.6mm | 92 | 94.1 | 3.9 | 30° | 30° | 87.6 | 34.5 |
| Edge Lit | Diffuse layer (laminated) | 4.6mm | 86.8 | 94.9 | 5.6 | 40° | 30° | 85.7 | 86.1 |
| Edge Lit | Diffuse surface (coated) | 4.5mm | 93 | 95.1 | 3.6 | 20° | 18° | 91.1 | 6.3 |
| Edge Lit | Diffuse surface (coated) | 4.5mm | 89.8 | 100 | 2.3 | 40° | 40° | 92.4 | 4.3 |
| Back Lit | (i) Wide Direct Batwing | 1.9 | 89.7 | 100 | 1.3 | 37° | 89° | | |
| Back Lit | (ii) Narrow Low Glare | 1.9 | 92.2 | 90.9 | 8.7 | 7° | 12° | | |
| Back Lit | (iii) Medium Diffuse | 1.5mm | 91.9 | 100 | 2.8 | 40° | 40° | 45.3 | 49.4 |
| Back Lit | (iv) Asymmetric Wall Wash | 1.9 | 92.4 | 100 | 15.8 | | | | |

FIG. 2E

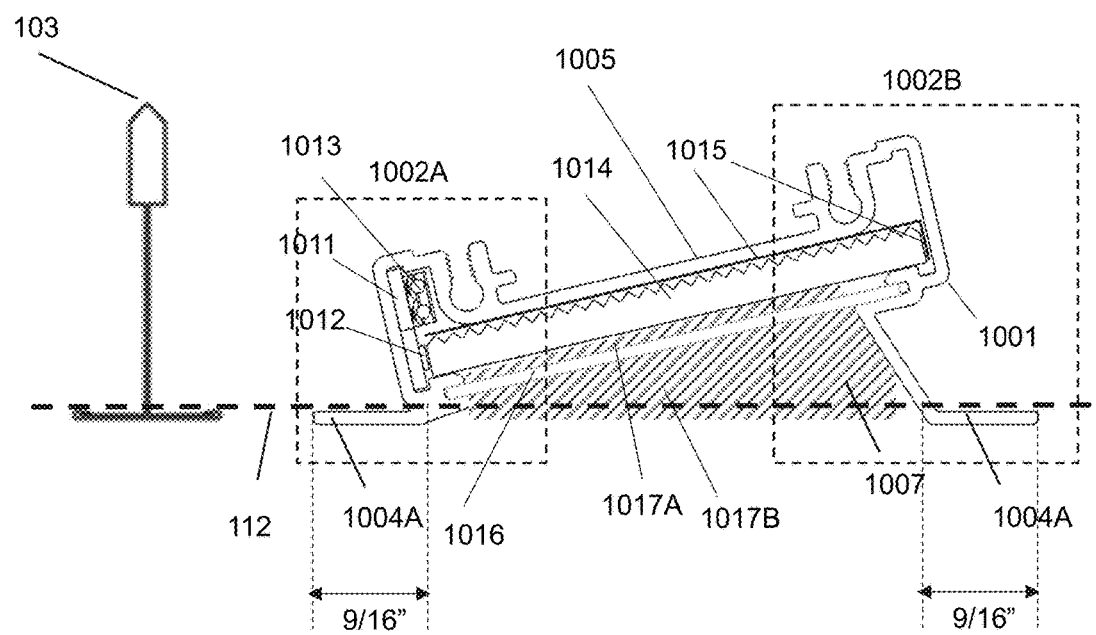
FIG. 10Ci
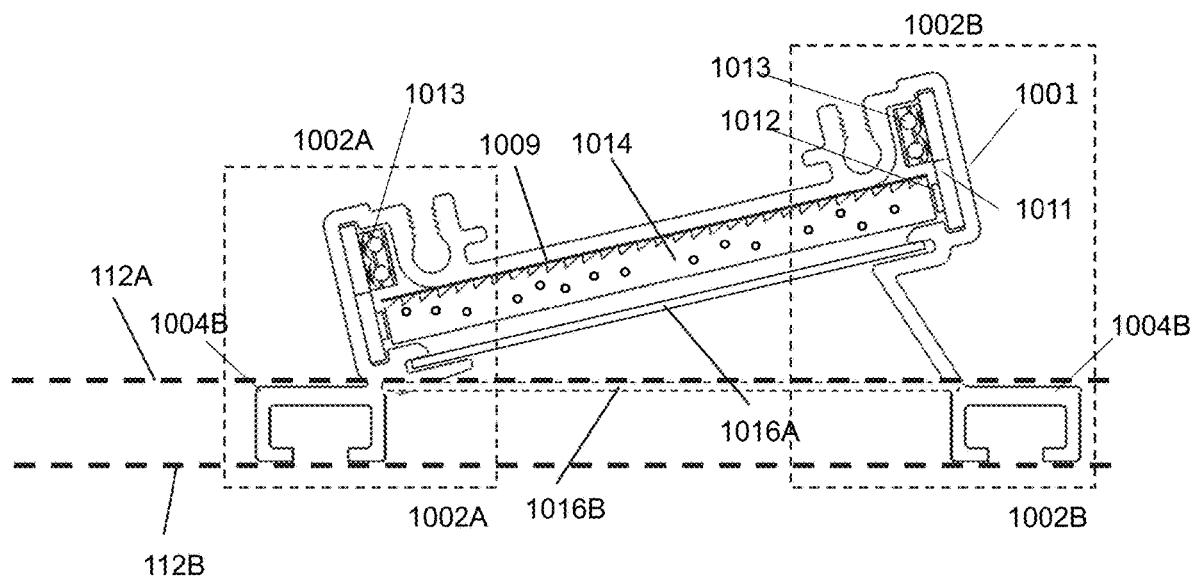
FIG. 10Cii

FIG. 14Bii

LIGHT FIXTURE AND LIGHT FIXTURE ASSEMBLIES WITH ELECTRICALLY CONTROLLED LIGHTING DISTRIBUTIONS FOR INSTALLED PANEL SYSTEMS

BACKGROUND

The present disclosure relates generally to light fixtures within installed panel systems, for example, suspended ceiling arrangements, drywall ceiling arrangement, and drywall wall arrangements. Suspended ceiling arrangements typically use "T"-bars to form T-bar cell arrays which are hung from corresponding structural ceilings. Drywall arrangements are typically mounted to studs or framing materials. In many cases the available height or depth available for a light fixture is limited. Typical light fixtures are not easily configurable and fit into installed lighting systems with limited mounting options. In general, light fixtures are typically finished assemblies that are not easily configurable for all desired functional lighting layouts and aesthetic appearance.

SUMMARY

Light fixtures are provided that are highly and easily configurable from a minimal collection of components having highly effective and efficient manufacturing processes. The light fixtures are configured for mounting in installed panel systems typically used in ceiling and wall constructions and typically incorporating acoustic, drywall or wood panels.

Various embodiment light fixtures can provide low-glare emitting surfaces, wide spread "batwing" ambient light distributions, and directional light distributions for wall wash, task lighting, and accent lighting applications. The light distribution of any individual light fixture is highly configurable by selecting the type of optical assembly with specific primary and auxiliary optical elements, the specific light scattering properties of specific optical elements, and the relative power applied to electrical circuit arrangements of LED light sources.

Embodiment light fixtures comprise one or more LED boards and an optical element which can be back-lit or edge-lit. The light fixture body is configurable, comprising a 3-dimensional extruded elongate housing body with its ends cut at a configured angle. The elongate housing body typically comprises additional side support features that support and enclose the edge of installed panels. In multiple illustrated embodiments these are integral to the elongate housing body, as in FIG. 2A and FIG. 2B but can also be attachable/detachable components as shown in FIG. 23. In the case of a T-bar based ceiling grid system the side support features may also replicate the function and appearance of T-bar horizontal and vertical portions. The elongate housing body typically comprises additional internal support features to retain and align LED boards, reflectors and a back-lit or edge-lit optical element. In the edge-lit configuration the optical element may also be a light guide. The edge-lit design also enables the height of the lighting assembly body to be equivalent to or less than the height of T-bar main beams or cross tees. This is very important in applications where there is zero or little available plenum space above the ceiling grid. Because the lighting assembly can also provide structural support within the installed panel system it can replace one or more T-bars and can also be used to connect one or more T-bars or other structural grid elements. The lighting fixture can be mounted at an oblique or diagonal angle to the typical square grid layouts, or in a corner of a ceiling grid T-bar cell at the intersection of one or more T-bars. Additionally, more than one elongate bodies can be connected to form square, crosses, curves or arcs or more complex shapes. The electrical power may additionally be configured to control lighting distributions of the fixtures independently of one another.

The light fixtures are highly configurable as both the elongate housing body and optical elements can be manufactured by continuous extrusion process and cut at specified length and angle of cut. The configured angle of cut can be optimized for various geometric layouts of light fixture segments that can be joined with each other and/or with grid arrays within an installed panel system such as T-bar cells within a suspended ceiling grid system. The configured cut angle of an embodiment light fixture can be selectively chosen to fit with other light fixtures or to be enclosed with an end plate or end cap.

BRIEF DESCRIPTION OF DRAWINGS

FIG. 2Cii is a cross section view of an embodiment double edgelit optical assembly.

FIG. 2Ciii is a cross section view of an embodiment backlit optical assembly with a planar coextruded optical element.

FIG. 2Civ is a cross section view of an embodiment backlit optical assembly with a coextruded optical element with mounting prongs.

FIG. 2E is a table of optical properties of edge-lit optical elements used in light fixture embodiments.

FIG. 10Ci is a cross section view of a single edge-lit light fixture embodiment with a obliquely angled optical element.

FIG. 10Cii is a cross section view of a double edge-lit light fixture embodiment with a obliquely angled optical element.

DETAILED DESCRIPTION

Figure 1A:
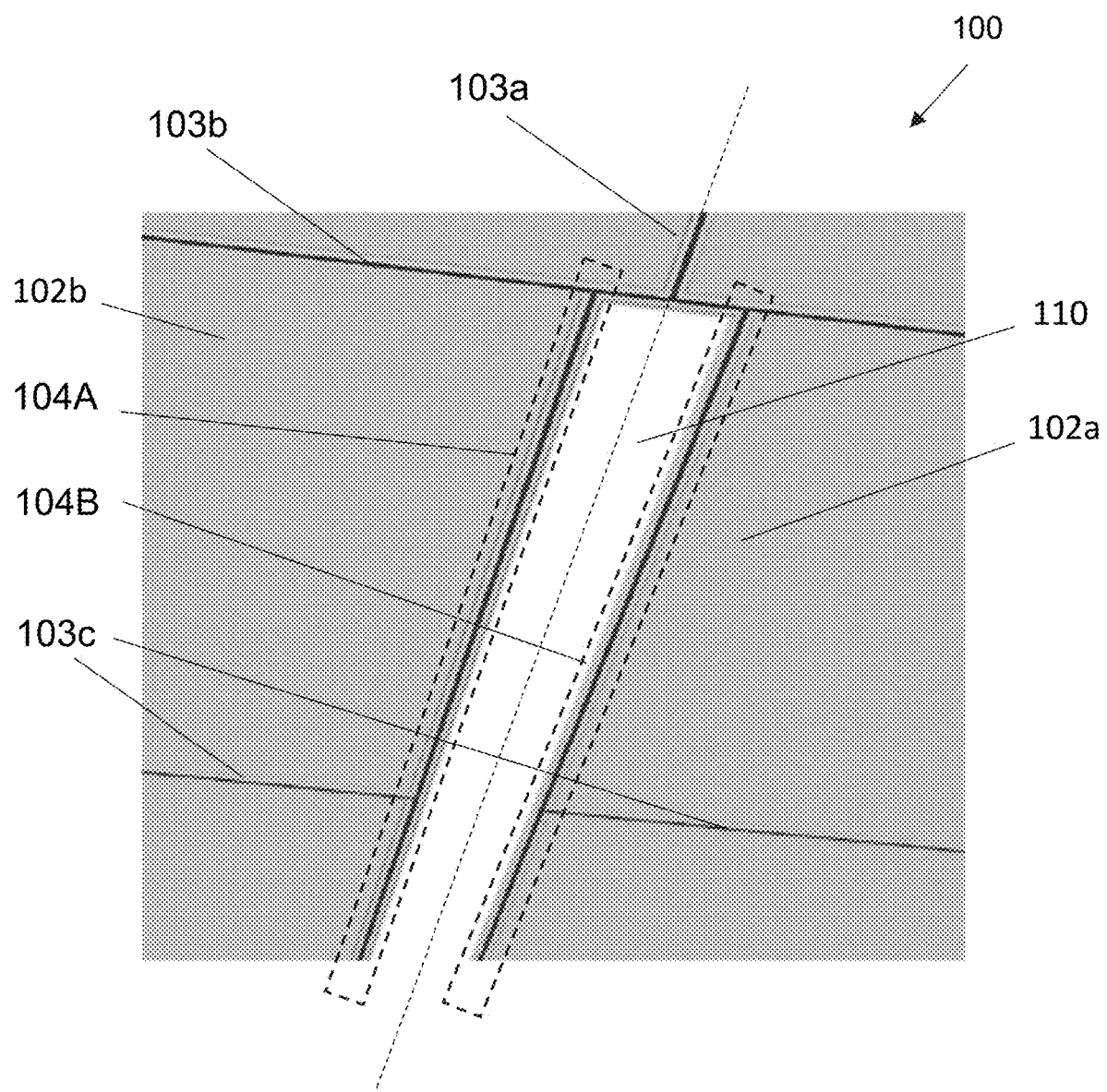
FIG. 1A is a below the ceiling grid perspective view of a light fixture embodiment mounted into a ceiling grid.

Although some modes of carrying out the present disclosure have been disclosed, those skilled in the art would recognize that other embodiments for carrying out or practicing the present disclosure are also possible. Furthermore, The accompanying drawings are not intended to be drawn to scale. In the drawings, each identical or nearly identical component that is illustrated in various figures is represented by a like numeral. For purposes of clarity, not every component may be labeled in every drawing. Labeled items of illustrated light fixture embodiments are as follows after FIG. 1A and FIG. 1B wherein "XX" indicates the Figure number;

100 Ceiling Grid System
101 Ceiling Grid Plane
102 Panel—Ceiling panel, ceiling tile, drywall
103 T-Bar
105 T-Bar Horizontal Portion
106 T-Bar Vertical Portion
108 T-Bar mounting slot
109 T-Bar separation bracket
120 Suspension Cable or Wire
121 Structural Ceiling
130 T-Bar Height ("Zero Plenum Height")
132 T-Bar Clip
140 Power Source/Driver
160 Utility Component
422 Electrical Channel/Arranged Electrical Circuit/Addressable Circuit
730 Positioning component/spacer/spring clip/gasket
1132 Gasket
2060 Ceiling panel cutout
2162 Drywall mud/Spackle/Drywall compound/Joint compound/Plaster
θ Configured Angle
XX00 Light fixture
XX01 Elongate fixture body
XX02 Fixture body side portion
XX03 Bezel/Internal Support Feature
XX04 Support feature on fixture body side portion of elongate housing body
XX05 Fixture body backplane
XX06 Non-optical cavity/Wiring Cavity in fixture body
XX07 Fixture end plate
XX08 End plate mounting feature
XX09 Fixture mounting hardware (e.g. bracket, clip, spring)
XX10 Light fixture output face or window
XX11 Printed Circuit Board (PCB)
XX12 Light Emitting Diode (LED)
XX13 Electrical Connector
XX14 Optical Element
XX14A Optical element edge face
XX14B Optical element output face
XX14C Optical element inner face
XX14D Optical element light scattering region
XX14E Optical element extended edge feature (leg/prong/clip)
XX14F Optical element end face (at configured cross section cut in extruded embodiments)
XX15 Reflector or reflective surface
XX16 Auxiliary Optical Element—Cover lens/Optically Transmitting Component
XX17 Optical Cavity
XX18X Optical ray(s)/Optical interaction region
XX19 Optical Element Light Distribution
XX20 Screw Boss
XX34 Mounting Clip
XX36 Anchor Mount
XX38 Recessed Cavity
XX42 Slotted Housing Channel
XX44 Fastener
XX46 Cavity
XX48 Object interlocking feature
XX50 Elongate Housing Body End
XX52 Configured Geometric Shape
XX54 Consecutive ceiling grid T-bar cells
XX56 Single ceiling grid T-bar cell.
XX58 Baffle Embodiment configurations can be implemented in a wide range of light fixtures. Typical light fixture embodiments include LEDs as light sources and although the written descriptions may reference LED in the singular, typically an array of LEDS is used and should be implied if not explicitly stated or illustrated. Many types of reflectors may be used in various embodiments such as diffuse or specular reflectors or reflectors with surface features for redirection of incident light. Optical elements may be lit from one side, so called "single edge-lit", or two sides "double edge-lit", and may contain surface features for purposes of light outcoupling, light redirection, or visual appearance. Alternatively, optical elements can be used in a "direct lit" or "back lit" manner wherein light is input not into and edge but rather a inner face that is opposing the output face.

Typically, an optical element comprises at least one of: a light guide, an edge-lit diffuser, a direct lit diffuser, a reflector, a refractive lens, a diffractive lens. As represented, a light guide is an optical element which has one or more input faces along its edges into which light from a light source enters and utilizes internal reflection to propagate a portion of light within the optical element by multiple internal reflections while simultaneously outcoupling a portion of light, typically light guides have high transmission (>90%), low haze (<1%) and high clarity (>99%). An edge-lit diffuser is also lit from one or more of its edges but its primary function is to diffuse or scatter any light that enters into its bulk material. An edge-lit diffuser significantly has much lower clarity than a light guide (typically less than 50%) and much higher haze (typically more than 50%). The edge-lit diffuser can further comprise a combination of internal light scattering and light redirecting surface features. The light redirecting features may be regular, such as lines or ridges, or could be a random pattern. Edge-lit diffusers also typically have much high lower levels of surface gloss than light guides. This is because the outer surfaces are not required to allow total internal reflection as is the case with light guide materials. In other embodiments, the optical element can be implemented as a bent mirror that reflects light incident thereon along a first path (and at a first angle) along a second path (and at a second angle) different from the first path. A direct lit diffuser is another optical element wherein light is incident upon the largest area face of the optical element and light is transmitted through the direct lit diffuser lens that scatters light, diffuses light or enables reduction in intensity of light.

The optical elements provided are typically comprised of a light transmissive material having a refractive index greater than the surrounding ambient environment; in the case of air >1. Optionally, regions of differing refractive index may be dispersed within the volume to scatter light and cause a portion of light to out couple from the optical element. Embodiments highlight include those comprised of PMMA acrylic matrix with PMMA beads of differing refractive index dispersed throughout the volume. Other alternative materials for an optical element include but are not limited to clear or translucent grades of polycarbonate, cyclic olefin copolymers, silicone, and glass. PMMA acrylic has a refractive index of approximately 1.5 which in air produces a total internal reflection (TIR) critical angle of approximately 42 degrees. Dispersed light scattering regions within the optical element can be achieved by dispersing materials of differing refractive index throughout the material. Alternatively, $2^{nd}$ phase regions can be formed in-situ during processing of immiscible material blends. Arrays of surface features can also be used such as a linear lenticular or prism array which is often a suitable pattern. Fixture embodiments that benefit from advantages in aesthetic appearance, light distribution pattern, and luminous efficacy are provided.

Installed panel systems with embodiment light fixtures potentially includes at least one of: wiring looms, lighting modules, electronic assemblies such as driver units, sensors, sensor amplifiers, wireless multiplexers, computing devices and such like, typically configured in one or more functional modules. Beneficially, at least one functional module, for power supply purposes and signal coupling purposes, can be connected in a "daisy-chain" manner across a given suspended ceiling arrangement, thereby keeping an associated wiring loom very simple with short wire links between mutually adjacent supporting elements, and avoiding long and complex cable runs; such avoidance of long cable runs potentially results in less weight needing to be supported by a given suspended ceiling, as well as potentially providing a reduced risk of electrical fires due to electrical faults, and also potentially a reduced degree of electromagnetic interference. Optionally included is a spatially local data communication network that is either wire-based or near-field wireless or a combination of both, thereby allowing user-adjustable items such as light switch controls, temperature controls, light intensity controls, light color controls, anti-sound dampening degree controls, ventilation effect controls to be implemented wirelessly, whereby these controls are beneficially installed at various convenient locations in a given room equipped with a installed panel arrangement; such controls thus beneficially communicate wirelessly directly to fixtures of the installed panel system.

In such a manner, the installed panel system can be provided with mutually different color outputs, or with color outputs that can be temporally varied, for example to provide a dynamically-changing room environment that mimics a natural outdoor environment, for example for reducing a feeling of claustrophobia or depression within the given room, for example for providing simulated white cloud effects on a light blue background, wherein the white cloud effects slowly spatially migrate over a period of minutes within the suspended ceiling arrangement.

As mentioned earlier, it is beneficial that a power supply provision from a given light fixture with an installed panel system is beneficially coupled in a "daisy-chain" manner to other light fixtures that are adjacent to the given light fixture. A functional module can beneficially include a local data processing arrangement therein, so that near-field wireless communication can be employed in such a "daisy chain" manner; the modular ceiling system of the present disclosure thereby provides a spatially distributed and networked data processing arrangement, for example so that sensor signal data compression can occur locally to avoid large amounts of data, for example video surveillance data, required to be communicated via the modular ceiling system. The functional module beneficially provides various power output options (e.g. DC output, AC output, overload protection, sensor inputs, control outputs, resonant inductive power coupling connections, optical fiber data coupling connections for supporting later retrofitted new types of functional module); this flexibility allows various types of functional modules to be added later that have a wide range of power supply requirements. The spatially distributed and networked data processing arrangement can function as one or more nodes of a peer-to-peer data communication network, a local computing center, and such like.

Examples of functional modules includes various electronic and/or electrical devices, for example including at least one of: power supplies, driver units, lighting arrangements, lighting fixtures, and so forth. Optionally, at least one functional module includes one or more fixtures disposed in one or more ceiling panels such as alarm apparatus, downlights, sensors, sensor amplifiers, loudspeakers, ventilation fans, heaters, humidifiers, anti-sound apparatus for sound cancellation purposes, air filters, water sprinklers, water mist humidifiers, fire detectors, wireless communication units and the like, but not limited thereto. Functional devices may further include down-lights, sensors, ventilation fans, loudspeakers, anti-sound ports, wireless repeaters or hubs for "wifi", and such like.

Optionally, an installed panel system can include a power module for supplying electric power to the various light fixtures and/or functional modules, for example wherein the power module is disposed in a "daisy-chain" arrangement so that connection cables employed can be relatively short to achieve a neat and orderly wiring loom in the an installed panel system for installation convenience. The "daisy-chain" is optionally implemented using direct wire connections and/or resonant inductive couplers, whereas the driver units mutually interact with their spatially neighboring driver units. Resonant inductive coupling allows the driver units to be fully sealed and the installed panel system is then capable of functioning even when a severe water leak occurs, for example water sprinklers being activated in a fire situation, and yet allowing light fixtures and functional modules to continue to be active, for example for providing fire alarms, announcements and room lighting, during an evacuation procedure being invoked in an event of a fire occurring or a terrorist incident arising.

Optionally, a coupling channel accommodates in use a plurality of driver modules, for example a DC driver unit, a sensor interfacing unit having one or more sensor inputs, a resonant inductive power coupling unit, a data relay unit providing the ceiling arrangement with a peer-to-peer wireless communication network, and so forth. Optionally, the plurality of driver module, or single driver module if employed, are coupled in a "daisy chain" arrangement so that long cable runs are avoided, allowing a single input power feed to a installed panel system. Such a "daisy chain" configuration can be achieved using short "pig-tail" wire connections for coupling a given driver module to its nearest neighboring driver module in the suspended ceiling arrangement, wherein the "pig-tail" wire connections have plugs for connecting to driver modules together; by "short" is meant having a length in a range of 20 cm to 3 meters (metres), more optionally in a range of 0.5 meters (metres) to 2.5 meters (metres). In situations where the suspended ceiling arrangement is prone to flooding or becoming water-logged, such "pig-tail" wire connections have plugs that transfer their power via resonant inductive power transfer via coupling ferromagnetic cores included at the plugs. This provides a technically enabling basis for a person of ordinary technical skill to implement embodiments of the present disclosure, implemented wirelessly. The driver modules, in such a case, employ plugs have split-C ferromagnetic cores therein, wherein the cores are provided with corresponding windings, and power is transferred when the split-C cores are abutted together to form a complete magnetic circuit implemented via the cores. Use of resonant inductive coupling avoids a risk of electrocution to personnel, and allows fixtures to be replaced "on-the-fly" without need to decouple electrical power from the suspended ceiling arrangement during maintenance.

Furthermore, optionally, a light source within a installed panel system comprises at least one of: a LED light, an incandescent light, a monochromatic light, a laser, or a combination thereof. Optionally, sensors comprise one or more of: a smoke-detector, a gas detector (for example a toxic gas detector), a proximity sensor, a light sensor, a motion sensor, a sound sensor and a combination thereof. In an example, by using embodiments of the present disclosure, there is provided a given house with a multilevel security arrangement including multiple combinations of sensors placed along with the light sources. In an example, smoke-detectors are beneficially used to provide an alarm when a fire or burning event happens in a given house. In another example, proximity sensors and motion sensors are used to detect strangers or movements of objects. In yet another example, light sensors are beneficially used to detect lighting conditions such as ambient light, and control the light sources accordingly.

FIG. 1A is perspective below ceiling grid view of a light fixture embodiment mounted into a ceiling grid system 100 highlighting the T-bar features 104A and 104B of the side portions of the light fixture elongate body visible from below. From an observer within a room below the light fixture, the support features 104A and 104B have the same appearance as a T-bars within the ceiling grid system; T-bar 103A, T-bar 103B, and T-bar 103C. The light fixture is mounted recessed into the ceiling grid systems so as its output face 110 is flush with 2 ft×2 ft ceiling tiles 102*a* and 102*b* in the ceiling grid system 100. The light fixture is mounted on a T-bar 103*b* and T-bar 103C by use of end plates and the longitudinal axis of the light fixture and the T-bar 103*a* are in alignment. Also shown are two further T-bars 103*c* aligned perpendicularly with the sides of the light fixture housing body and connected to the fixture so as to maintain structural properties of the ceiling grid system and support ceiling panels.

Suspended ceiling grid systems are particularly common in indoor office, education and retail spaces. Typically ceiling grid systems comprise T-Bars with vertical and horizontal portions that are supporting lightweight functional or decorative ceiling tiles, panels or other members. Ceiling tiles or panels are typically made with mineral wool, fiberglass, gypsum, perlite, clay, melamine acoustic foam, cellulose or starch. Metal, glass and wood are also used as specialty materials. When placed in the ceiling grid, they provide some thermal insulation but are usually designed to improve the aesthetics and acoustics of a room. In addition to be structurally functional, T-bars are themselves part of the aesthetic appearance of the ceiling grid system. Commonly the horizontal portion of a T-bar is 9/16", 15/16" or 1.5" wide and typically is configured in a flat or "slot and bolt" configuration although other styles are also popular. The height of a T-bar is also typically between 1" and 2" with the main beam T-bars being taller than cross beam T-bars.

Figure 1B:
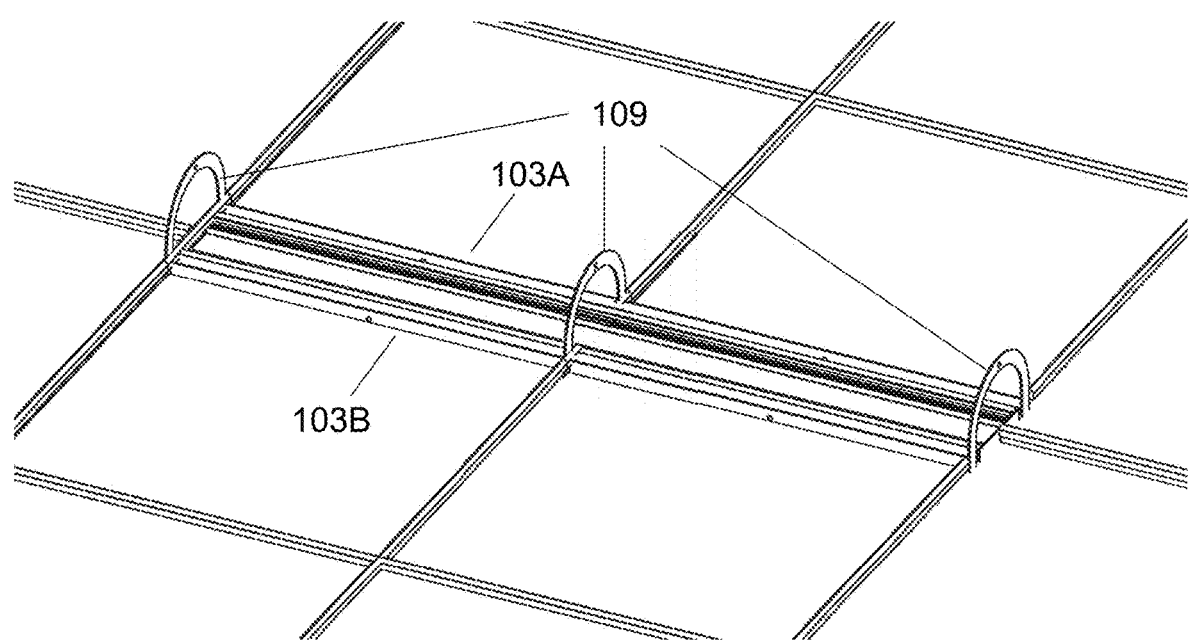
FIG. 1B is an above the ceiling grid perspective view of a light fixture embodiment mounted into a ceiling grid.

FIG. 1B is an overhead perspective view of the light fixture embodiment of FIG. 1A installed in a ceiling grid. In this embodiment T-bars are organized so as to create a frame that matches the external dimensions of the light fixture and in particular two T-bars 103A and 103B are positioned parallel to one another and at a configured separation. T-Bar separation brackets 109 are used to ensure the spacing between the parallel T-bars is maintained and accurate. Typically the spacing of the parallel T-bars is 4" or 6" as measured center-on-center between the T-bar vertical portions.

Figure 2A:
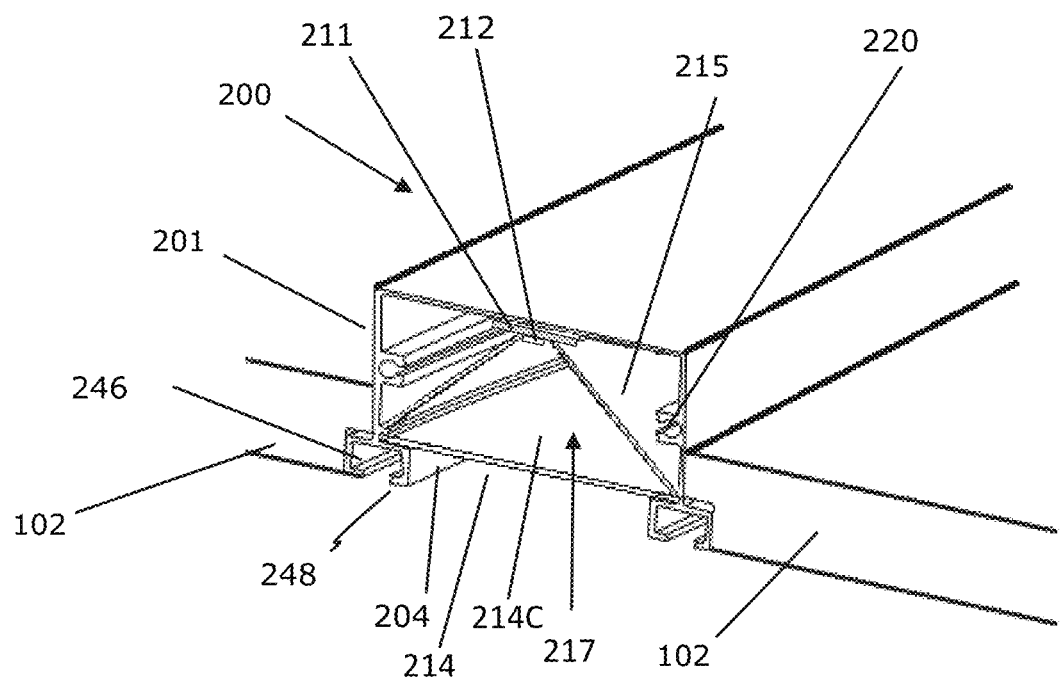
FIG. 2A is a perspective cross section view of a direct lit light fixture embodiment.

FIG. 2A is a perspective cross section view of a direct lit light fixture embodiment in which light from the LED light source 212, with aid from the reflector 215, projects onto the inner surface 214C of the optical element 214.

Figure 2B:
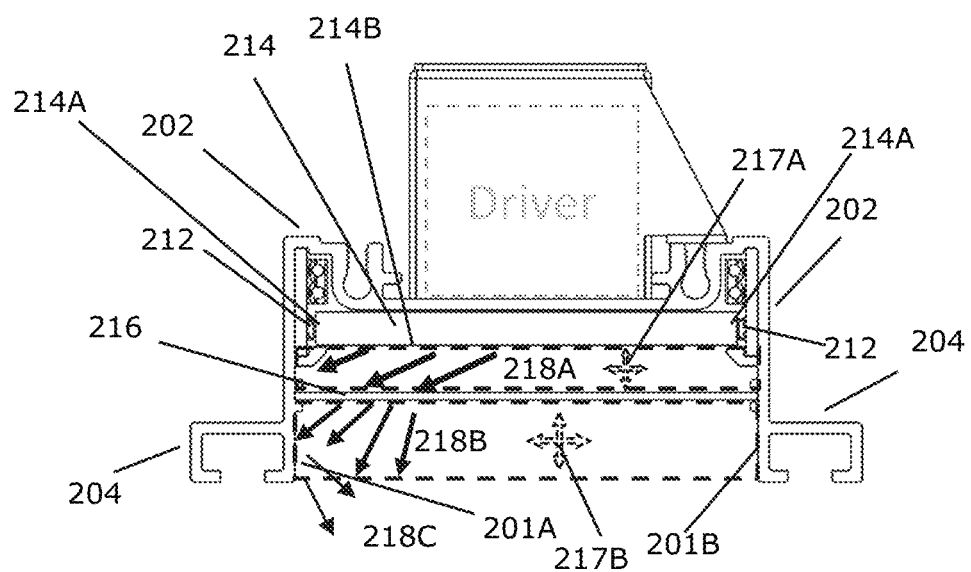
FIG. 2B is a cross section view of an embodiment light fixture with a double edge lit optical element.

FIG. 2B is a cross section view of an embodiment light fixture with a double edge lit optical element wherein light from the LED light sources 212 inputs light into the edges 214A of the primary optical element 214. Light is subsequently emitted from the output face 214B of the primary optical element 214 as light distribution 218A and then further transformed into light distribution 218B by the auxiliary optical element 216.

The auxiliary optical element 216 is an optional component which can be configured to enclose the output face of the light fixture and provide an appearance more uniform in brightness and color. Adjustments to the auxiliary optical element 216 surface geometry and bulk light scattering properties can be used to modify the output light distribution from that originating from the optical element output face 214B. For example, adjustments to auxiliary optical element surface or volumetric light redirecting properties can be used to decrease the wide angle degree of lobes in the light distribution pattern or make brightness or color variations in the beam pattern emitting from the optical element output face more uniform. The air gap and distance between the optical element output face and the auxiliary optical element can also be used to control the visual appearance. Typically increasing the air gap helps to reduce head lamping and edge brightness effects. However increasing the air gap too much will result in an unacceptable increase in overall height of the light fixture and may result in dark bands on either side of the auxiliary optical element. In the embodiment shown the air gap is approximately ¾" (5-6 mm) and typically the air gap is less than ½" (10-13 mm).

Figure 2C:
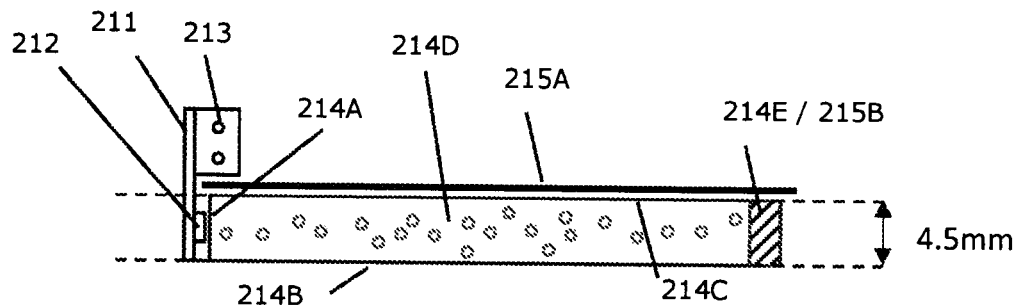
FIG. 2Ci is a cross section view of an embodiment single edgelit optical assembly.
Figure 2C:
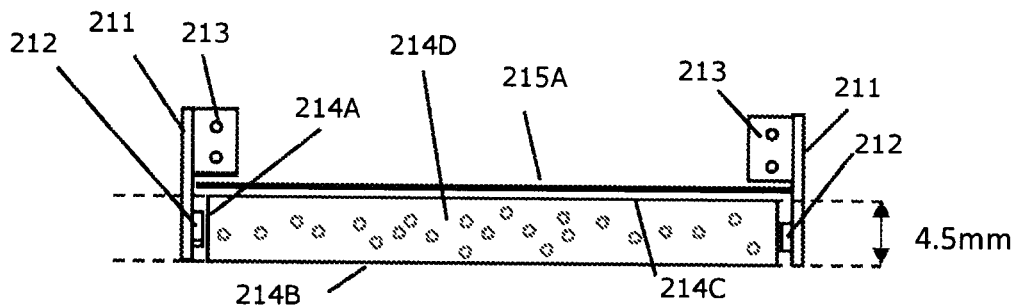
Figure 2C:
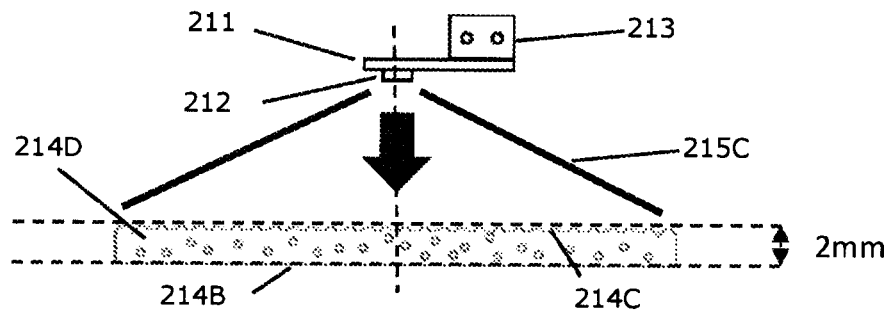
Figure 2C:
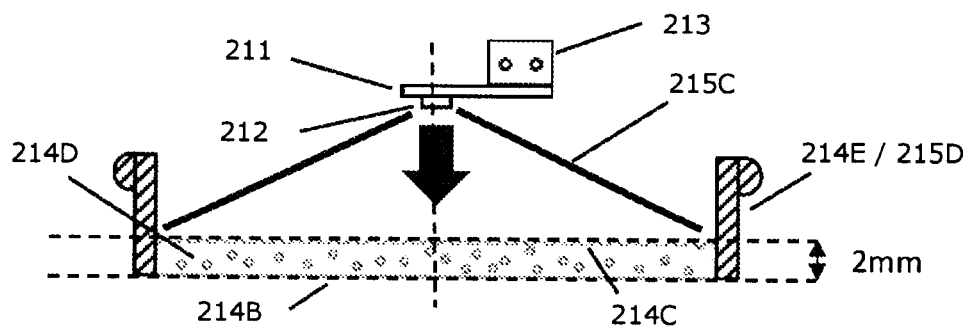

FIG. 2Ci-FIG. 2Civ are cross section views of four different optical assembly embodiments. FIG. 2Ci shows a single edge lit embodiment have an optical element 214 with comprised of an edge 214A which serves as the sole input face for the LED light source 212 mounted on a LED board 211 along with an electrical connector 213. A reflector 215A is positioned adjacent to the optical element inner face 214C. The optical element is primarily comprised of a light scattering region 214D but also has a reflective region 214E which is can be manufactured by coextrusion and functions as a reflector 215B.

FIG. 2Cii shows a double edge lit optical assembly embodiment with a LED light source 212 inputting light into the two optical element input faces 214A. In edge lit embodiments the thickness of the optical element is typically slightly greater than height of the LED light source; in this embodiment 4.5 mm.

FIG. 2Ciii shows a direct lit optical assembly with a planar backlit optical element comprised of a light scattering region 214D with surface features on the inner face 214C which is the input face for the LED light source 212. The reflector 215C aids in directing light from the LED light source 1412 into the optical element face 214C. In a direct lit embodiment the thickness of the optical element is typically chosen for sufficient mechanical rigidity, in this 2 mm.

FIG. 2Civ shows a direct lit optical assembly with a backlit optical element having extended edge feature 214E comprising reflective material and alternatively described as a prong, leg, or mounting clip feature which functions for mechanical mounting and in this embodiment also reflectance to increase efficiency of light exiting the internal cavity. The extended edge feature 214E is co-labeled as reflector 215D. In this embodiment the light scattering region 214D has surface features on the inner face 214C of the optical element which and can be coextruded along with the reflective extended edge feature 214E.

Figure 2D:
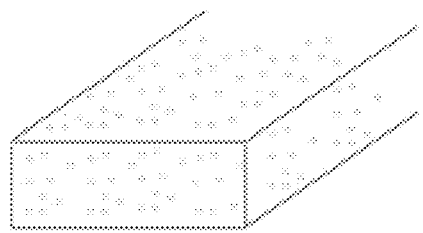
FIG. 2D shows isometric illustrations of various embodiments of edge-lit optical elements used in light fixture embodiments.
Figure 2D:
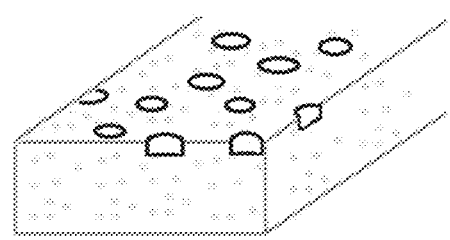
Figure 2D:
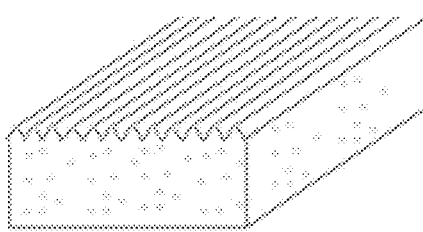
Figure 2D:
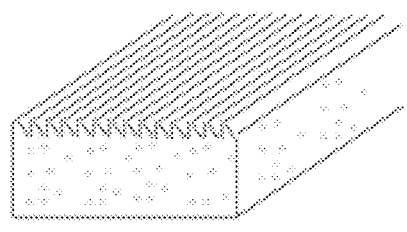
Figure 2D:
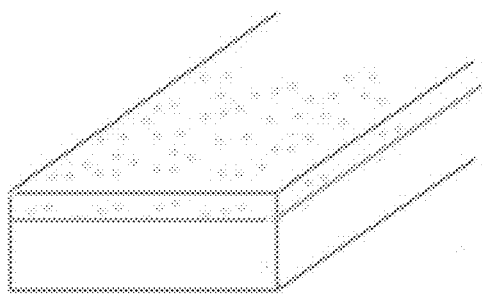
Figure 2D:
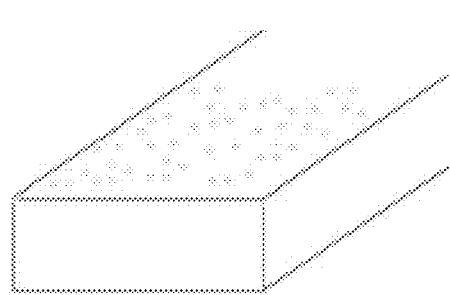
Figure 2D:
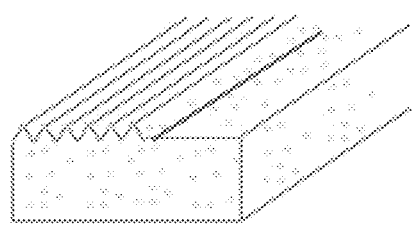

FIG. 2D shows isometric illustrations of various embodiments of edge-lit optical elements used in light fixture embodiments illustrating key elements. Important to various embodiments are dimensions of thickness, width and height. Volumetric light diffusion is produced by dispersed regions, layers or coatings within the optical element or on its surface having refractive index different than the bulk matrix material. Concentration of diffusing blend is an important variable in effecting light scattering properties that influence angular light distribution and uniformity of beam pattern. Embodiments described include optical element light scattering formulations comprising clear PMMA resin blended with cross linked PMMA beads having slightly differing refractive index. Cross linked PMMA beads are commercially available in compounded format as resin pellets with specific concentration that can be blended with clear resin pellets in standard extrusion feeder equipment. Alternative means in creating dispersed regions of differing refractive index than the optical element matrix material include dosing microbeads into the optical element resin formulation as well as forming second phase regions in situ by fluid phase mixing of immiscible blends of polymers. In addition to refractive index, the quantity per volume, size, and shape of dispersed regions effect light scattering properties. In the case of immiscible blends formed by fluid phase mixing, the shape of second phase regions may be other than spherical, for example oblate paraboloid, thereby generating non-symmetric light scattering. Processes for fabricating optical elements include coating, lamination, extrusion and injection molding. Surface features and their pattern of arrangement on a face of the optical element are of importance in converting internal reflection within the optical element to output from the module at desired angular light distribution.

FIG. 2E is table containing optical properties of various embodiments of edge-lit optical elements. Light fixture embodiments were configured using various edge-lit optical elements with common optical properties. In all cases where diffuse internal scattering or a diffuse layer or coating was one of the primary mechanisms the optical clarity was measured using ASTMD1003 standard techniques as being less than 25, and significantly less than clear etched optical elements or edge-lit signage grade acrylic. It was also noticeable that the optical elements with diffuse light scattering of some form also all had a haze of greater than 80. Furthermore the gloss of the optical element surfaces were typically significantly less than 100 and in most cases there was a significant disparity in gloss levels for the output and inner faces of the optical element, further illustrating the requirement that the configuration of the optical element output and inner faces with the reflector and auxiliary optical element is an important design consideration.

Figure 2F:
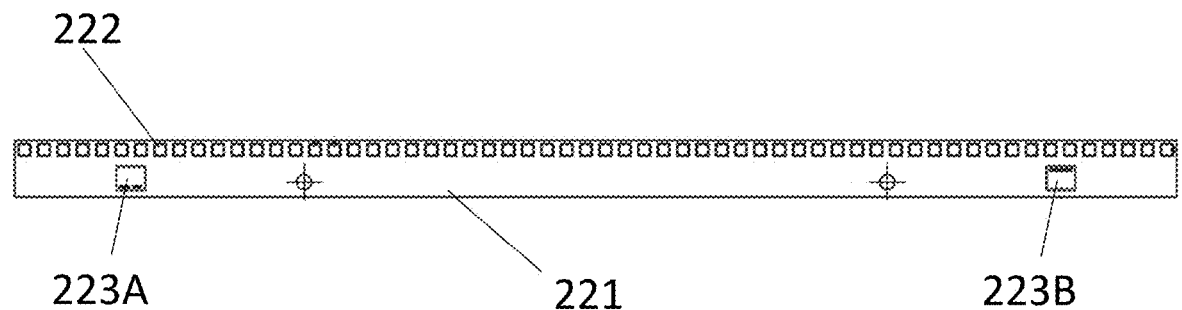
FIGS. 2F, 2G, and 2H show top, side, and end views of a typical LED board used in light fixture embodiments.
Figure 2G:
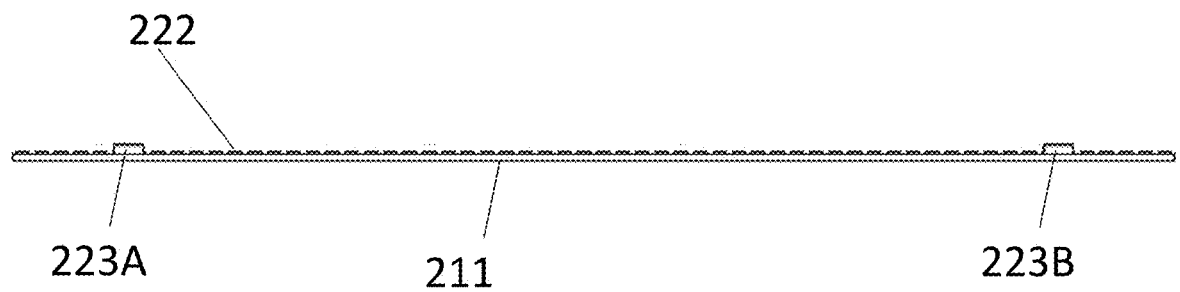
Figure 2H:
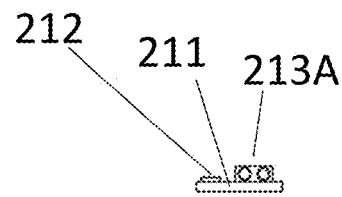

FIGS. 2F, 2G, and 2H show plan, isometric views of a nominal 1 ft long embodiment of a LED board used in various light fixture embodiments. The LED board comprises a rigid linear printed circuit board (PCB) 211 with 60 packaged LED light sources 212 mounted on the PCB and connected via its electrical circuit. Commonly, LEDs are arranged in series circuits of 12 LEDs to produce a voltage of approximately 33 volts. Multiple 12 LED series circuits are then typically arranged in a parallel circuit. Spacing and pitch of LEDs has an effect on headlamping effects in edgelit optical elements. Typically, more than 36 LEDs/ft are used to minimize headlamping. The PCB board can be cut to length at increments between each string of LEDs in series. The LED board of FIG. 2E has two electrical connector 213A and 213B which in this embodiment can either be used for electrical connection to the entire LED board. In alternative embodiments multiple electrical connectors can be used to independently address separate LED channels. The electrical connectors are offset relative to the LED light sources. This is important when connecting rows of LED boards in series within the light fixture body. If the connectors were in line with the LED light sources then there would be a visible shadow and also mechanical interference with the gap spacing between LEDs and optical element input face. It is important that the front surface of the LED board is highly reflective and white. Typically this is achieved using a white solder mask or a white reflective stencil that is placed over the LED board.

Typically LED electrical channels are driven by a constant current LED driver which generally provides less variation in power during operation compared to other options such as constant voltage power supplies. The voltage of individual LEDs typically change significantly vs. temperature making precise control difficult with voltage control devices over a range of thermal environments and applied power levels.

Figure 3A:
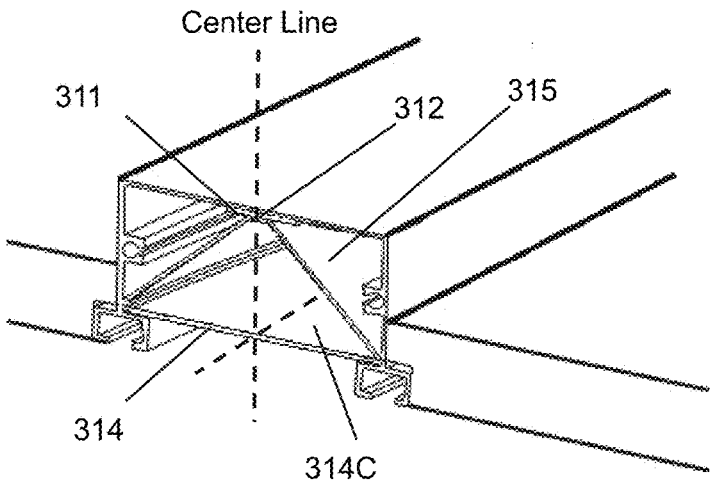
FIG. 3A is a perspective cross section view of a direct lit light fixture embodiment having a backlit optical element.

FIG. 3A is a perspective cross section view of a direct lit light fixture embodiment having a backlit optical element in which light from the LED light source 312, with aid from the reflector 315, projects onto the inner surface 314C of the optical element 314. The optical element 314 functions to reduce the brightness and direct viewing of the LED light source from within an application space and further functions to redirect the light distribution depending on specific configuration of the optical element. A combination of light scattering and light redirecting features can be selected to control key characteristics of the light fixture light distribution such as peak intensity, beam angles, asymmetry and symmetry, and off axis beam tilt. Linear surface features are particularly suitable for manufacture of extruded optical elements and specific features for light redirection can include lenticular patterns with cross sectional geometries such as triangles, half spheres, polygons, arcs, or combinations thereof. Fresnel lenses can be used to allow the function of a concave or convex focusing lens to be superimposed onto an inner or outer surface of an optical element. In some embodiments, the alignment of LED light sources 312 with the centerline of the optical element 314 can be arranged to produce different light distributions.

Figure 3B:
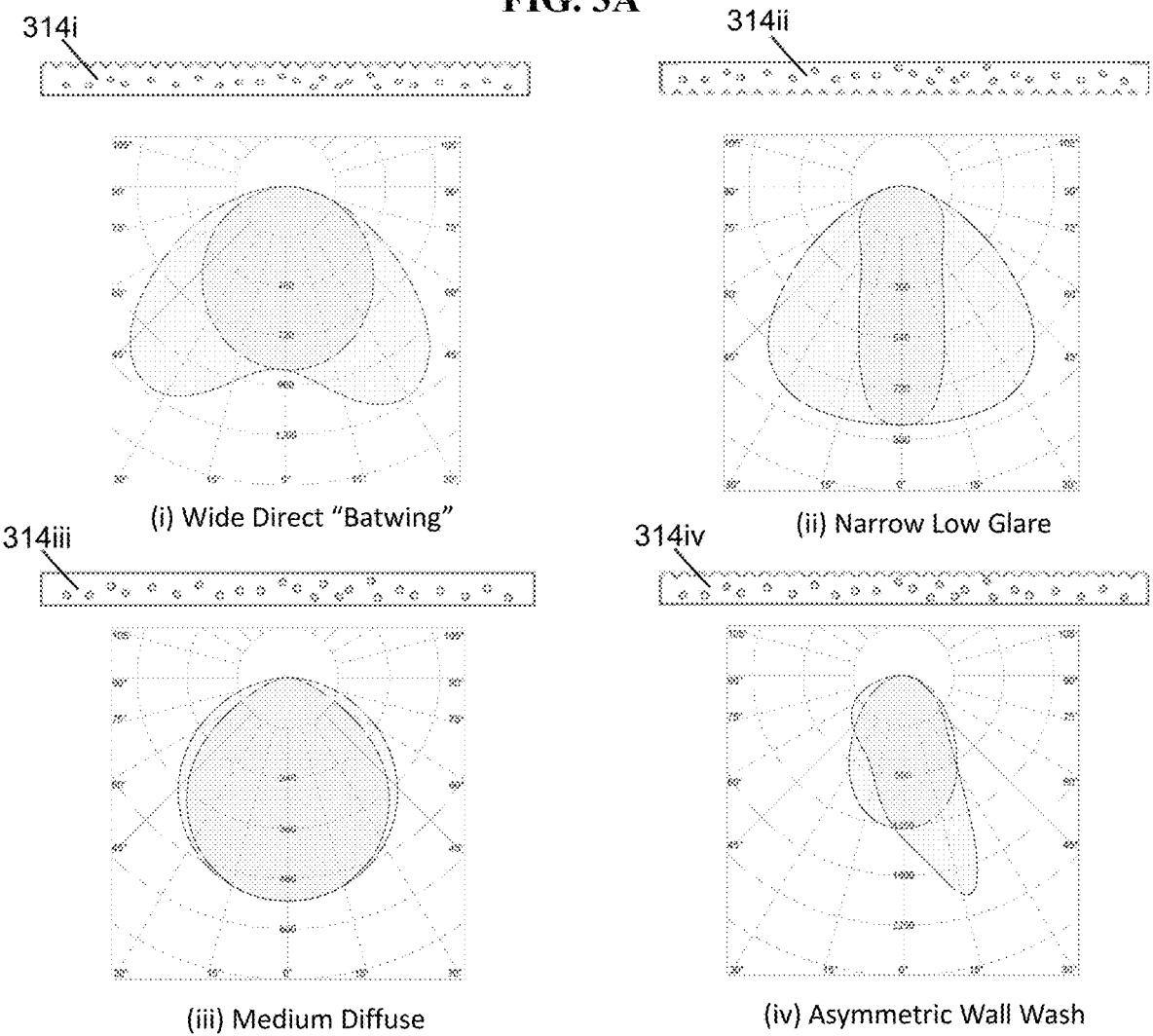
FIG. 3B shows polar plots of light fixture light distribution achievable with differing backlit optical elements.

FIG. 3B shows polar plots of light fixture light distributions 3Bi-3Biv produced with differing backlit optical elements 314i-iv. The four illustrated embodiments are as follows:
 (i) Wide Direct "Batwing" light distribution—A back-lit optical element 314i is used which has volumetric scattering and prism features on the input face.
 (ii) Narrow Low Glare light distribution—A back-lit optical element 314ii is used which has volumetric scattering and prism features on the output face.
 (iii) Medium Diffuse light distribution—A back-lit optical element 314iii is used which has volumetric scattering only.
 (iv) Asymmetric Wall Wash light distribution—A back-lit optical element 314iv is used which has volumetric scattering and linear fresnel features on the input face.

Characteristic optical properties for these four embodiments are listed in the table of FIG. 2E.

Figure 4A:
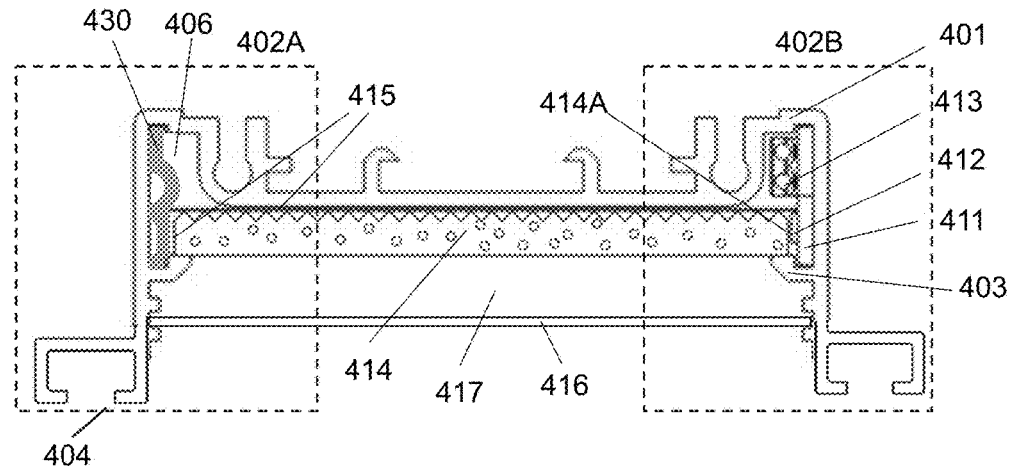
FIG. 4A is cross-section view of an embodiment single edgelit light fixture with auxiliary optical element.

FIG. 4A show cross section views of single edge lit constructions with a single input edge 414A of primary optical element 414. Reflector 415 is positioned on both the inner face and opposing face of the optical element 414. A bezel 403 along with the elongate housing body 401 that surrounds the LED board 411, positions and hold in optical alignment the LED board 411.

A positioning component 430 is configured to fit into the elongate fixture body and acts as a support feature which aids in holding and retaining the optical element and reflector in position. The positioning component could specifically be a spacer, spring clip, or gasket. A material with some amount of flex or elastic compression is beneficial in setting and retaining the optical element and reflector in proper position. The positioning component can further be configured to enable the optical element and reflector to be removable once the fixture is installed in its intended location for use. The positioning component 430 is positioned within a non-optical cavity 406 which can be used for housing electrical wiring.

Figure 4B:
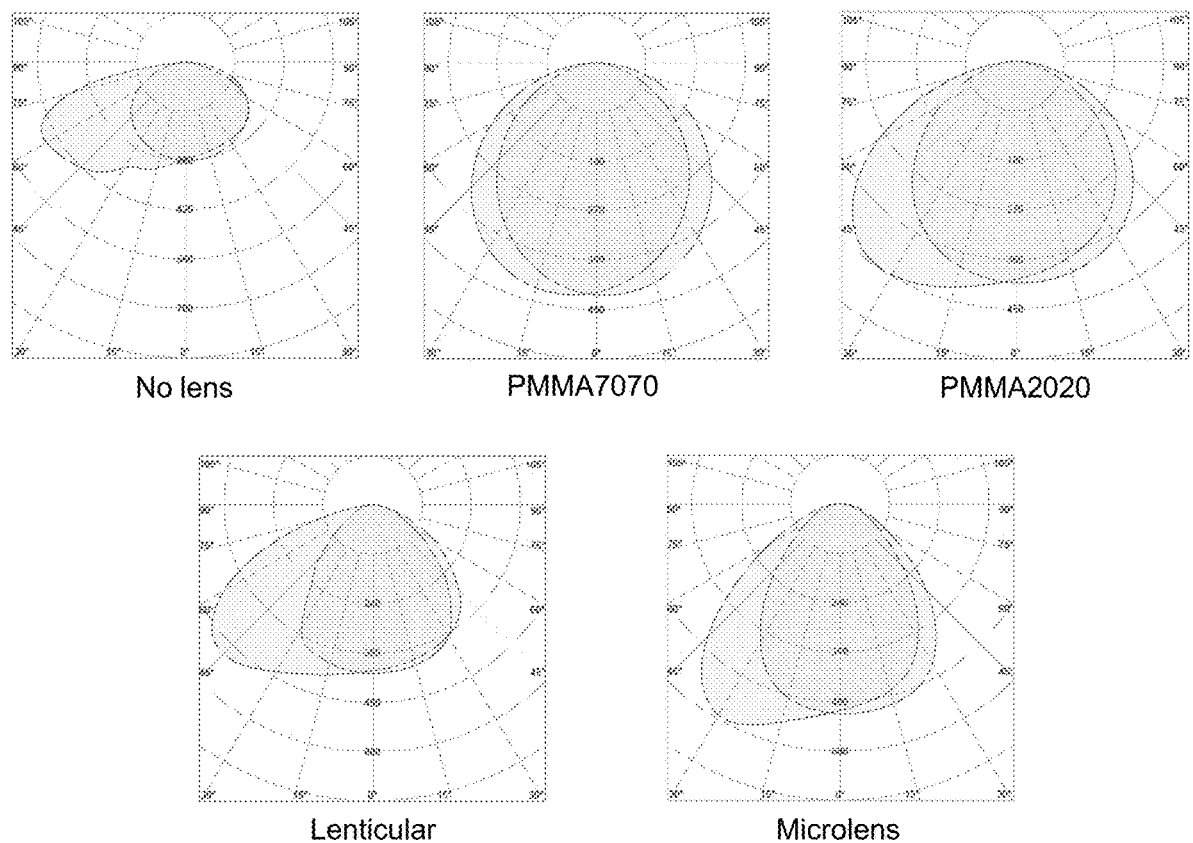
FIG. 4B shows polar plots of light distributions achievable with differing auxiliary used in the embodiment single edgelit light fixture of FIG. 4A.

FIG. 4B illustrates polar plots of lighting distributions from the single edge-lit light fixture embodiments with no auxiliary optical element as well as different types of auxiliary optical elements. The light distribution with no auxiliary optical element is asymmetric with a peak intensity that is obliquely angled relative to the normal from the output face of the optical element. A PMMA7070 diffusion lens with haze of 100 and clarity of 2 converts this distribution to one that is much rounder and closer to lambertian. Alternatively the PMMA2020 diffuser which has much lower diffusion levels and higher clarity preserves the asymmetrical aspect of the light distribution although it shifts the angle of peak intensity closer to the normal and also widens the overall spread of light. Similar effects are shown with a lenticular cover lens and a microlens cover lens.

Figure 5A:
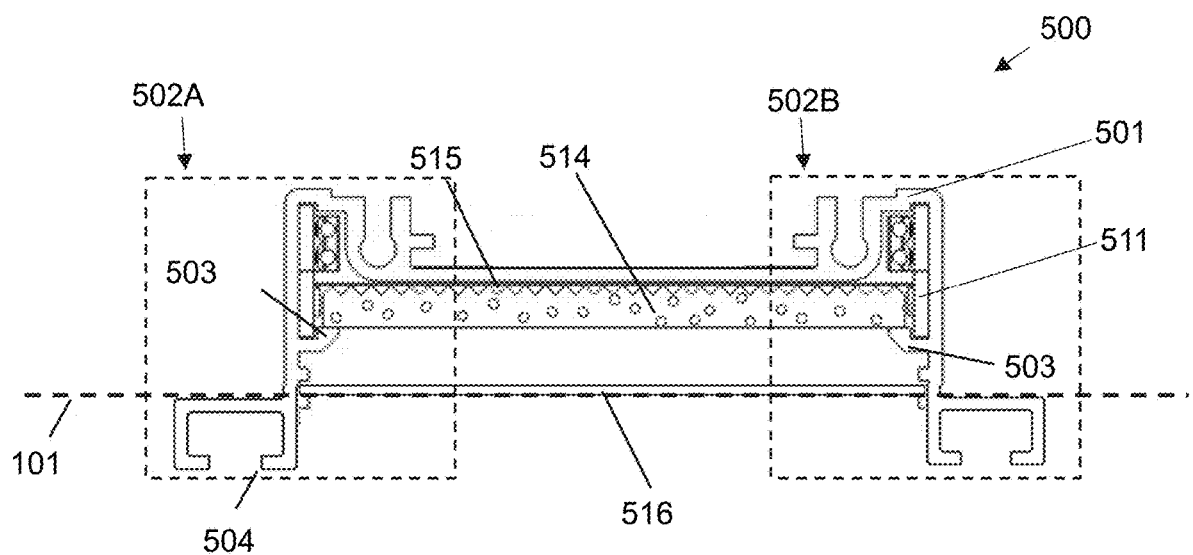
FIG. 5A is cross-section view of an embodiment double edgelit light fixture with auxiliary optical element.
Figure 5B:
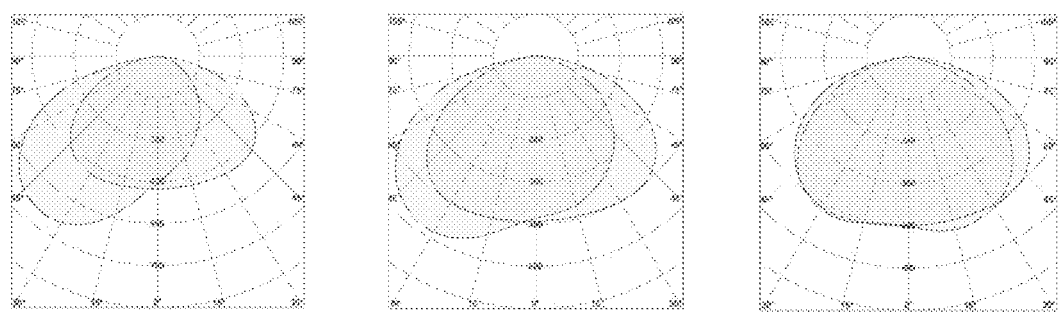
FIG. 5B shows polar plots of light distributions achievable with differing auxiliary options used in the embodiment double edgelit light fixture of FIG. 4A.

FIG. 5A illustrates various polar plots for a double edge-lit light fixture embodiment with a horizontally retained recessed primary optical element 514 installed above the ceiling grid plane 101 and held in place by bezels 503 which also function as an internal support element to hold the LED board 511 in optical alignment with the primary optical alignment 501 and reflector 515. Additionally the bezel 503 also cover the end ends of the primary optical element to improve brightness uniformity and aesthetic appearance of the primary optical element as viewed from below within an application illuminated space. In this embodiment the auxiliary optical element 516 is a relatively high clarity PMMA2020 diffuser. This auxiliary optical element was chosen because the relatively higher clarity preserves more of the asymmetry and directionality of the light output from the primary optical element. The polar plots of FIG. 5B illustrate in five individual polar plots five different ratios of electrical power applied to the LED boards on each side of the double edge lit optical element. When 100% of power is applied to the LED board on side B the light distribution is a narrow beam with approximately 40 degrees of tilt away from the vertical on its opposing side. This changes to become a beam tilted by approximately 40 degrees in the opposite direction when 100% of the power is applied to side A. Additionally it is shown that the beam is essentially symmetrical and centered on the vertical when 50% of power is applied to side B and 50% is applied to side A.

Figure 6A:
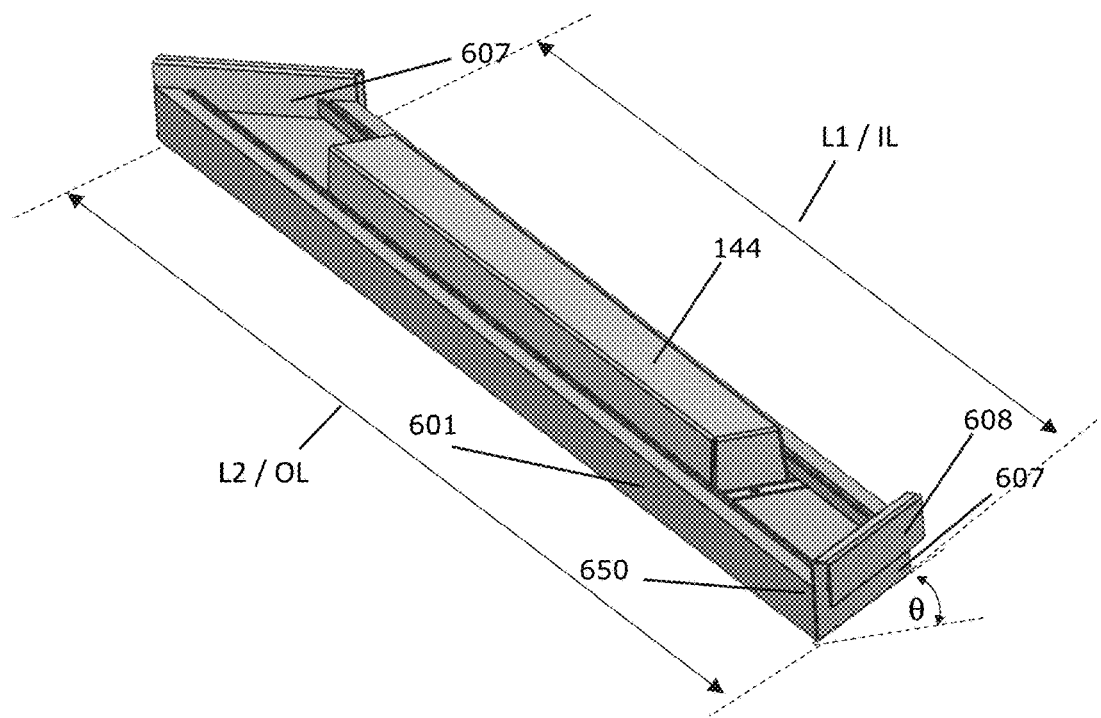
FIG. 6A is an overhead perspective view of an embodiment light fixture with angled ends.

FIG. 6A is an overhead perspective view of an embodiment light fixture with angled ends. The fixture ends 650 are angled with respect to the longitudinal axis of the light fixture. As an advantageous manufacturing process, the elongate housing body is extruded as a linear profile shape and subsequently cut at a configured angle $\theta$. The elongate body end is enclosed with an end cap 607 which has a mounting feature 608 for attachment to a ceiling grid T-bar. In this embodiment, an electronic controller (LED driver) 144 is mounted on the top side of the elongate housing body 601.

Figure 6B:
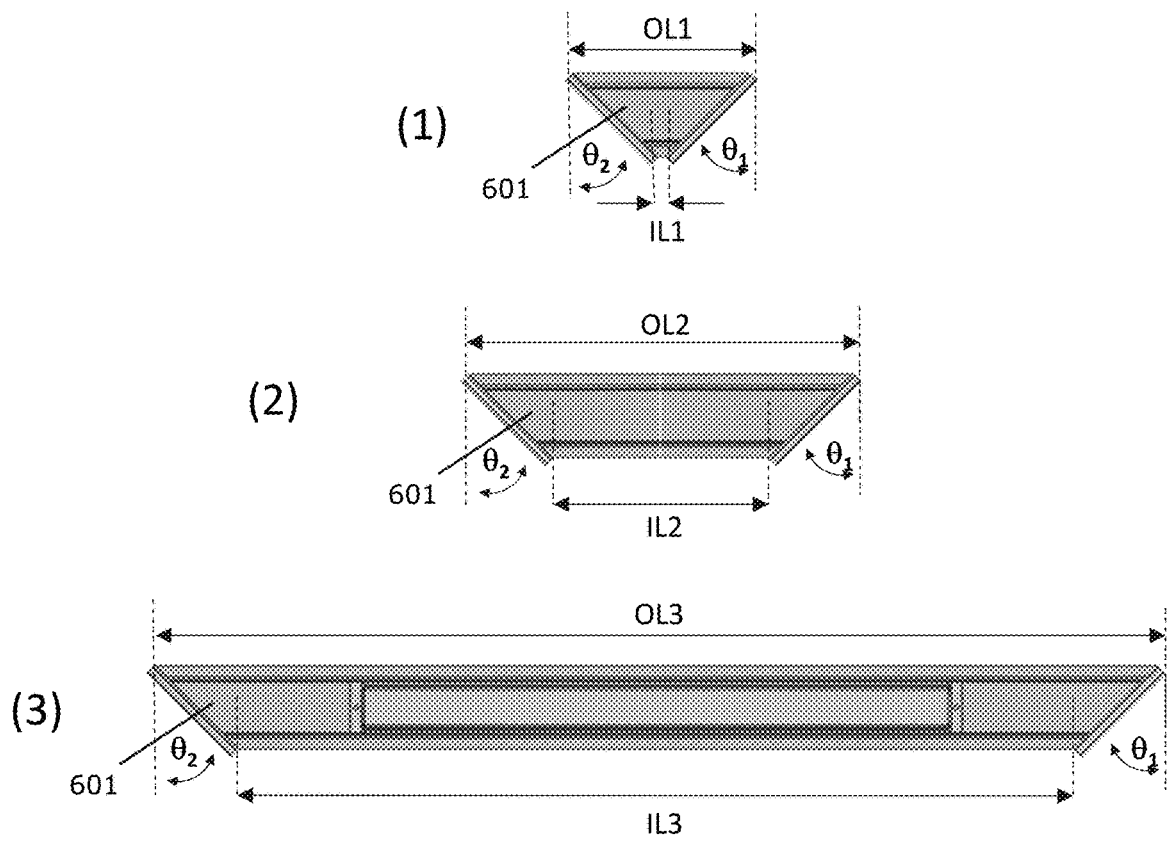
FIG. 6B is an overhead plan view of three embodiments light fixtures with angled ends, each having a different length for particular application within ceiling grid systems.

FIG. 6B is an overhead plan view of three embodiment light fixtures with angled ends, each having a different length for particular application within ceiling grid systems. In each embodiment the elongate body 861 is cut with the same configured angle $\theta$ to produce an associated outer length (OL) and inner length (IL). For the shortest embodiment 6B1, the inner length is very small and the overall geometry becomes a suspended shape. In addition to the unique aesthetic appearance of the triangular shape, the geometry facilitates the use of a triangular shaped optical element which can be configured to provide improved brightness uniformity and increased luminous efficacy. Furthermore, the triangular shape can be fitted precisely into the corner of a ceiling grid T-Bar cell. Embodiment 6B2 is cut at a specified length and angle $\theta$ to span the gap of a single T-bar cell of a ceiling grid system and mount on orthogonal ceiling grid T-bars. Embodiment 6B3 is cut at a specified length and configured angle $\theta$ to span multiple T-bars cells and mount on orthogonal ceiling grid T-bars. Embodiment 6B3 provides ample length for the mounting of a large electronic control device 144. As illustrated in FIG. 6B, the configured angle $\theta_1=\theta_2=45$ degrees but for different applications configured cut angles be selected as any chosen angle independently for each end of the elongate housing body 601. Typically the configured angle $\theta$ relates to dimensions of the ceiling grid system and/or orientation of other light fixtures to be joined.

Figure 6C:
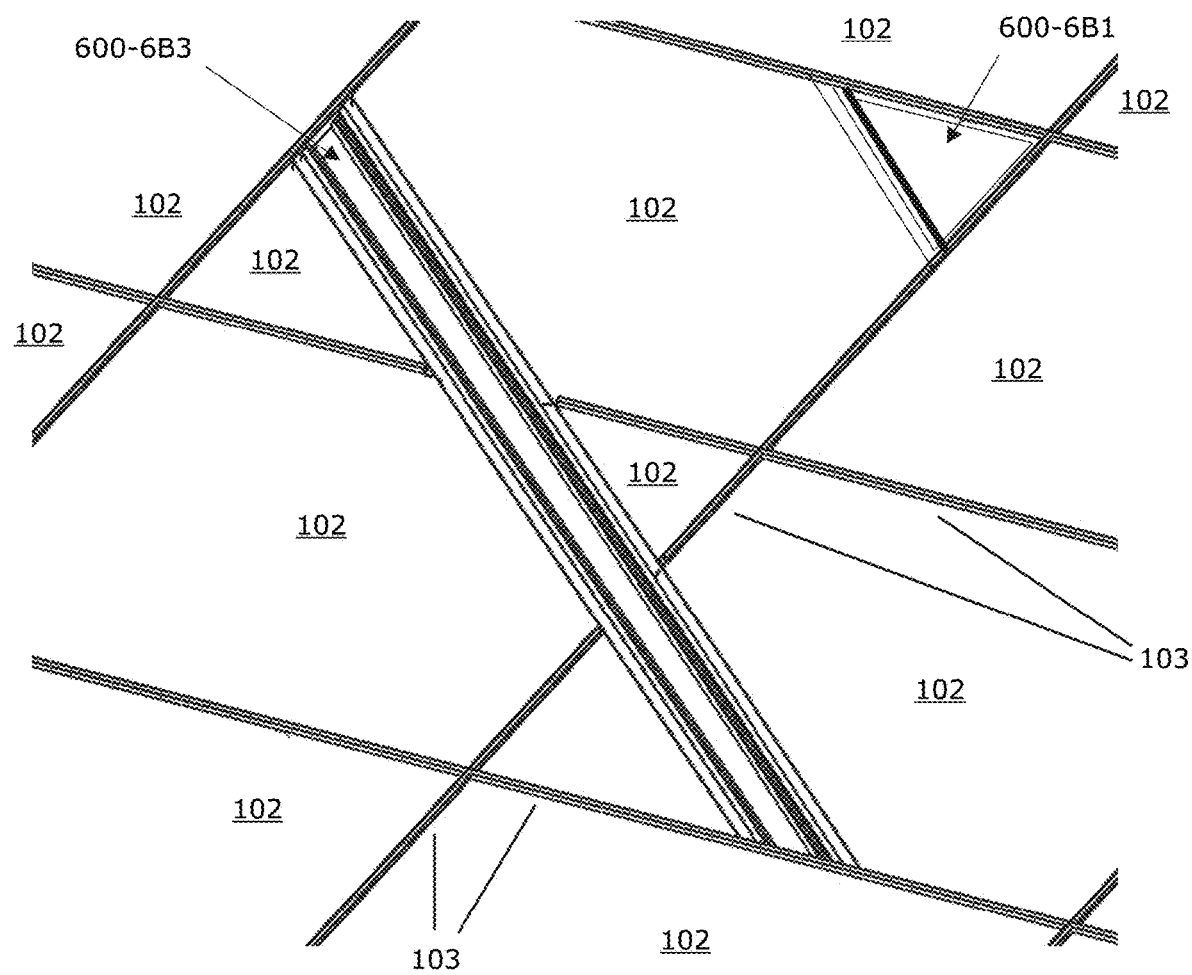
FIG. 6C is a bottom view of embodiment light fixtures with angled ends installed in a ceiling grid system.

FIG. 6C is a bottom view of embodiment light fixtures with angled ends installed in a ceiling grid system. Triangular shaped light fixture embodiment 600-8B1 is similar to that shown in FIG. 6B1 and is installed in a corner of a T-bar cell. Light fixture embodiment 600-8B3 is similar to that of FIG. 6B3 and is shown spanning multiple T-bar cells further comprised of T-bars 103 and ceiling tile 102.

Figure 6D:
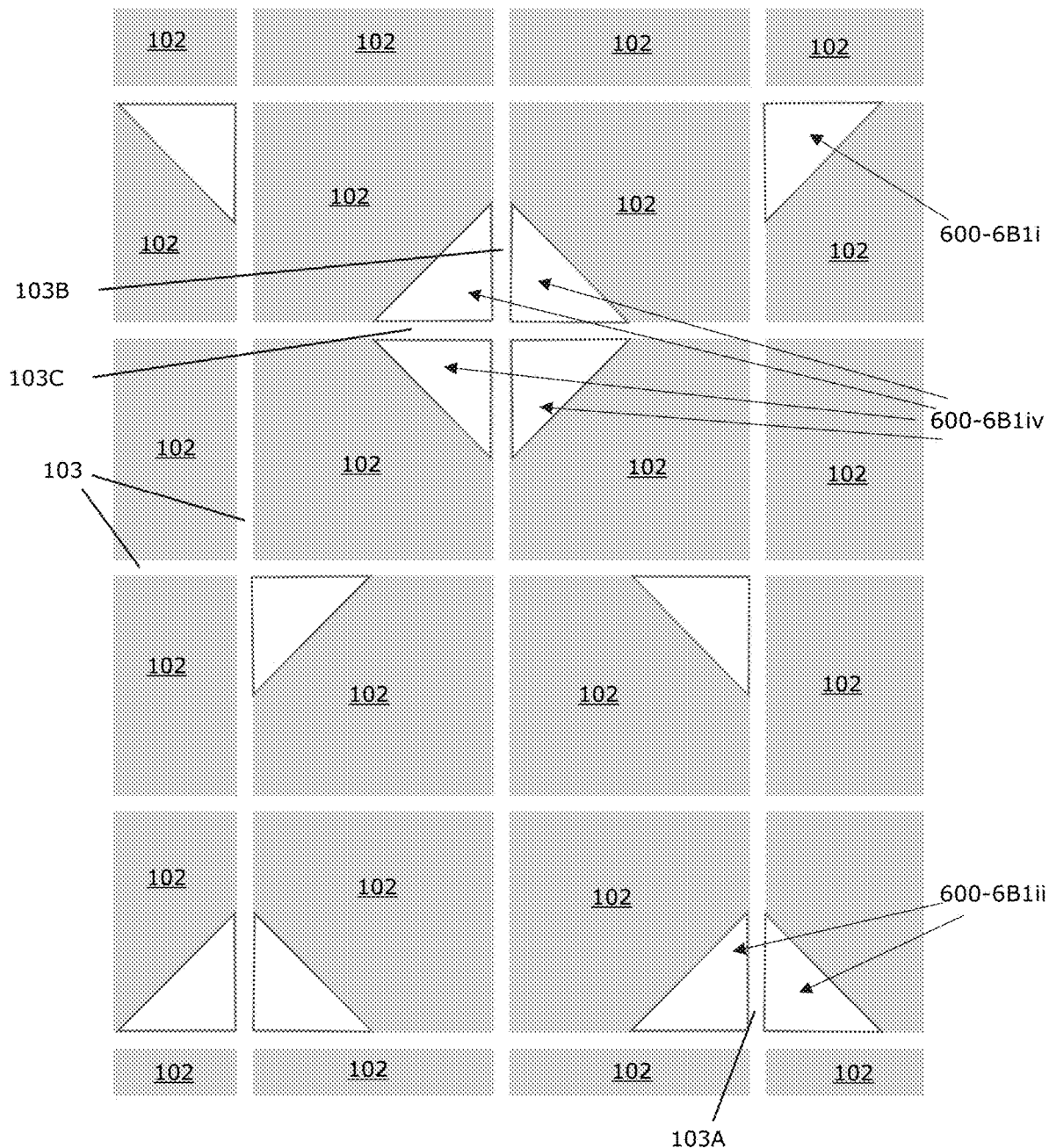
FIG. 6D is a below plan view of a ceiling grid system with installation of triangular shaped embodiment fixtures of the type shown in FIG. 6B(1).

FIG. 6D is a below plan view of a ceiling grid system with installation of multiple triangular shaped embodiment fixtures 600-B1 of the type shown in FIG. 6B1. Embodiment 600-B1i is a single triangular shaped fixture installed in a T-bar cell corner.

Embodiment 600-B1ii is cluster of two triangular shaped light fixtures installed in corners of two adjacent T-bar cells sharing a common T-bar 103A. Combining the two equilateral shaped light fixtures produces a larger combined geometry of an isosceles triangle.

Embodiment 600-B1iv is a cluster of four triangular shaped light fixtures installed at the intersection of crossing T-bars 103B and 103C. The four fixture cluster of triangular fixtures produces a larger combined square geometry.

The geometric light fixture patterns are specific embodiment examples but it is apparent that a large range of geometric shapes and patterns can be achieved in a ceiling grid layout.

Figure 7A:
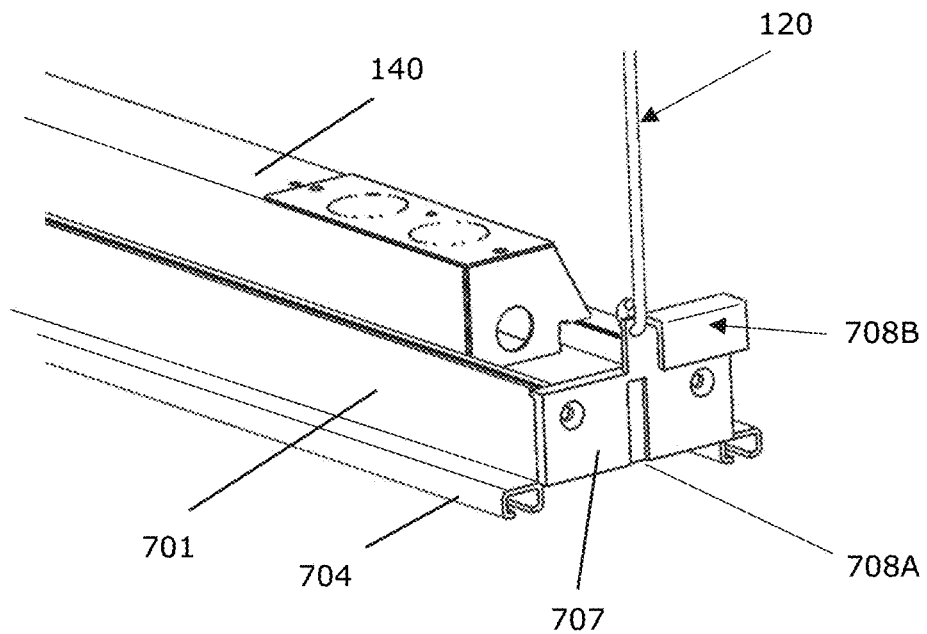
FIG. 7A is a perspective view of a linear light fixture embodiment for use in a slot style T-bar ceiling grid system.

FIG. 7A illustrates a linear light fixture embodiment for use in a slot style T-bar ceiling grid system. The elongate fixture body 701 further comprises a support feature 704 on the fixture body side portion which is configured to support a ceiling panel within a suspended ceiling grid system. The end plate 707 encloses the longitudinal end of the light fixture and further comprises end plate feature 708A which is a recessed groove for clearance of a T-bar clip protruding through a T-bar joint. Additional end plate feature 708B is a latch for mounting over a T-Bar vertical portion and is offset from the longitudinal centerline of the fixture so that an additional fixture can be mounted inline on the other side of a T-bar connection without the mounting latches from the two fixtures interfering with each other. Connecting to the end plate 707 is a suspension cable 120 for attachment to an overhead structural ceiling. Mounted on the top of the elongate fixture body 701 is a LED driver 140.

Figure 7B:
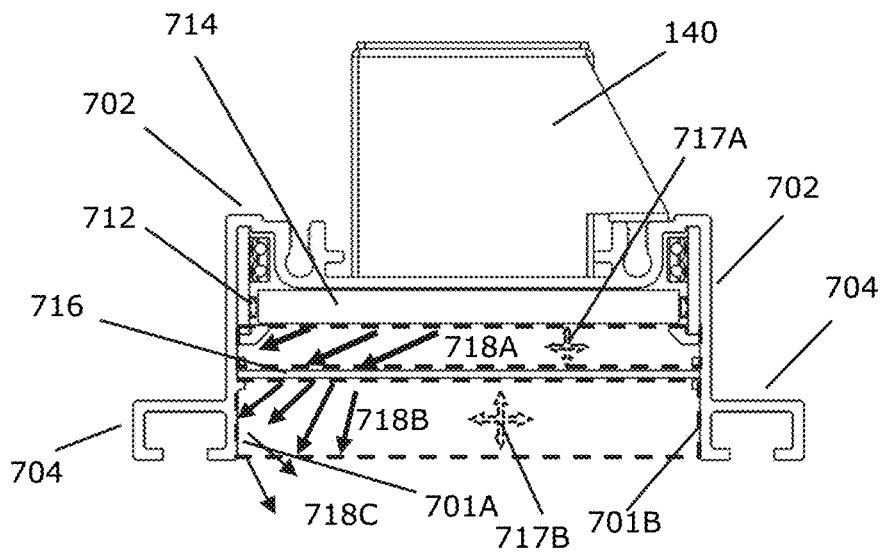
FIG. 7B illustrates a cross sectional view of double edge lit light fixture embodiment highlighting function of auxiliary optical elements in directing optical rays.
Figure 7C:
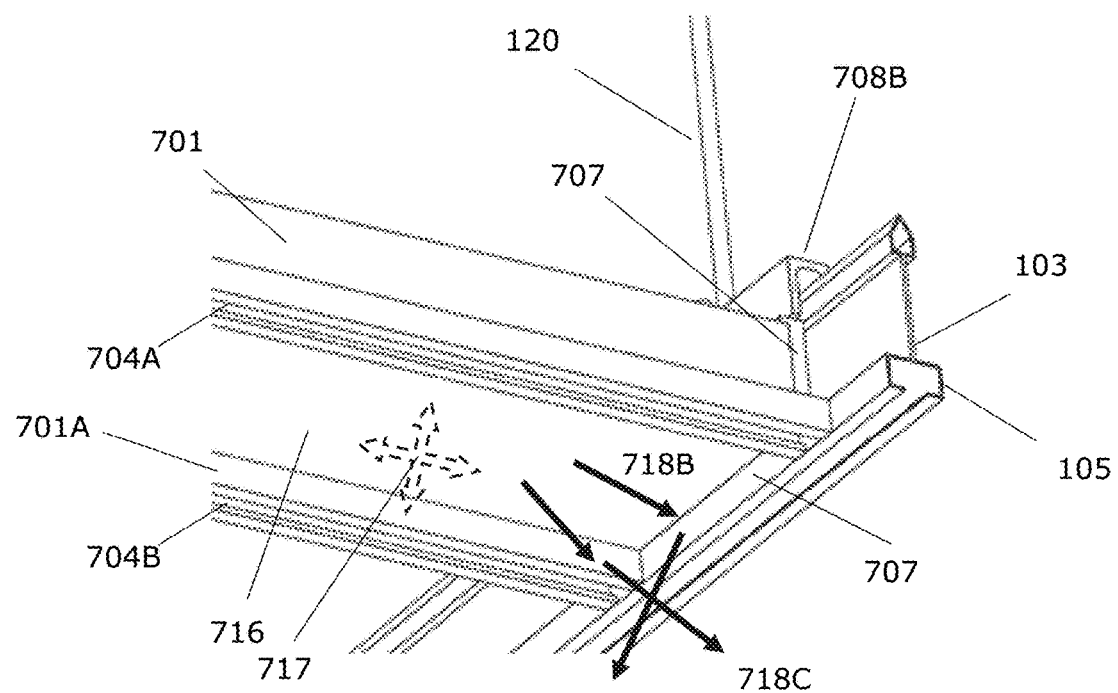
FIG. 7C illustrates the light fixture embodiment of FIG. 7B mounted in ceiling grid system highlighting optical rays reflecting off inner surface of fixture body and end plates.

FIG. 7B illustrates a cross sectional view of a double edge lit light fixture embodiment highlighting function of the auxiliary optical element in directing optical rays and FIG. 7C shows a bottom perspective view of the same light fixture embodiment mounted in a ceiling grid system. Optical rays are highlighted to characterize the path of light after it is output from the optical element 714. Optical rays 718A proceed to the auxiliary optical element 716 where they are partially scattered and redirected into rays 718B, a portion of which are further reflected from interior side wall 201A of the elongate fixture body and transformed to rays 718C. As shown in FIG. 7C, there are also light rays that reflect from the interior face of the end plate 707. The configured light fixture embodiment of FIG. 7B and FIG. 7C has both an inner optical cavity 717A which is bounded by the outer face of the optical element 714, the inner face of the auxiliary optical element 716, the elongate fixture body interior side walls 701A and 701B, and end plates 707. The outer optical cavity 717B is a volume bounded by the outer face of the auxiliary optical element 716, elongate housing fixture interior side walls 701A and 701B, and the end plates 707 of the fixture. Both optical cavities have an effect on light distribution output from the light fixture.

FIG. 7C also illustrates the light fixture embodiment of FIG. 7B mounted in a ceiling grid system by connection with a T-bar. The end plate latch feature 708B mounts over the T-bar 103 which has a T-bar horizontal portion 105 which matching the appearance of the support features 704A and 704B integrated into the side portions of the elongate fixture body 701.

Figure 7D:
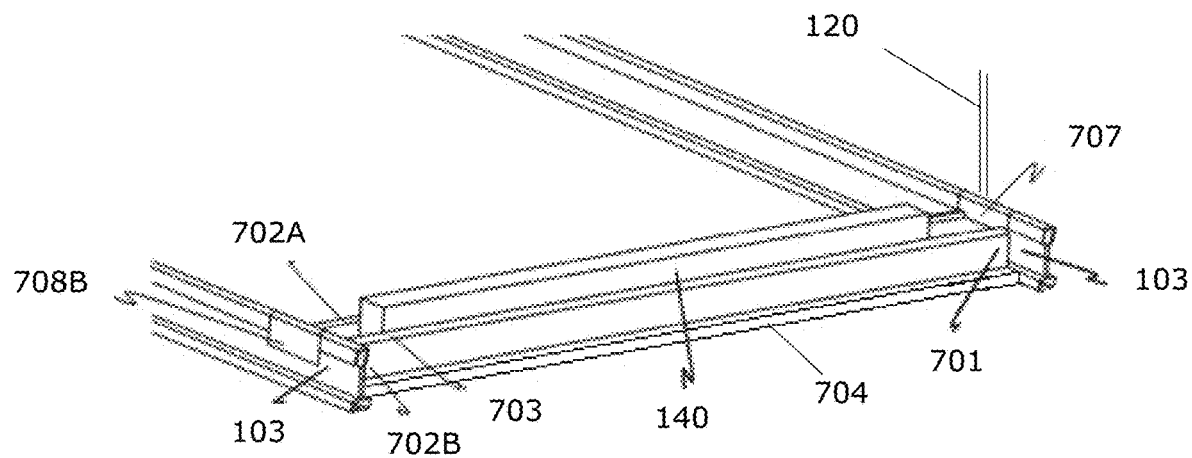
FIG. 7D illustrates mounting of light fixture embodiment in ceiling grid supported at each end of its elongate body.

FIG. 7D is an overhead perspective view illustrating mounting of the light fixture embodiment of FIG. 7B in ceiling grid supported at each end of its elongate body.

Figure 7E:
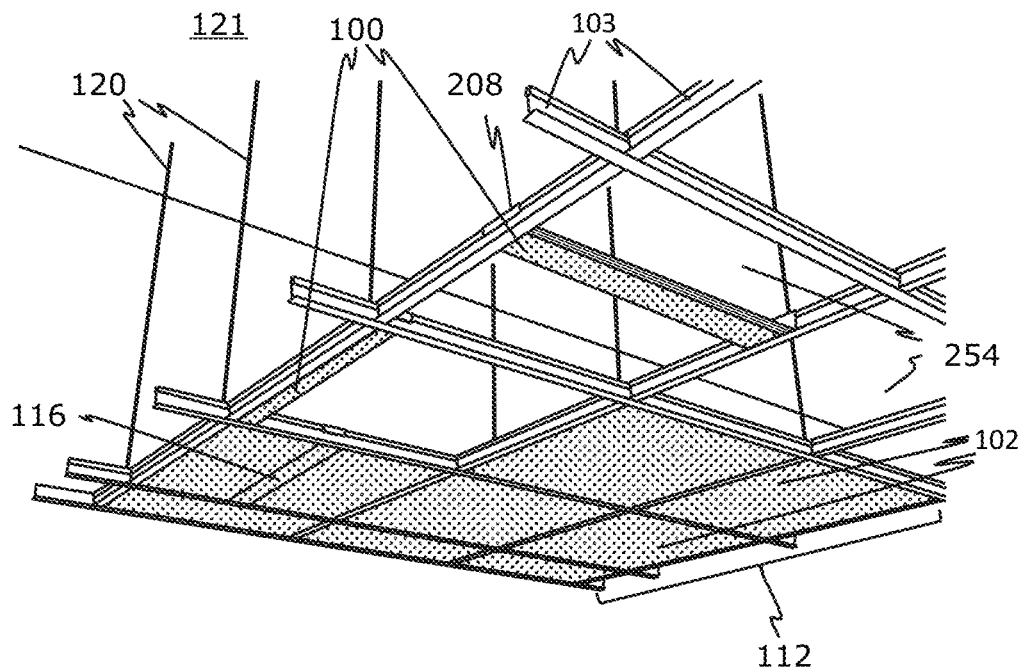
FIG. 7E is a below ceiling plane perspective view of an exemplary suspended ceiling grid arrangement with embodiment light fixtures installed in some T-bar cells.

FIG. 7E is a below ceiling plane perspective view of an exemplary suspended ceiling grid arrangement with embodiment light fixtures 100. As shown, the suspended ceiling grid arrangement includes a plurality of suspension wires 120 coupled to a structural ceiling 121, T-bars 103 are supported by the suspension wires 120, and a plurality of ceiling panels 102 arranged in an array of cells 254 defined by the T-bars 103. In operation, the weight of the ceiling panels 102 is borne by the T-bars 103. Furthermore, lower horizontal downward-facing portions of the T-bars 106 define a general ceiling plane 112 for the plurality of ceiling panels. The suspended ceiling grid arrangement includes embodiment light fixtures 100 with end plate mounting features 208 arranged on the T-bars 103. The end plate features 208 may relate to clamps, hooks and the like, that are generally used to couple fixtures to ceiling grid T-bars 103.

The term "general ceiling plane" used herein relates an imaginary plane parallel to the structural ceiling 104, formed by lower surfaces of the T-bars 103. Furthermore, the axes of the T-bars 103 are coplanar to the general ceiling plane 112. Additionally, the general ceiling plane 112 is typically parallel to floor of, for example, a house. Optionally, the general ceiling plane 112 may be at a height 2.5 to 3 meters above the floor of the house.

Figure 7F:
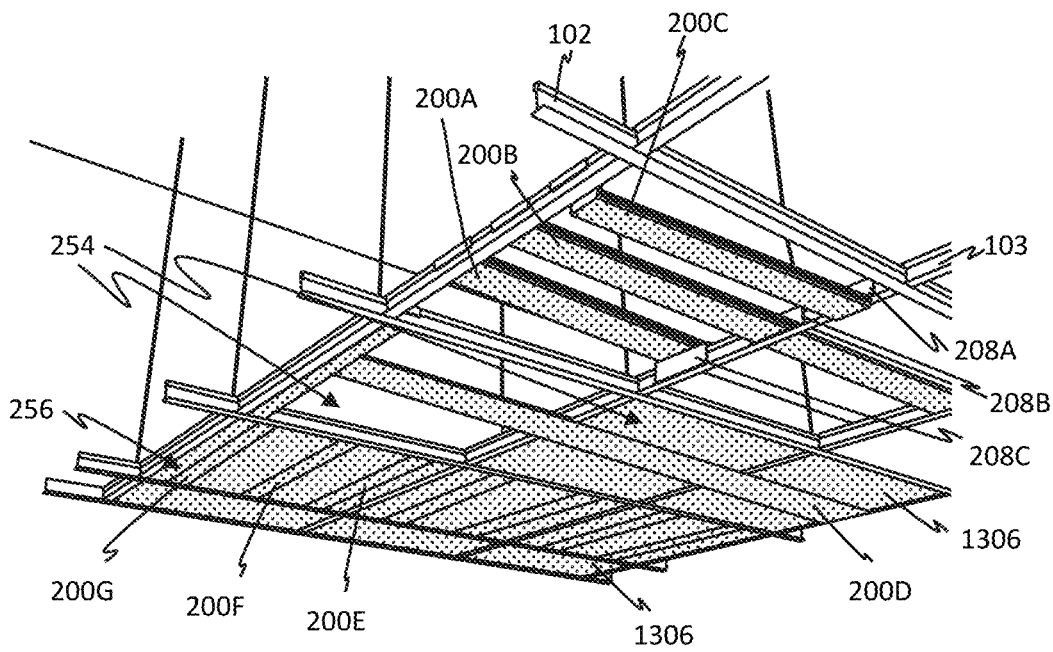
FIG. 7F is a below ceiling plane perspective view of an exemplary suspended ceiling grid arrangement with embodiment light fixtures including single and multi-cell arrangements.

FIG. 7F is a below ceiling plane perspective view of an exemplary suspended ceiling grid arrangement with embodiment light fixtures. There are a plurality of embodiment fixtures that are arranged at various orientations with respect to T-bars 103 and ceiling panels 102 of the suspended ceiling arrangement, supported by endplate supporting features 208. Furthermore, the embodiment light fixtures 200A-G are arranged in a spatially sequential manner having a base at a height higher than the general ceiling plane (modular functional fixture 200A), a base at a height of the general ceiling plane (modular functional fixture 200B), and a base at a height lower than the general ceiling plane (modular functional fixture 200C). Moreover, in some exemplary configurations, multiple elongate functional fixtures are optionally arranged sequentially along consecutive ceiling cells 254 to form an extended modular functional fixture 200D, wherein the elongate functional fixtures optionally have a common electrical supply connected in a daisy-chain manner. Furthermore, in another exemplary configuration, the embodiment fixtures 200E-G are arranged in a single cell 256 of the suspended ceiling arrangement.

Figure 8A:
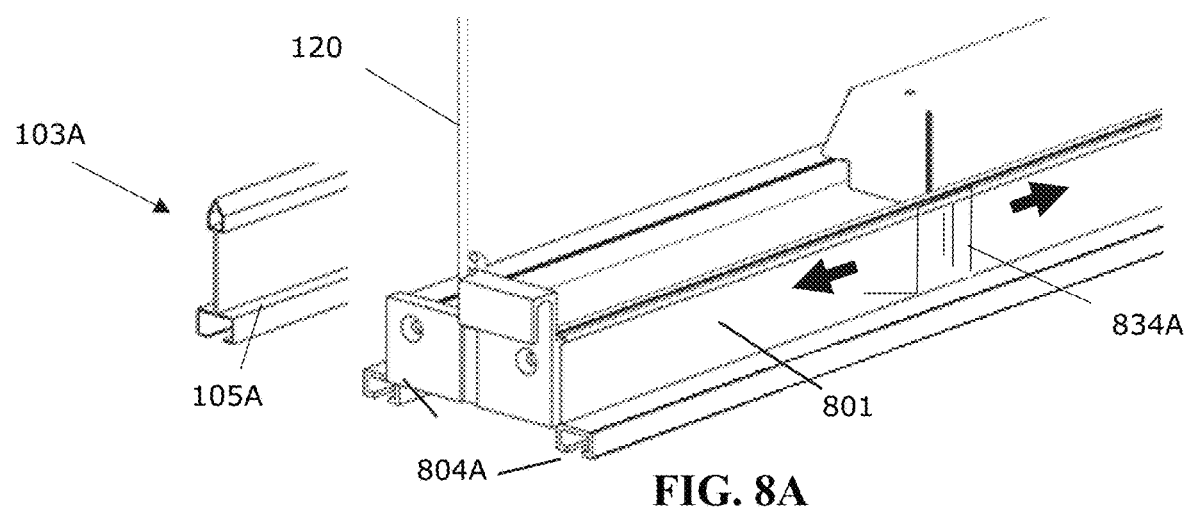
FIG. 8A, FIG. 8B and FIG. 8C are perspective views of an embodiment light fixture with 3 different anchoring mounts.
Figure 8B:
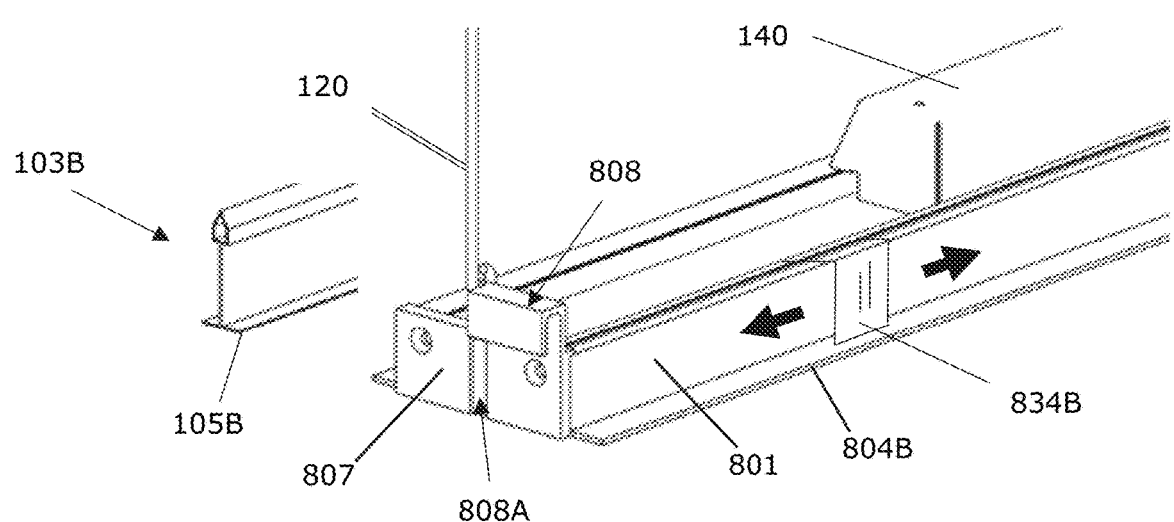
Figure 8C:
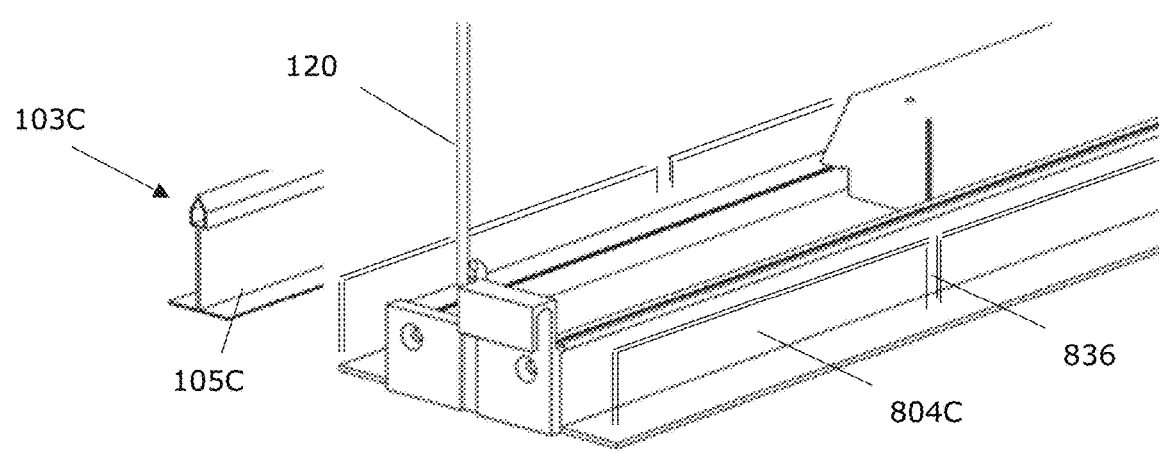

FIG. 8A, FIG. 8B and FIG. 8C are perspective views of an embodiment light fixture with 3 different anchor mounts for different methods of connection with the ceiling grid T-bar system. FIG. 8A and FIG. 8B show movable mounting clip 834 which is used for connection to ceiling grid T-bars. FIG. 8C has a mounting anchor 836 which is a slot in the elongate housing vertical support feature 804C for attachment with a ceiling grid T-bar. The light fixture embodiment of each FIG. 8 version has a different support feature 804 as a portion of the elongate housing 801. Support feature 804A is a slot type, support feature 804B is a narrow flat type, and support feature 804C is wide flat type with further vertical portion similar to a wall angle component. In each case, the elongate body support feature portion matches a corresponding T-bar horizontal portion; 804A/105A, 804B/105B, 804C/105C.

Figure 9A:
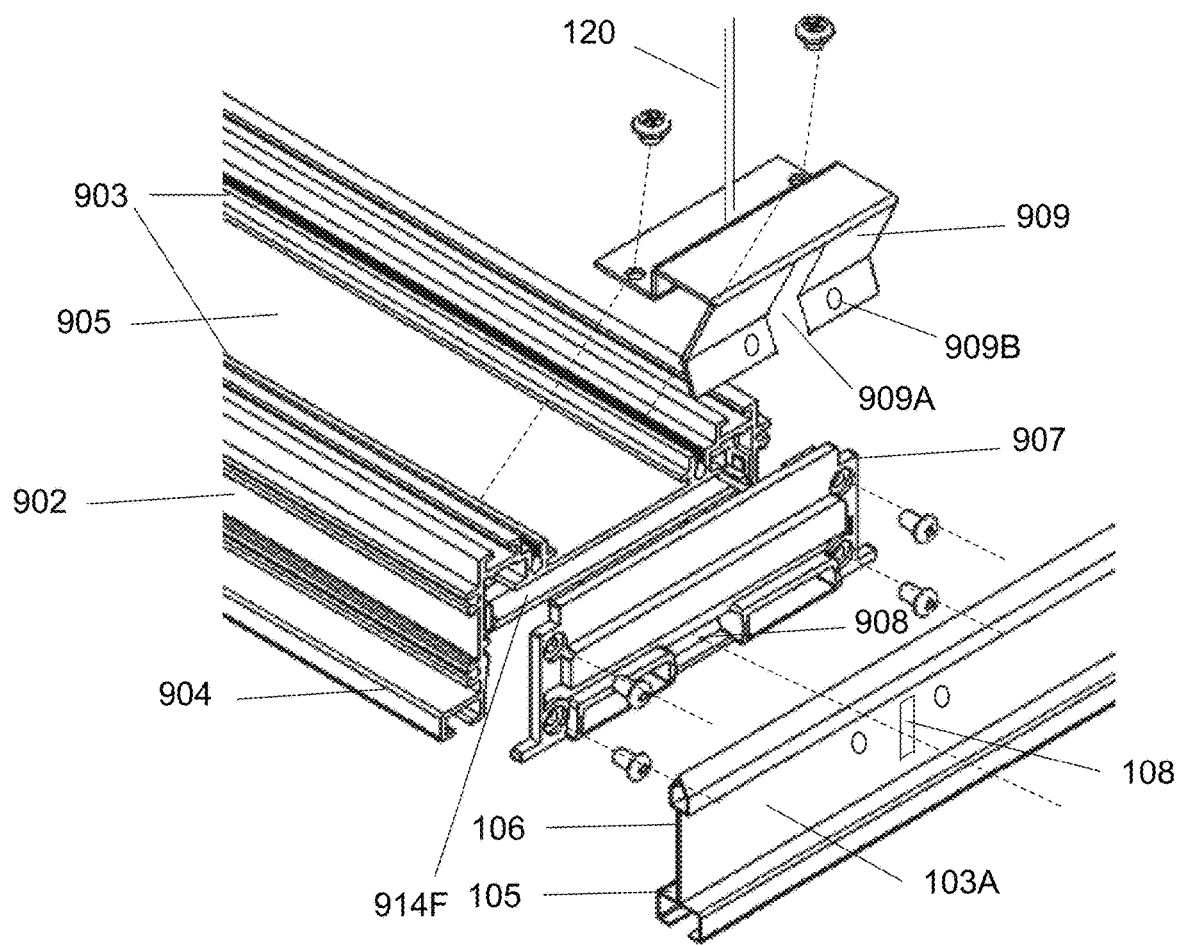
FIG. 9A is an overhead exploded perspective view of an embodiment light fixture for T-bar in-line mounting.
Figure 9B:
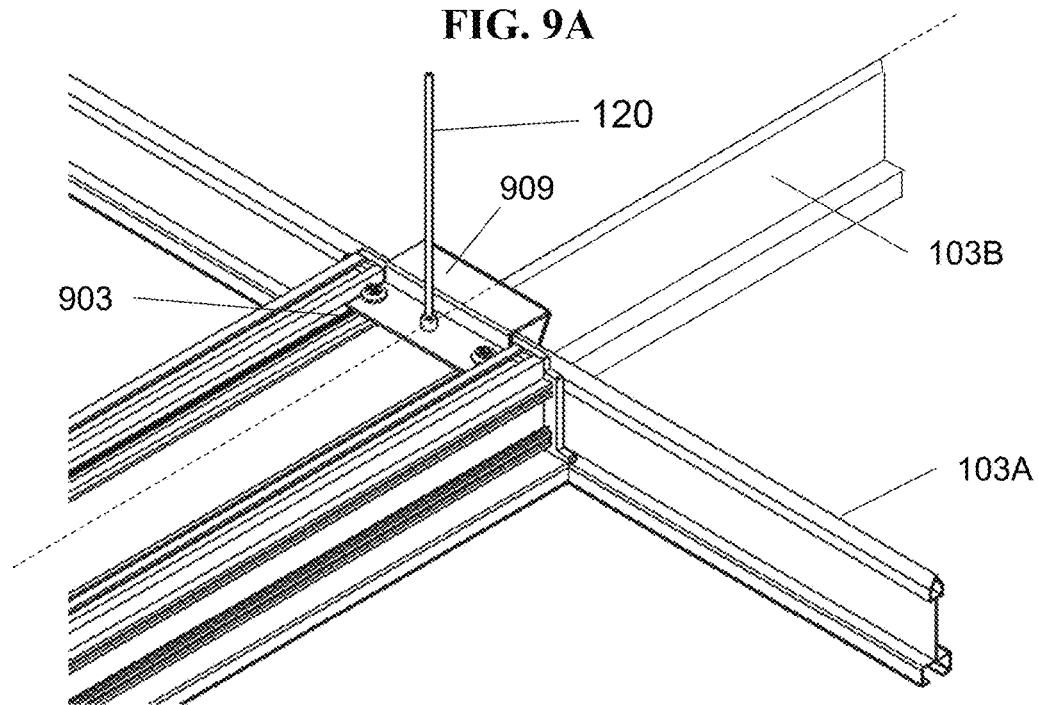
FIG. 9B is and overhead perspective view of a light fixture embodiment with in-line mounting of the light fixture with a T-bar on the opposing side of the mounting T-bar.

FIG. 9A provides an isometric view of a light fixture embodiment with in-line mounting of the light fixture with a slot feature on the mounting T-bar. The end plate 907 of the light fixture is configured with a centrally located cavity 908 so as to accommodate the clip from the perpendicularly connecting T-bar on the opposite side of the mounting T-bar. In such a mounting scenario the clip would be pushed through the slot 108 on the mounting T-bar 103A. A retaining bracket 909 is screwed on the light fixture body by screws that locate into screw boss features 903 on each of the fixture side portions. An important feature of the retaining bracket is the groove or slot 909A on the side that is mounted opposite to the light fixture. It is important to be able to accommodate the vertical portion of a T-bar in the event that one is mounted as shown in FIG. 9B. It is also possible to configure the retaining bracket so as it has retaining features on one side of the slot or groove, similarly to the end plate configuration shown in FIG. 9A. As illustrated, the retaining bracket 909 has holes 909B for alignment, positioning and diameter fit with specific fasteners such as rivets or screws used for additional securement or the connection with a T-bar 103A.

FIG. 9B illustrates the ceiling grid system arrangement wherein the light fixture embodiment is mounted onto a T-bar 103A in-line with a T-bar 103B connected to the same T-bar from the opposite side.

Figure 9C:
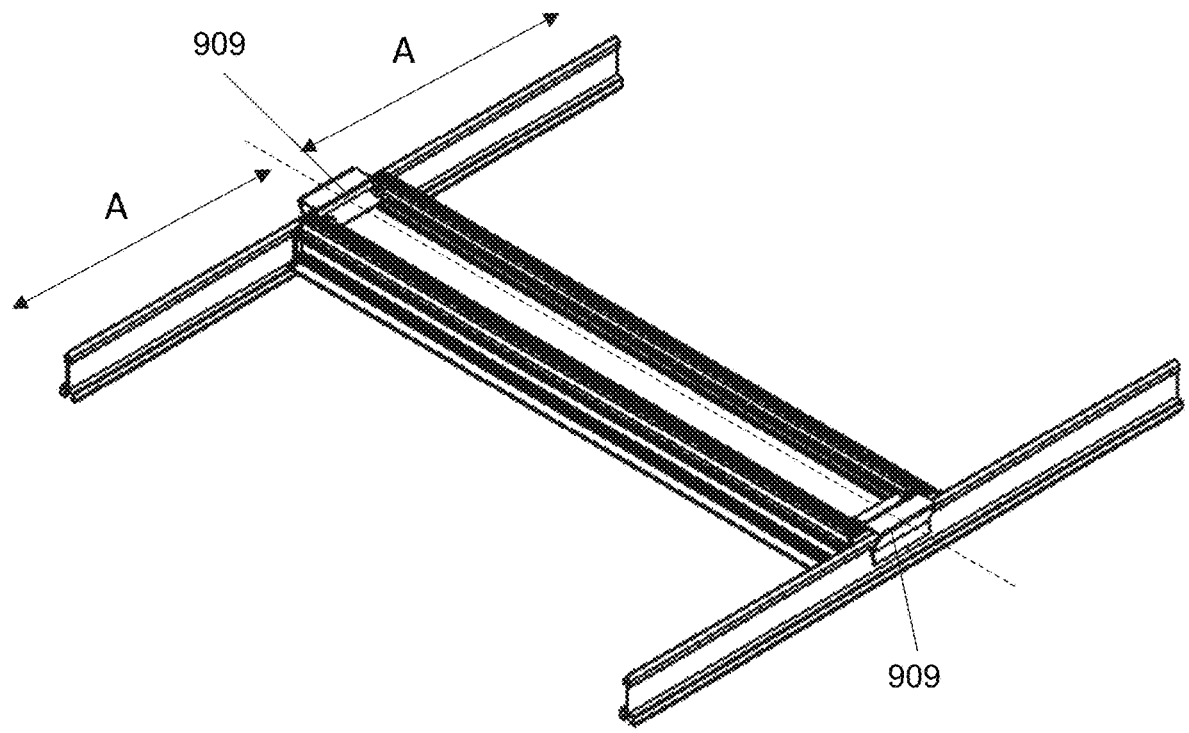
FIG. 9C illustrates a light fixture embodiment positioned in the center of two mounting T-bars at opposing longitudinal ends.

FIG. 9C illustrates a light fixture embodiment positioned in the center of two mounting T-bars at opposing longitudinal ends such that the distance A from the center of the light fixture axis or end plate to the each end of the mounting T-bar is the same.

Figure 9D:
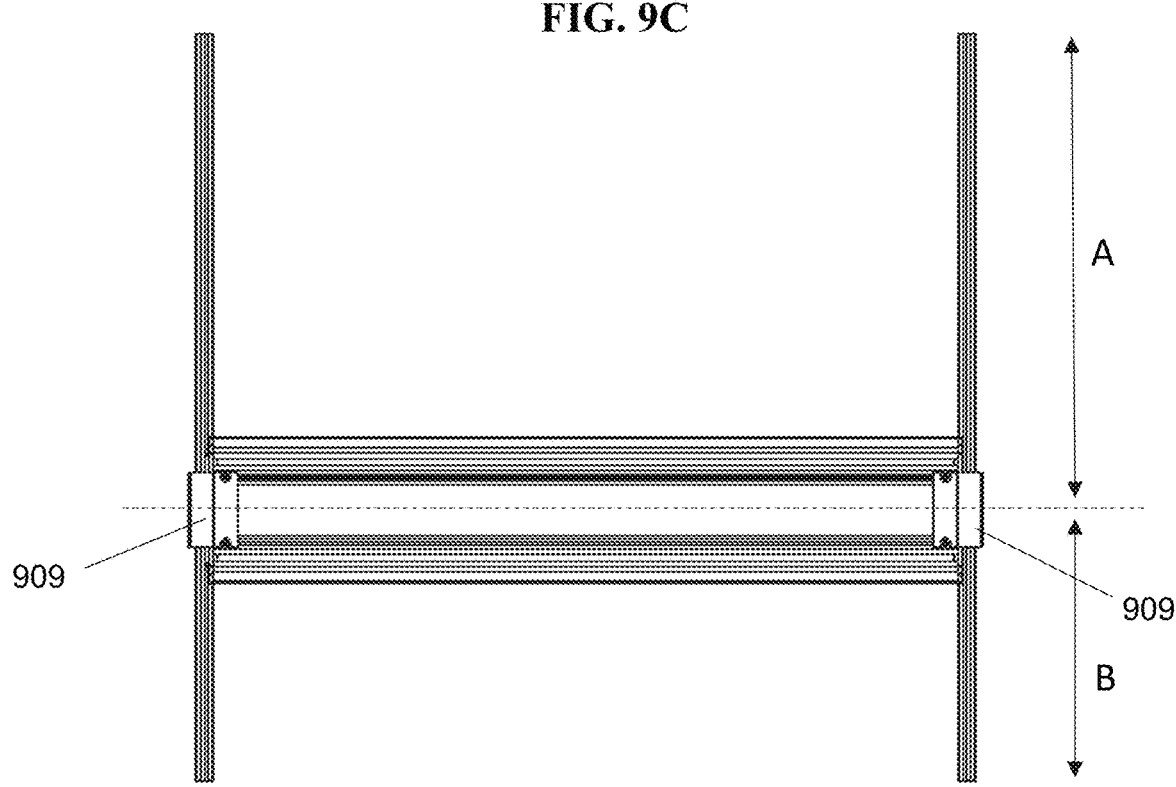
FIG. 9D illustrates a light fixture embodiment moved so as to be positioned away from the center of two mounting T-bars at opposing longitudinal ends.

FIG. 9D illustrates the light fixture embodiment moved so as to be positioned away from the center of two mounting T-bars at opposing longitudinal ends. In this embodiment the distances of the light fixture from one end A to the other end B are different. The ability to move the light fixture in such a manner can be important in some situations.

Figure 10A:
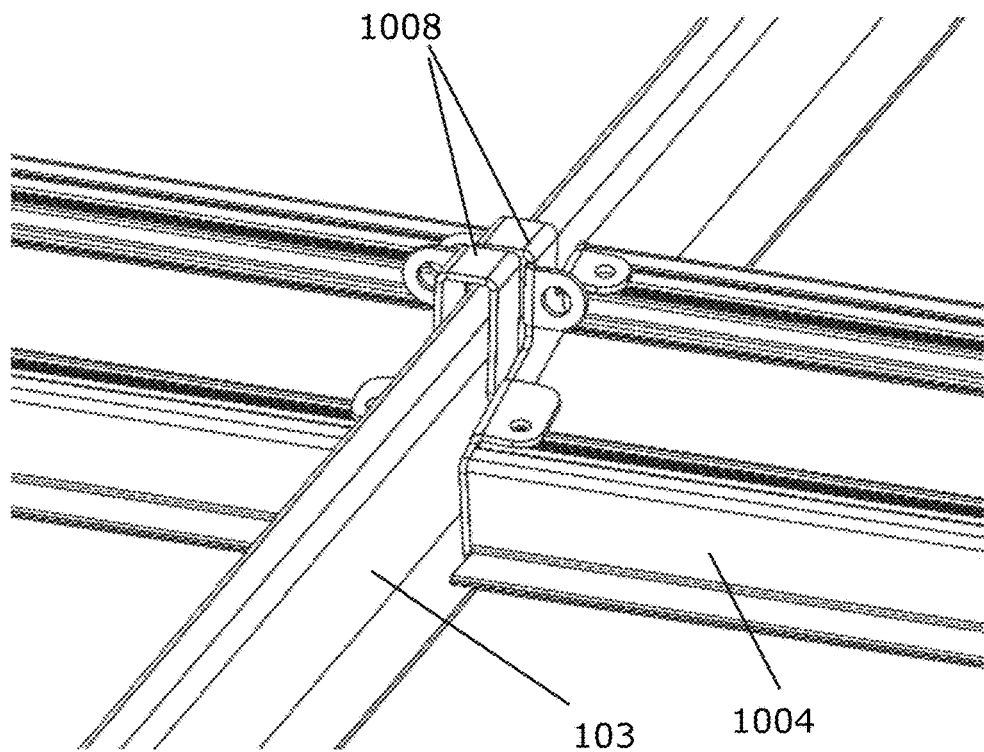
FIG. 10A and FIG. 10B are perspective views of a light fixture embodiment with offset mounting clips for maintaining longitudinal alignment.
Figure 10B:
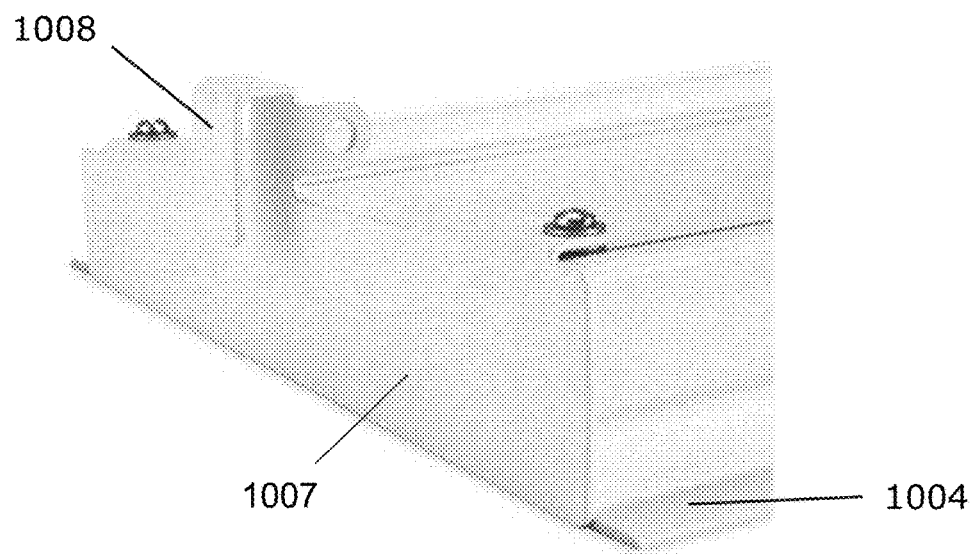

FIG. 10A and FIG. 10B are perspective views of a light fixture embodiment with offset mounting clips for maintaining longitudinal alignment. The end plate mounting feature 1008 is offset from the longitudinal center of the fixture in order to allow two light fixtures to align on opposing sides of the T-bar 103 and provide a continuous run appearance when viewed from within the installation room.

FIG. 10Ci and FIG. 10Cii are cross sectional drawings of two light fixture embodiments with edgelit primary optical elements 1014 illustrating how internal 1017A and external 1017B optical cavities are formed with boundary defined by the ceiling grid plane 112, the internal dimensions of the elongate fixture body 1001 and the internal face of the end plate 1007, shown by the hashed line shading in the diagrams. The boundary between internal and external optical cavities is determined by the use and position of an auxiliary optical element 1016.

FIG. 10Ci is a cross section view of a single edge-lit light fixture embodiment with an obliquely angled optical element. In FIG. 10Ci the primary optical element 1014 is a high clarity (clarity=100), low haze acrylic light guide with linear prismatic features on the surface closest to the reflector 1015 for light extraction and redirection. The primary optical element 1014 is supported by the elongate fixture body at an oblique angle to the ceiling grid plane 112 and it is lit from one edge by an LED board 1012 positioned proximate to its input face and the reflector 1015 extends to cover both the inner adjacent face to the input face and the non-adjacent opposing face.

FIG. 10Cii is a cross section views of a double edge-lit light fixture embodiment with an obliquely angled optical element of a "diffuse prism" configuration with linear pyramid structures on its inner face. In this embodiment shown the overall height of the elongate body is less than the height of a T-bar 103 but the side portions 1002A and 1002B of the elongate fixture body are configured differently with the overall height of one side being different to the height of the opposing side. As a result the light fixture body backplane 1005, primary optical element 1014, reflector 1015 and auxiliary optical element 1016 are all angled or tilted relative to the ceiling grid plane. In this embodiment the ceiling grid plane could be either ceiling plane 112A wherein the top surface of the lateral support feature 1004B is configured to support the bottom surface of a rectangular ceiling tile. Alternatively the ceiling plane could be ceiling grid plane 112B if a tegular ceiling tile was used as shown in FIG. 13B wherein the bottom of the slotted style T-bar feature is flush with the ceiling grid plane. In the embodiment shown in FIG. 10Cii, the lateral support features 504B are configured to be functionally equivalent to the horizontal portion of a 9/16" slotted style T-bar.

In FIG. 10Cii the primary optical element 1014 is a low clarity (clarity=3.5), high haze edgelit diffuser also comprising acrylic as the bulk material with dispersed regions of volumetric light scattering material. In this embodiment the primary optical element 1014 is lit from two edges by LEDs 1012 on LED boards 1011 and the reflector 1015 extends to cover only the inner adjacent face to the input face.

Figure 10D:
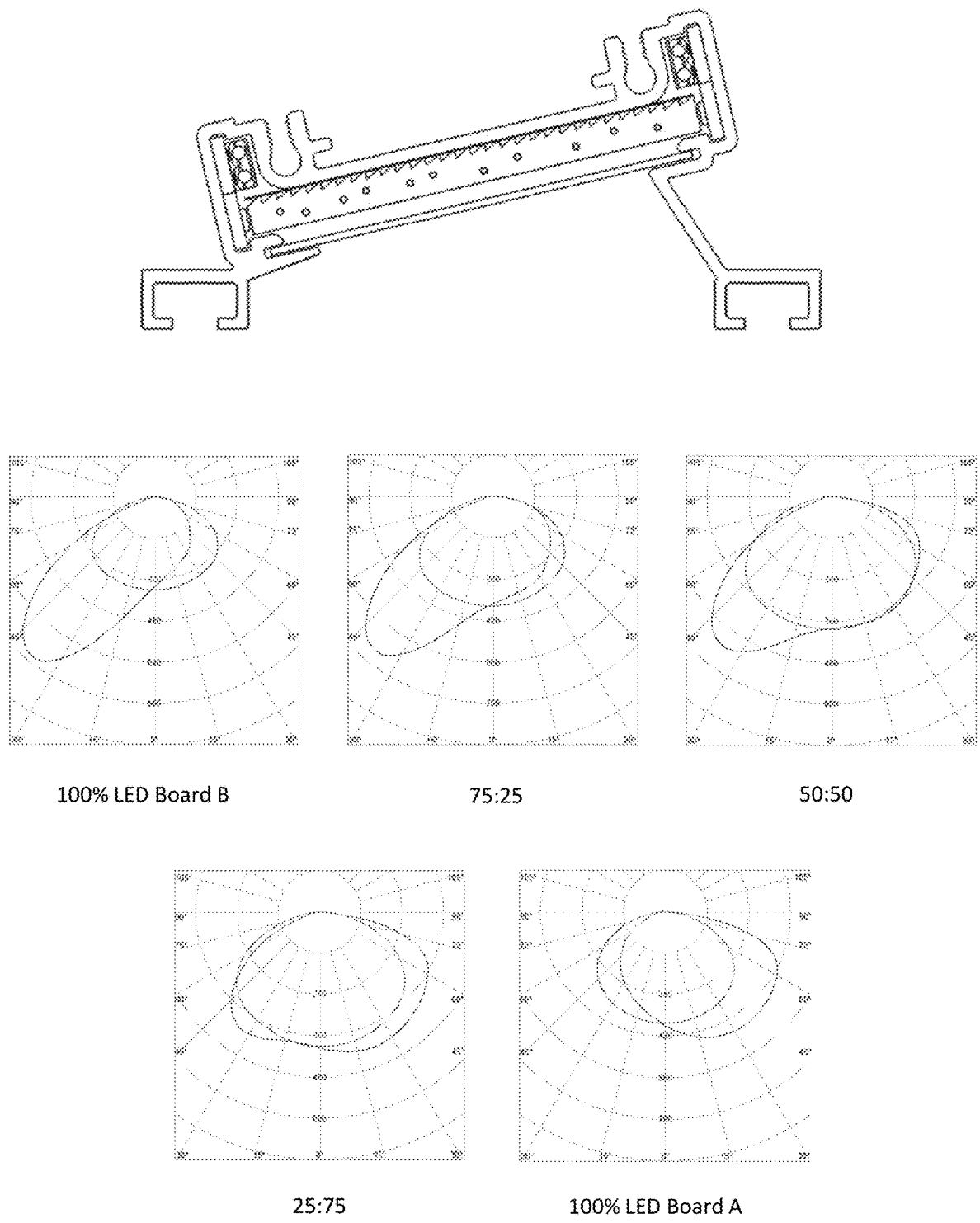
FIG. 10D illustrates various exemplary polar plots for a double edge-lit light fixture embodiment with an obliquely angled optical element.

FIG. 10D illustrates various polar plots for a double edge-lit light fixture embodiment of FIG. 10Cii with an obliquely angled optical element and obliquely angled auxiliary optical element 1016A that also serves as the output face of the light fixture. In this embodiment the primary optical element 1014 is "diffuse sawtooth" configuration with light scattering and the inner face comprises linear "sawtooth" shaped prism features. The sawtooth shape is chosen because the effective profile is selectively different depending upon whether the light enters an input face on one side 1002A versus the other 1002B. The auxiliary optical element is a relatively high clarity PMMA2020 diffuser. This auxiliary optical element was chosen because the higher clarity preserves more of the asymmetry and directionality of the light output from the optical element. An alternative position for the auxiliary optical element is shown as 1016B. In this configuration the auxiliary optical element is positioned horizontally and recessed by the height of the support feature 1004B. The polar plots cover five different ratios of electrical power applied to the LED boards on each side of the primary optical element. When 100% of power is applied to the LED board on side B 1002B the light distribution is a narrow beam with approximately 40 degrees of tilt away from the vertical on its opposing side. This changes to become a much wider beam tilted by approximately 45 degrees in the opposite direction when 100% of the power is applied to side A, 1002A. Additionally it is shown that the beam is somewhat symmetrical and centered on the vertical when 25% of power is applied to side B and 75% is applied to side A.

Figure 10E:
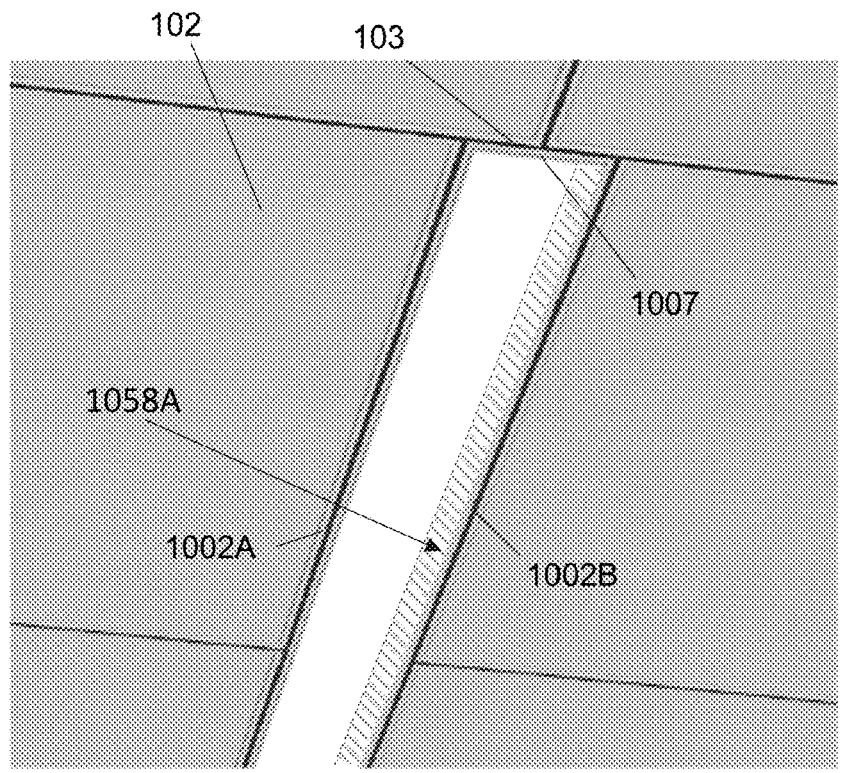
FIG. 10E illustrates a light fixture embodiment with a recessed auxiliary optical element and exposed internal reflective surface.

FIG. 10E illustrates the light fixture embodiment of FIG. 10A with a tilted recessed auxiliary optical element and exposed internal reflective surface. The fixture is mounted onto a T-bar 103 by use of its end plate 1007 and the T-bar features 1002A and 1002B replace T-bars on either side of its elongate body In this embodiment the objective of the internal reflective surface is to provide an attractive change in luminance and interesting design feature. As noted in FIG. 10Cii it is also possible to locate the auxiliary optical element 1016B in a horizontal recessed position.

Figure 10F:
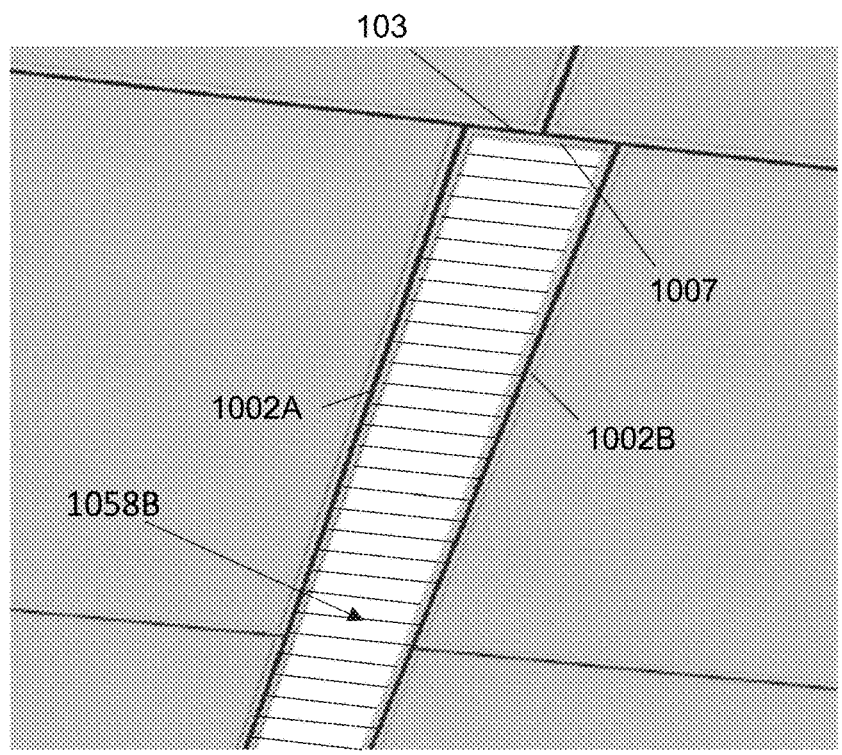
FIG. 10F illustrates a light fixture embodiment with a fitted baffle over the face of the recessed auxiliary optical lens to reduce glare and spread of light in the longitudinal axis of the light fixture.

FIG. 10F illustrates the light fixture embodiment of FIG. 10A with a fitted baffle 1058 over the face of the recessed auxiliary optical element to reduce glare and spread of light in the longitudinal axis of the light fixture.

Figure 11A:
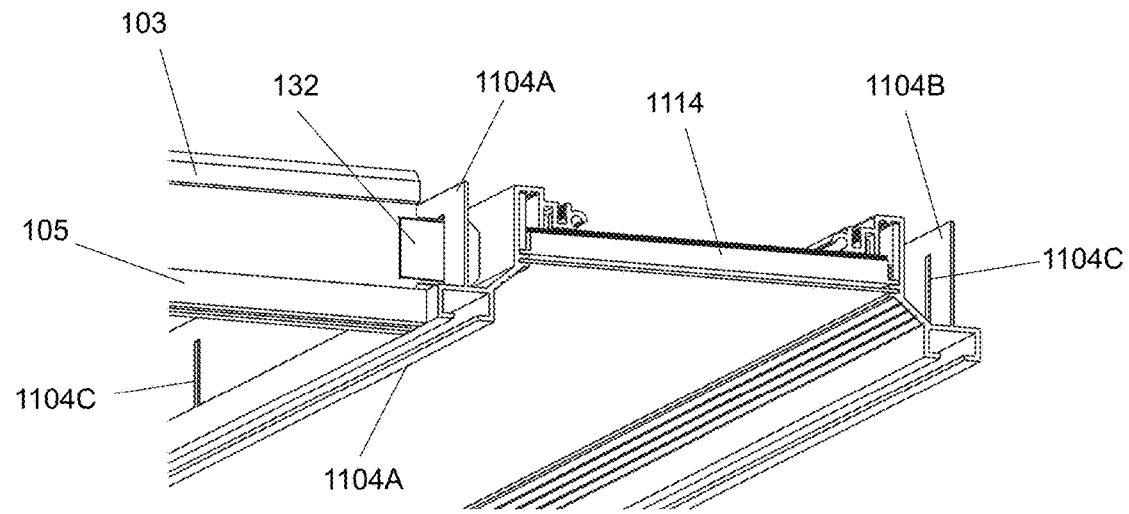
FIG. 11A is a perspective view of an edgelit embodiment light fixture with T-bar clip connection to a perpendicularly mounted T-bar.

FIG. 11A is a perspective view of an embodiment light fixture with T-bar clip connection to a perpendicularly mounted T-bar. In this view the clip 132 from the perpendicularly positioned T-bar 103 is connected through a slot feature 1104C in the vertical portion 1104B of the support feature of the elongate fixture body. The slot feature in this example has a closed upper face but in practice this feature could have an open top and be more "U" shaped. Also visible in this illustration is a slot feature 1104C on the opposite side portion that could be used to mount another T-bar from that side. Also shown is the horizontal portion of the support feature 1104A which is configured to replicate the appearance of the horizontal portion 105 of the perpendicularly positioned T-bar 103.

T-bar clips 132 in the multiple illustrated embodiments are shown in a simplified basic geometry. In practice, T-bar clips have a number of detailed features to facilitate a connection in a manner compliant with fire safety and seismic codes. Generally, code compliant connections need to be structurally secure but allow enough movement for some joint mobility and thermal expansion. Furthermore, various adapter clips can be used in making secure code compliant connections including but not limited to the following types; single tee adapter clip, beam end retaining clip, grid wall attachment clip, and cross tee adapter clip. In alternative embodiments, these types of adapter clips can be utilized in joining ceiling grid T-bars with a suitably configured vertical portion of an embodiment light fixture elongate body. Some adapter clips such beam end retaining clip and grid clip wall attachment are suitable for sliding onto the top of an elongate body vertical portion while other types such as single tee adapter clip are designed to mount through a slot. In general, adapter clips typically have at least one hole sized and located for placement of rivets or screws for securing of connection.

Figure 11B:
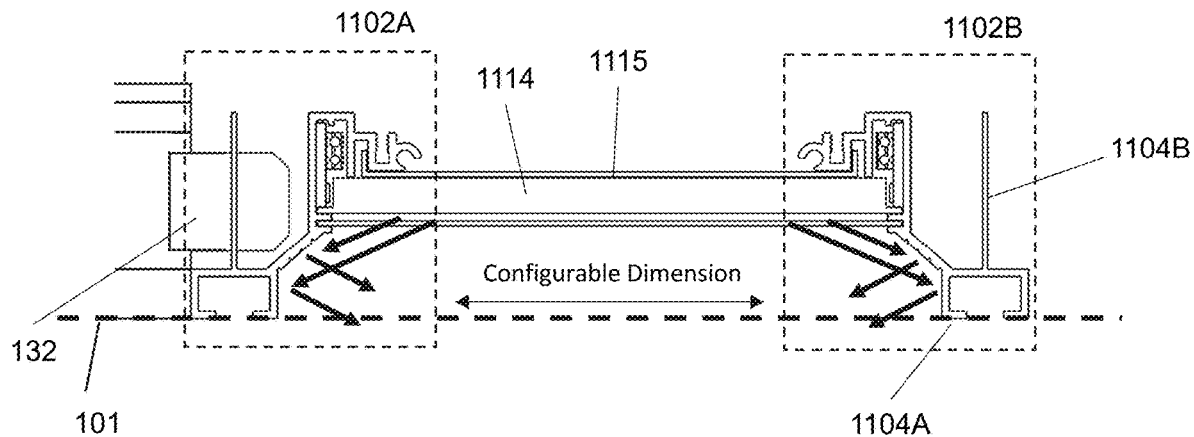
FIG. 11B is a cross-section view of a double edge-lit light fixture embodiment wherein the T-bar features include a vertical portion for T-bar attachment.

FIG. 11B is a cross-section view of a double edge-lit light fixture embodiment wherein the T-bar features include a vertical portion for T-bar attachment. The light fixture has a height less than the height of a T-bar wherein the T-bar features within each side portion, denoted as Side A, 1102A and Side B, 1102B of the elongate fixture body are configured to include a vertical portion 1104B in addition to the lateral support portion 1104A. The vertical portion 1104B is configured to receive the clip from an additional perpendicularly positioned T-bar. In this embodiment the auxiliary optical element is positioned close to the output face of the optical element so as to maximize the amount of its regress. The resultant fixture has two internal reflective surfaces, one being an angled surface with light redirecting features and the other being a vertical surface approximating the height of the T-bar slot feature. Light output from the optical element is modified by the auxiliary optical element so as to reflect of these two surfaces. This is shown by the arrows in FIG. 11A. In this embodiment the overhang extends from the input face of the optical element and wraps around the bottom edge of the LED board. In this embodiment the elongate body backplane is configurable, meaning that the distance between the two side portions can be altered.

Figure 11C:
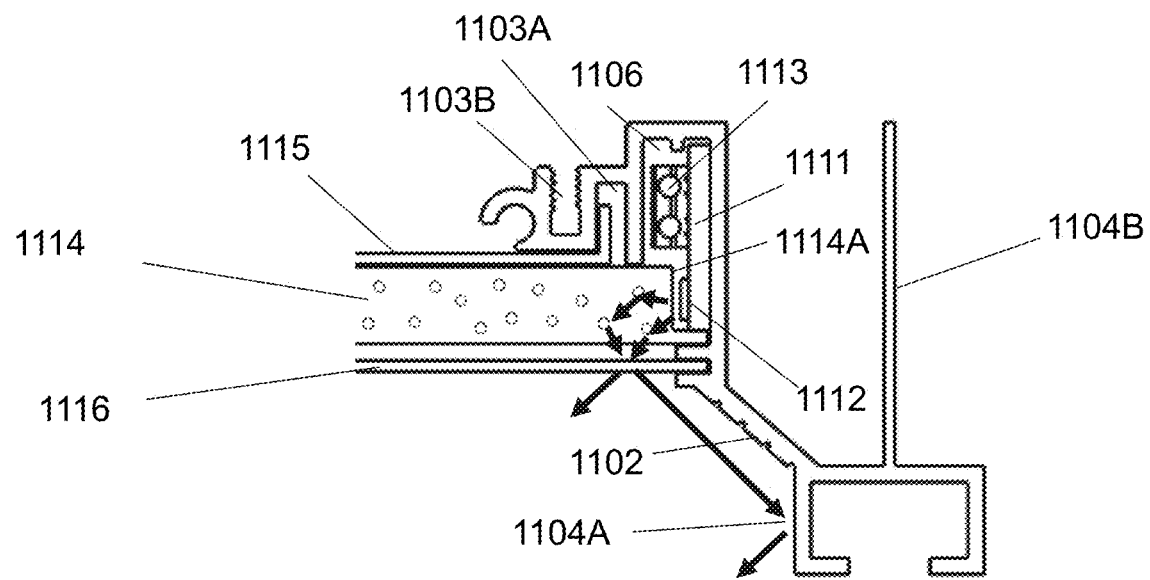
FIG. 11C is an enlargement view of FIG. 6B showing the region around one of the input faces of the optical element.

FIG. 11C is an enlargement view of FIG. 11B showing the region around one of the input faces of the optical element and is a close up view of the side portion denoted as Side B, 1102B. The side portion housing additionally comprises a vertical groove feature 1103A and the back reflector 615 is bent along its edge so that the bent edge locates into this vertical groove feature. The same configuration is applied to the opposing side portion, Side A, 1102A. When the fixture is assembled the bent edge of the reflector 1115 holds the two side portions in parallel longitudinal alignment. In such a manner the width of the fixture backplane can be easily changed by changing the width of the reflector. End plates on each longitudinal end of the fixture further aid alignment and provide rigidity. Additionally a screw boss feature 1103B is incorporated into the side portion cross section for the purpose of both attaching the end plate and attaching more brackets as needed along the longitudinal length of the light fixture to further hold the side portions in accurate parallel alignment. Further shown is scattering of light that enters the optical element input face. A portion of light is scattered and outputs the optical element output face before being further modified by the auxiliary optical element 1116 such that a portion of the light is further reflected of internal surfaces 1102 and the support feature 1104A of the side portions of the light fixture body.

Figure 11D:
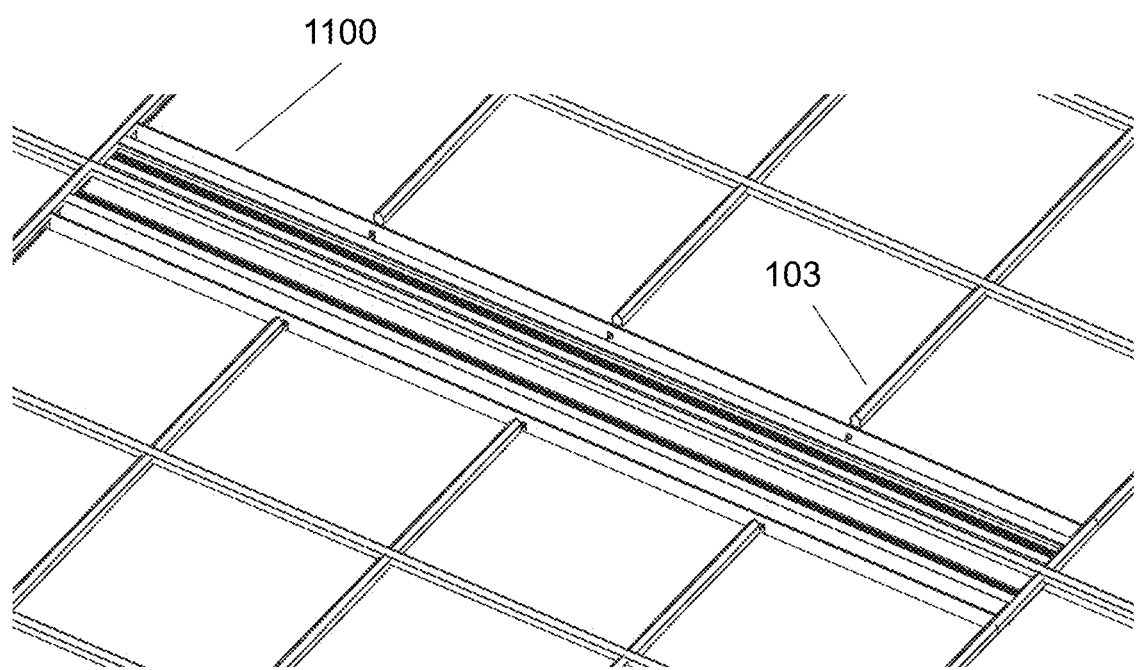
FIG. 11D is an illustration of an 8 ft light fixture embodiment mounted into a 2×2 ceiling grid layout showing perpendicularly positioned T-bars connected along the length of the fixture body.

FIG. 11D is an illustration of an 8 ft light fixture embodiment mounted into a 2×2 ceiling grid layout showing perpendicularly positioned T-bars connected along the length of the fixture body.

Figure 11E:
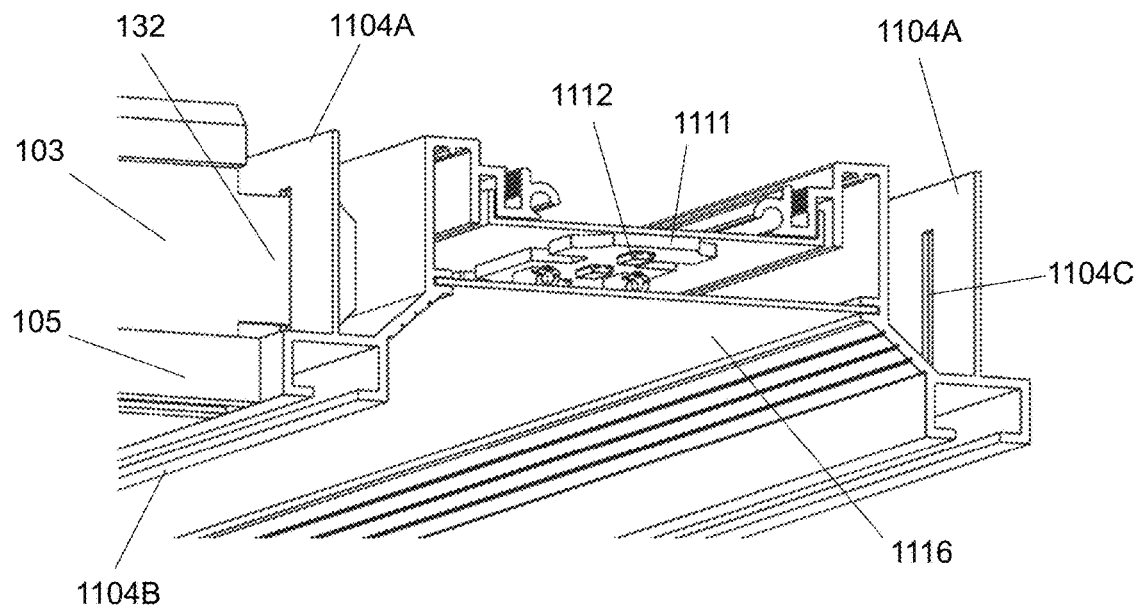
FIG. 11E is a perspective view of a direct lit embodiment light fixture with T-bar clip connection to a perpendicularly mounted T-bar.

FIG. 11E is a perspective view of a direct lit embodiment light fixture with T-bar clip connection to a perpendicularly mounted T-bar which is structurally similar to the edge lit light fixture embodiment of FIG. 11A but with a printed circuit board 1111 and LED light sources 1112 that are arranged to directly face in the transmissive outer lens 1116.

Figure 11F:
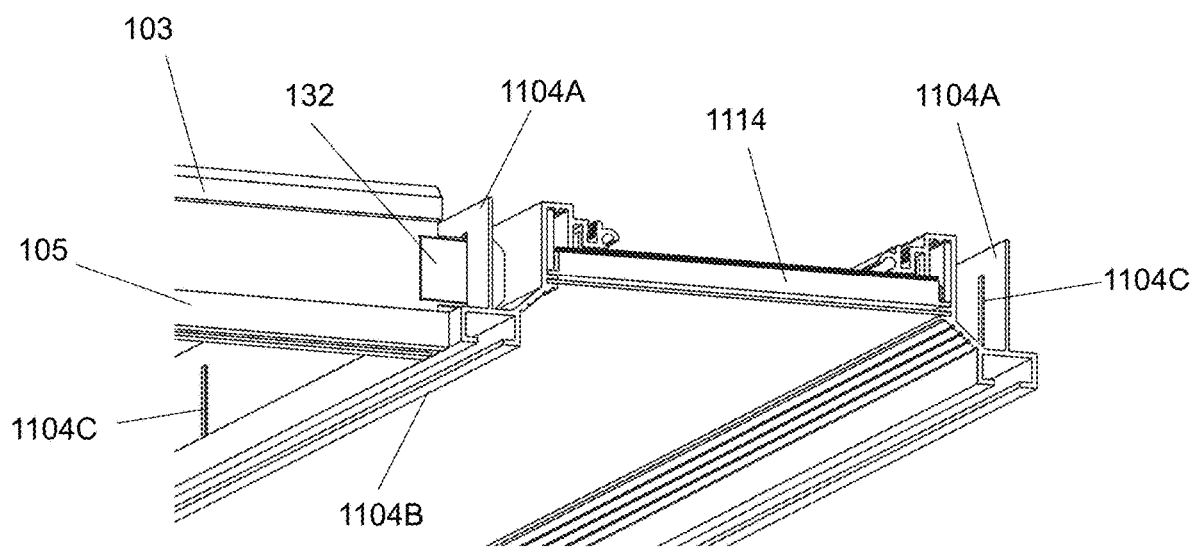
FIG. 11F is a perspective view of a double edgelit embodiment light fixture with T-bar clip connection to a perpendicularly mounted T-bar.

FIG. 11F is a perspective view of a double edge lit embodiment light fixture with T-bar clip connection to a perpendicularly mounted T-bar.

Figure 12A:
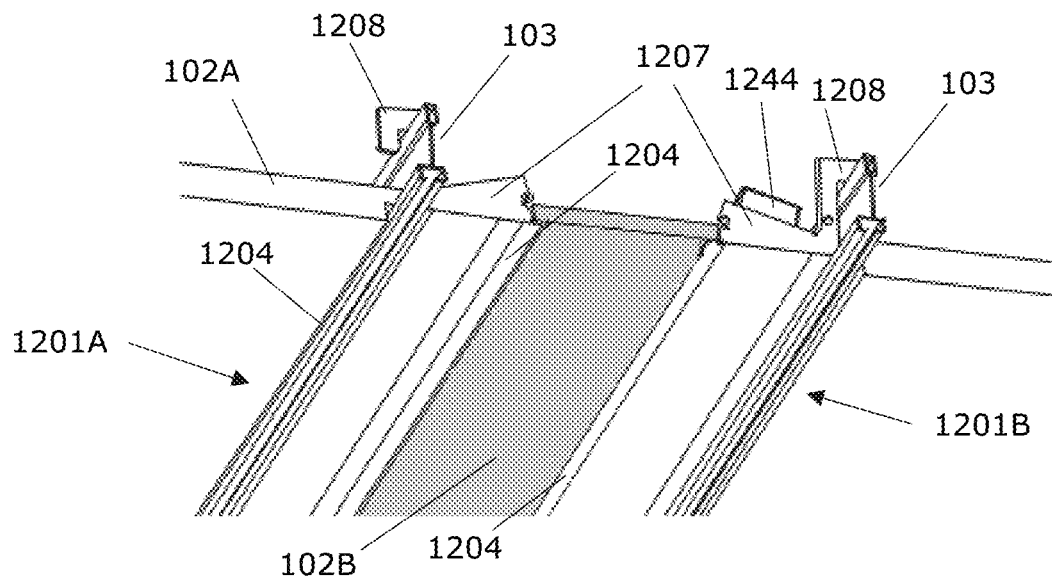
FIG. 12A and FIG. 12B are below ceiling grid perspective views of light fixture embodiments arranged on T-bar elements with the use of end plates having mounting features.
Figure 12B:
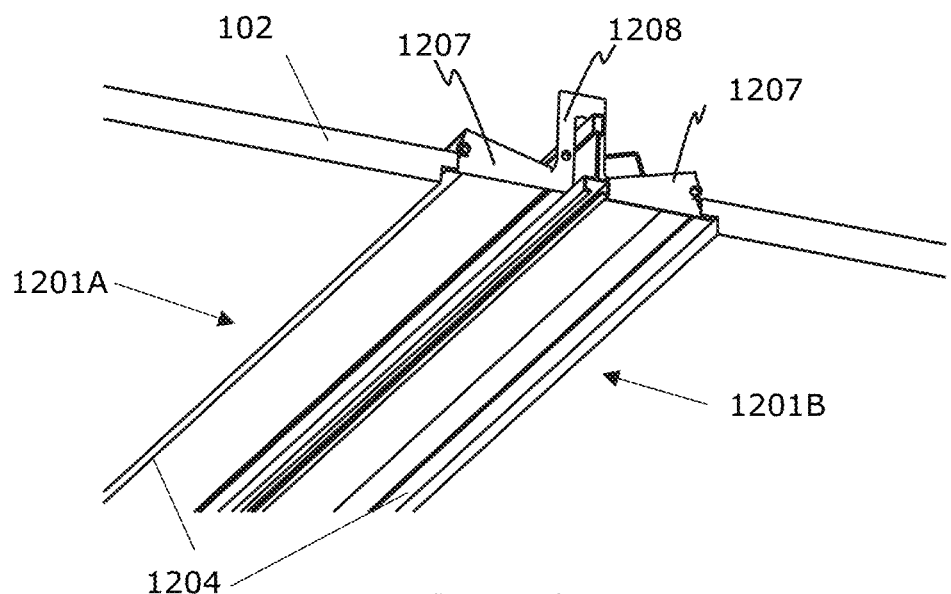

FIG. 12A and FIG. 12B show light fixture embodiments arranged on T-bar elements 103 with the use of end plates 1207 having mounting features 1208 and optionally additional securing such as clamping or screw-locking. In FIG. 12A individual elongate fixture bodies 1201A and 1201B are positioned between two T-bars 103 with a ceiling panel 102B positioned within the span of the fixture. Ceiling panel 102B can be a standard ceiling panel consistent with ceiling panel 102A or optionally it can be a custom panel with decorative, aesthetic, acoustic, or other functional properties. Ceiling panel 102B rests upon the support features 1204 of the elongate housings 1201A and 1201B and which also hides the edges of ceiling panel 102B. In FIG. 12B the embodiment light fixture is positioned over the T-bar 103 and the end plate mounting feature 1208 bridges above the T-bar. Ceiling panel 102 rests upon the support features 1204 of the elongate housings 701A and 701B and which also hides the edges of ceiling panel 102.

Figure 12C:
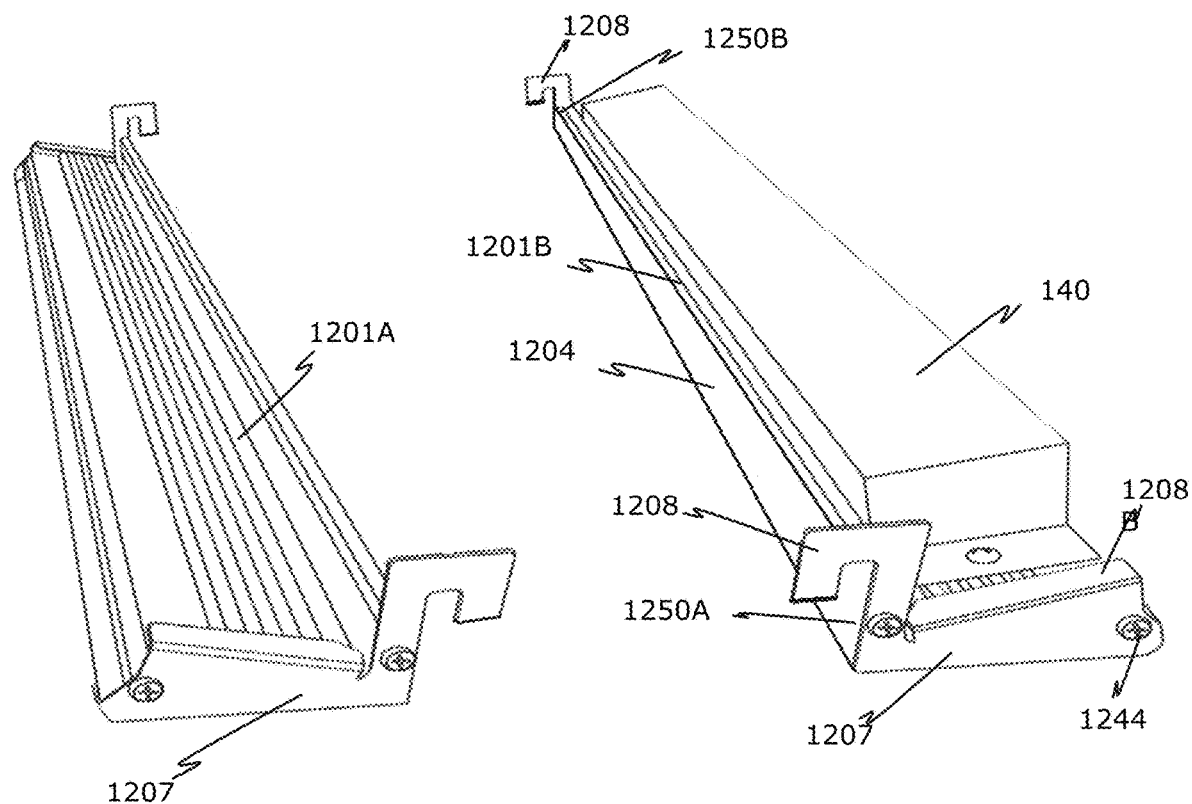
FIG. 12C shows a perspective end view of an embodiment light fixture with an end plate having a mounting portion for attachment to a ceiling grid T-bar.

FIG. 12C shows a perspective end view of embodiment light fixtures identified with elongate housing bodies 1201A and 1201B in FIG. 12A and FIG. 12B. The end plates 1207 are fixable to a first end 1250A and a second end 1250B of the elongate fixture bodies 1201A and 1201B. As shown, the mounting plates 1207 are configured in a way that can be mounted over a T-bar and are optionally implemented using extruded aluminium, bent metal sheet, vacuum-formed metal sheet, sintered compressed metal powder, filled plastics materials and so forth. The mounting plate 1207 is shaped to hook over an upper region of a given T-bar onto which the mounting feature 1208A couples. The mounting plate 1207 includes a horizontal mounting portion 1208B which wraps around the end 1250 of the elongate housing body 1201. The end plate 1207 is fastened to the elongate fixture body 1201 with fasteners, for example screws, bolts, rivets, or anchors.

Figure 12D:
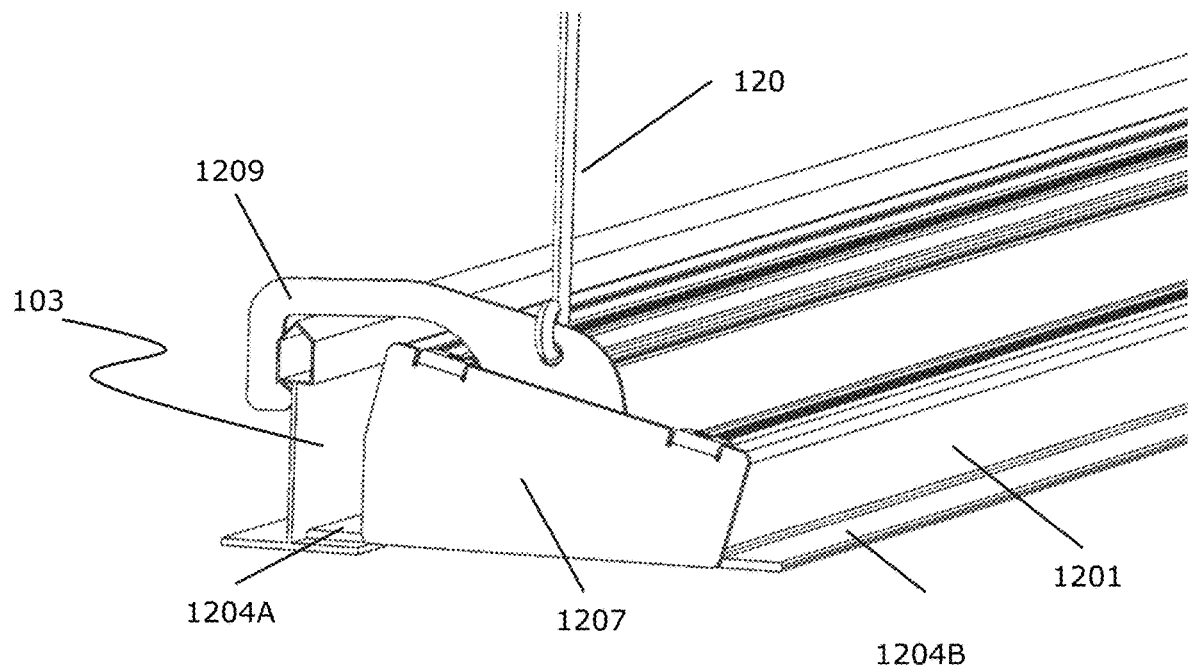
FIG. 12D and FIG. 12E are end view perspective and cross section views respectively of a light fixture embodiment having a mounting feature for perpendicular attachment to a T-bar within a suspended ceiling grid system.
Figure 12E:
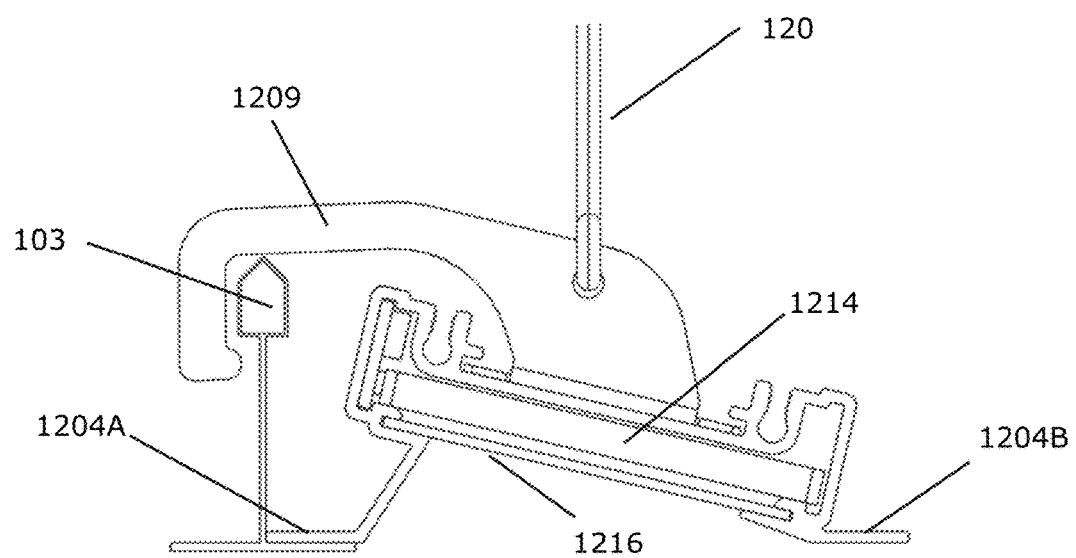

FIG. 12D and FIG. 12E are perspective and cross section end views respectively of a light fixture embodiment having a mounting feature 1209 for perpendicular attachment to a T-bar 103 within a suspended ceiling grid system. The embodiment fixture is further supported by a suspension cable 120 for attachment to a structural ceiling.

Figure 13A:
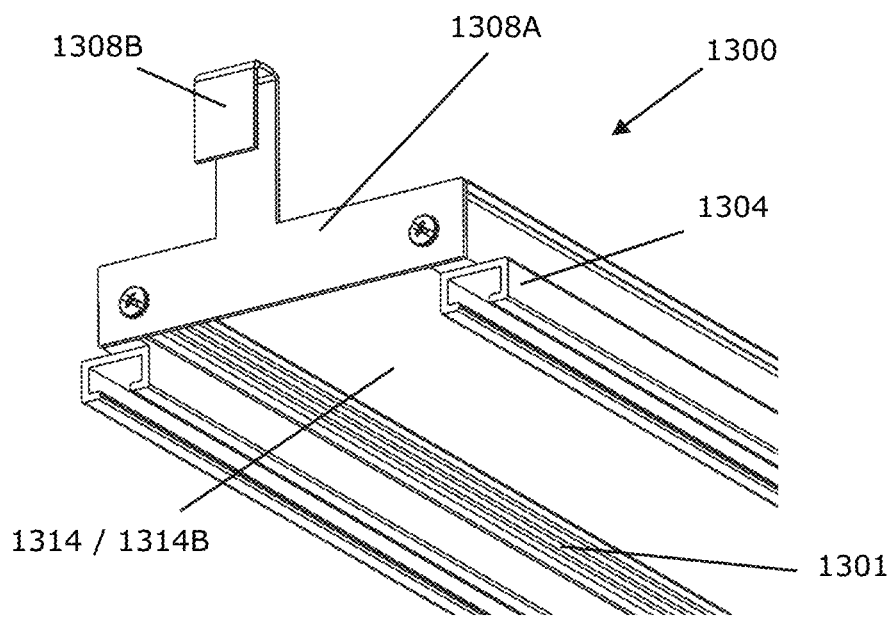
FIG. 13A is an perspective view of an embodiment light fixture with an end plate having a latching feature for T-bar mounting.
Figure 13B:
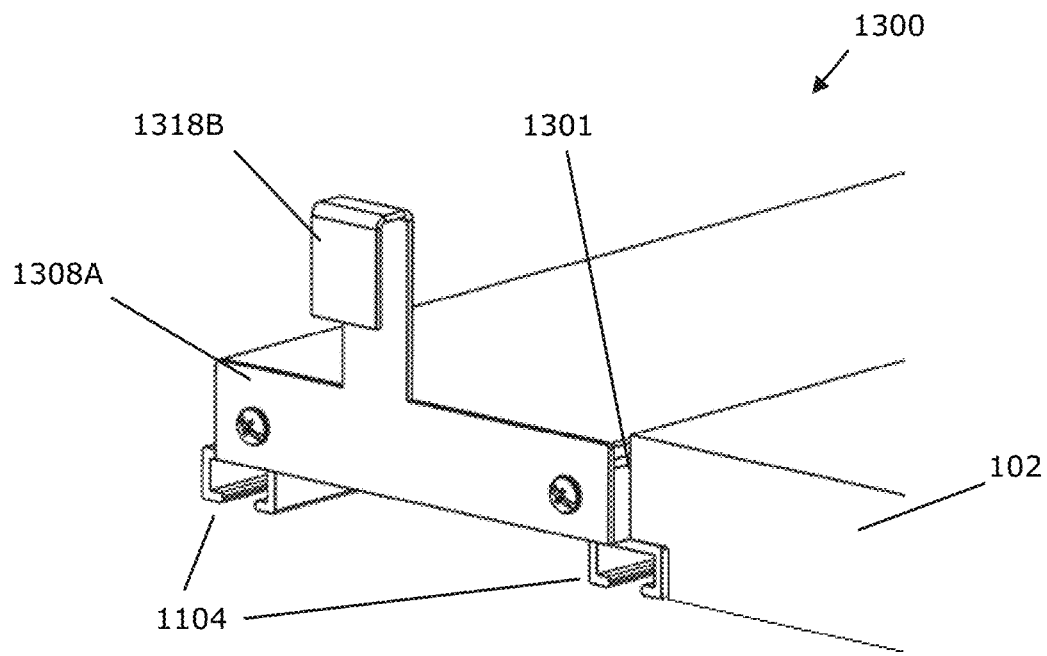
FIG. 13B shows the embodiment light fixture of FIG. 13A supporting a ceiling tile within a ceiling grid system.

FIG. 13A and FIG. 13B are perspective views of an embodiment light fixture 1300 with an end plate 1308A having a latching feature 1308B for mounting onto a ceiling grid T-bar. FIG. 13A is a underneath perspective view of the embodiment light fixture alone while FIG. 13B is an overhead perspective view of the embodiment light fixture supporting a ceiling tile 102 which is resting upon the support feature portion 1304 of the elongate fixture body 1301. In this embodiment the profile shape of the T-bar feature matches that of a slotted T-bar. The elongate fixture body holds in position and optical alignment the optical components including the optical element 1314, the output face 1314B of which is seen in FIG. 13A. Optionally, an auxiliary optical element can be positioned below the optical element to further modify the light distribution and/or appearance of the light fixture.

Figure 14A:
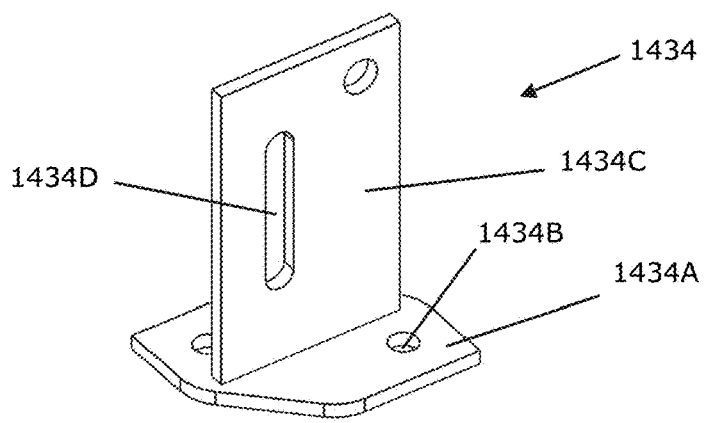
FIG. 14A is a perspective view of an embodiment mounting clip for attachment of T-bars to an embodiment light fixture.

FIG. 14A is a perspective view of an embodiment mounting clip 1434 for attachment of T-bars to an embodiment light fixture.

Figure 14B:
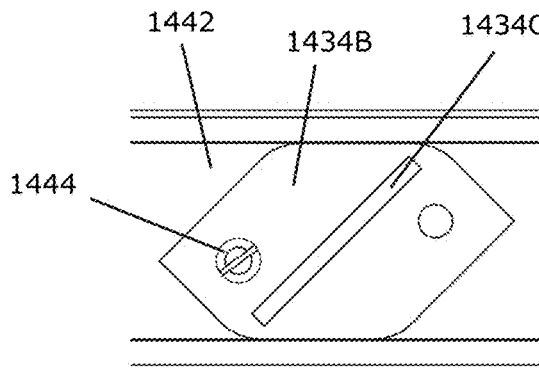
FIG. 14Bi and FIG. 14Bii are overhead plan views of the embodiment mounting clip showing how it can be installed in a top side channel of an embodiment light fixture.
Figure 14C:
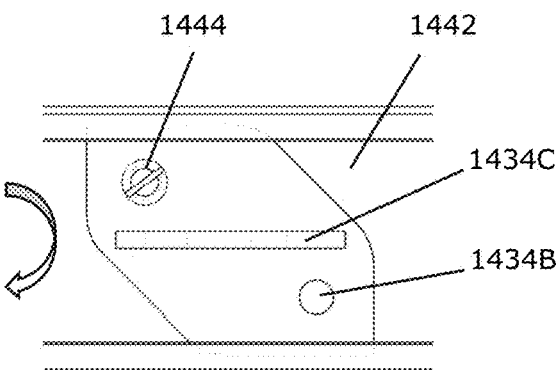
FIG. 14C is an overhead perspective view of a ceiling grid system wherein embodiment mounting clips are used to attach the light fixture with T-bars.
Figure 14C:
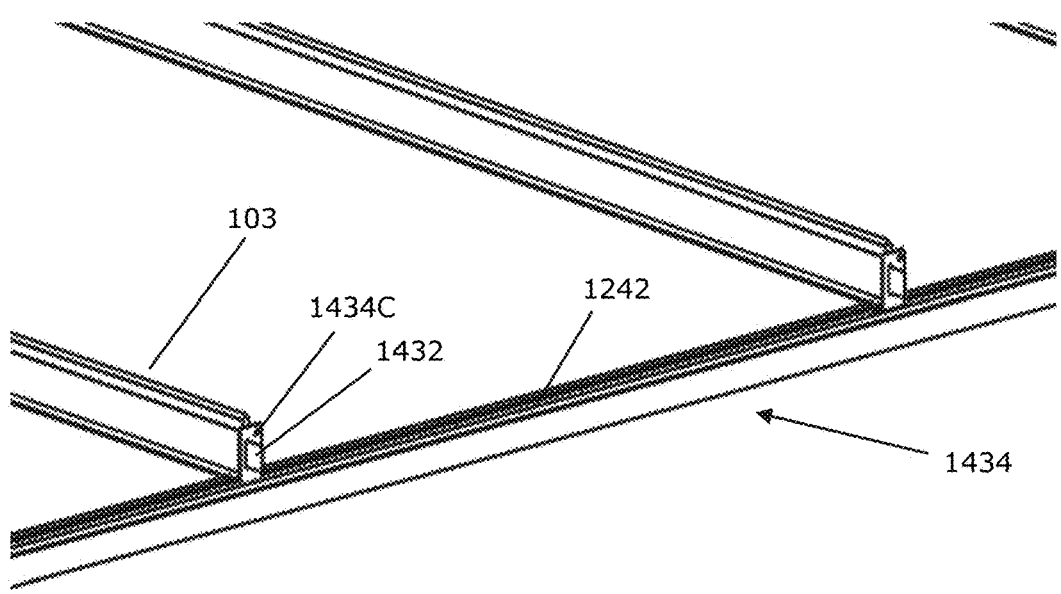

FIG. 14Bi and FIG. 14Bii are overhead plan views of the embodiment mounting clip 1434 showing how it can be installed in a top side slotted housing channel 1442 of an embodiment light fixture. FIG. 14C is an overhead perspective view of an embodiment light fixture 1400 with mounting clips 1434 providing attachment to T-bars of a ceiling grid system. A T-bar clips is inserted through the mounting clip slot 1434D. A base portion 1434A of the mounting clip 1434 has holes 1434B through which a fastener 1444 such as a set screw can be using to lock the mounting clip in position after it is placed into position as shown in FIG. 14Bi and then twisted 45 degrees into the locked position shown in FIG. 14Bii. The mounting clip has a vertical portion 1434C which includes a slot 1434D for insertion of a T-bar clip. The vertical portion 1434C also provides means for grasping and rotating the mounting clip during installation and removal from the slotted housing channel 1442 of the light fixture.

FIG. 14C is an overhead perspective view of a ceiling grid system wherein embodiment mounting clips are used to attach the light fixture with T-bars.

Figure 15A:
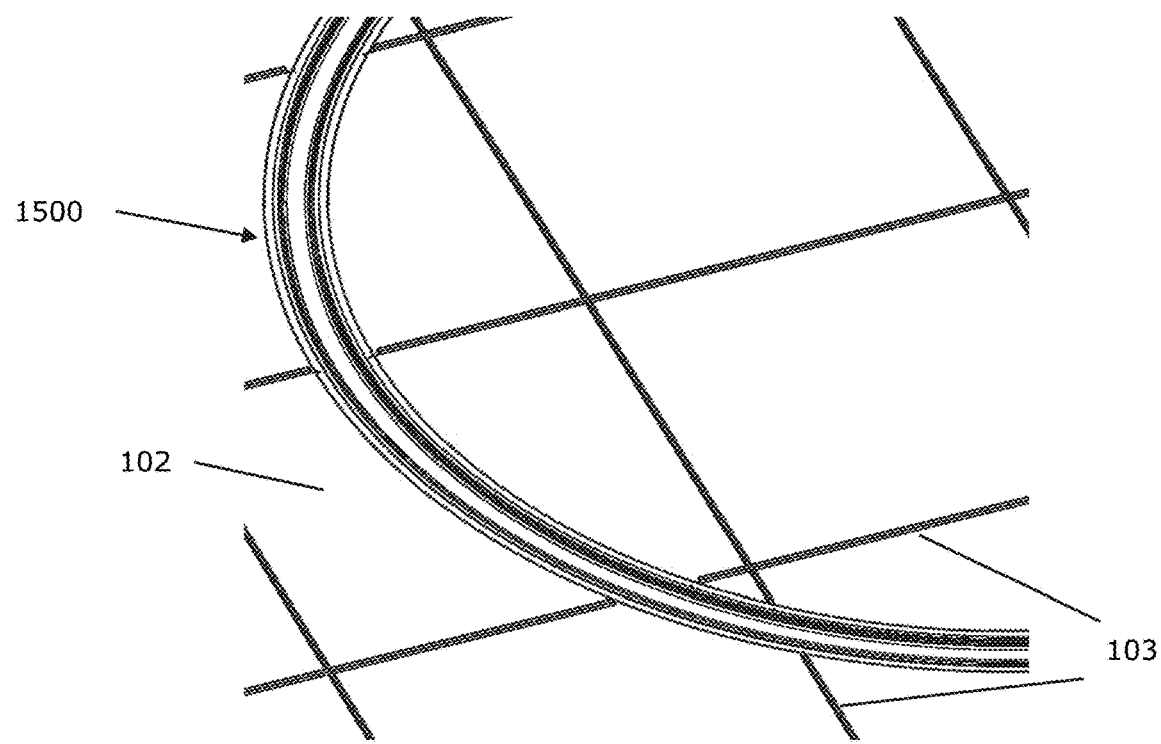
FIG. 15A is a below ceiling grid view of an embodiment radiused light fixture installation spanning multiple T-bar cells.

FIG. 15A is a below ceiling grid view of an embodiment radiused light fixture 1500 installation spanning multiple T-bar 103 cells.

Figure 15B:
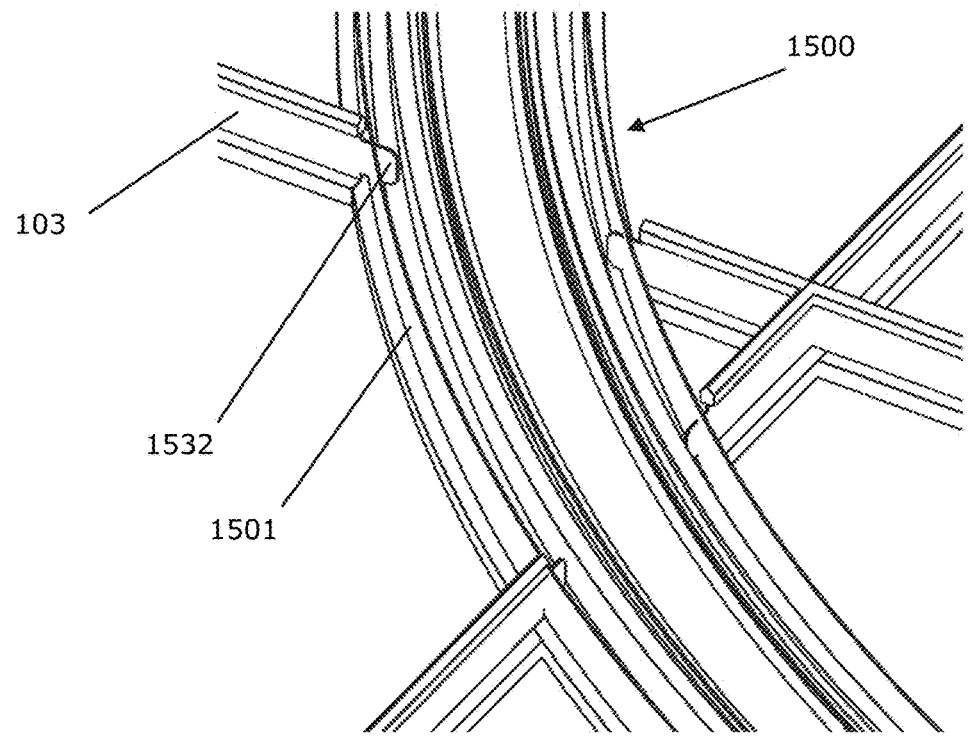
FIG. 15B is an above ceiling grid perspective view of the embodiment of FIG. 15A showing an embodiment radiused light fixture installation spanning multiple T-bar cells.

FIG. 15B is an enlarged above ceiling grid perspective view of the light fixture embodiment of FIG. 15A showing an embodiment radiused light fixture installation spanning multiple T-bar cells. The T-bar clip 1532 of the T-bar 103 extends into the elongate fixture body 1501 for attachment.

Figure 16A:
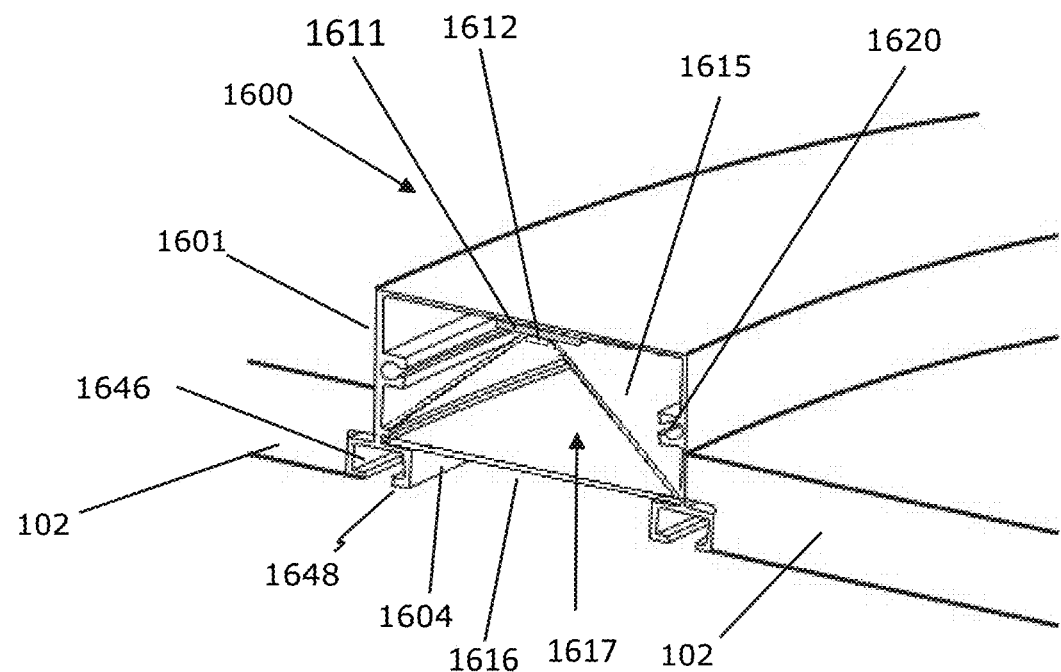
FIG. 16A is an overhead perspective cross-section view of an embodiment radiused light fixture installed in a ceiling grid system at the edge of a T-bar cell.

FIG. 16A is an overhead perspective cross-section view of an embodiment radiused light fixture 1600 installed in a ceiling grid system at the edge of a T-bar cell.

Figure 16B:
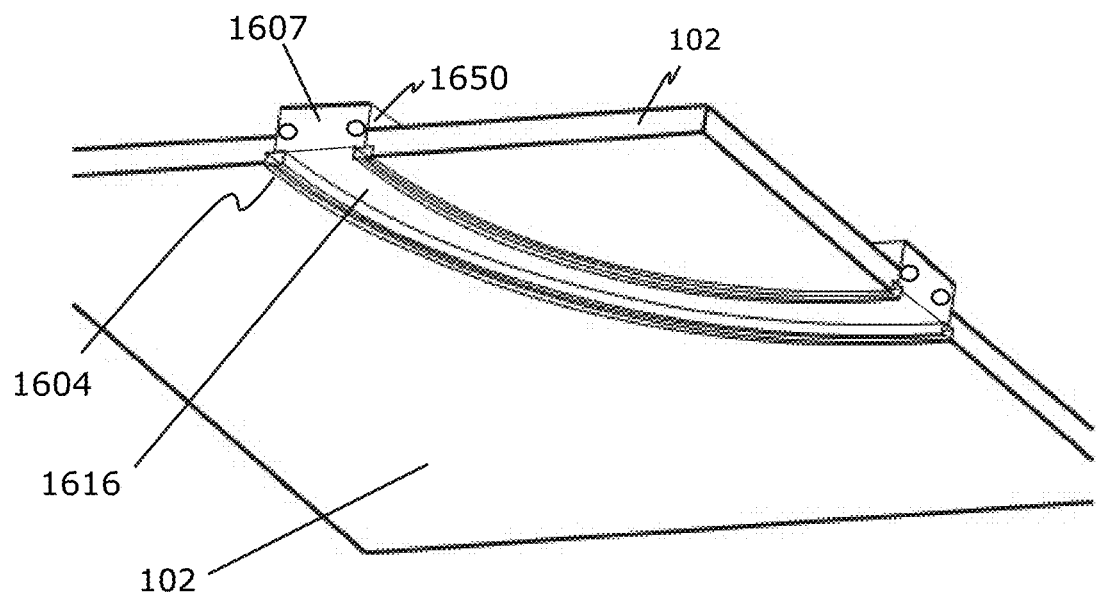
FIG. 16B is an overhead perspective cross-sectioned view of an embodiment radiused light fixture 1400 enclosed with an end cap and installed within a single T-bar cell.

FIG. 16B is an overhead perspective cross-sectioned view of an embodiment radiused light fixture 1600 enclosed with an end cap and installed within a single T-bar cell.

FIG. 16A and FIG. 16B show schematic illustrations of an embodiment light fixture 1600 having an elongate fixture body 1601 which includes a slotted support feature 1604 which includes a cavity 1646 and one or more object interlocking features 1448. The ceiling tile 102 has a tegular edge configuration which allows the ceiling panel and bottom of the support feature 1604 to both be flush with the ceiling plane when the ceiling tile rests upon and is supported by the T-bar feature. The elongate fixture body further comprises a screw boss 1620 for use in enclosing the fixture end, for example with an end cap or end plate. In this embodiment, a reflector 1615 is positioned within the elongate housing body to provide an optical cavity 1617 into which LEDs 1612 mounted on a PCB 1611 project light that is subsequently output through the auxiliary optical element 1616. This is a direct lit embodiment with no optical element. FIG. 16B shows the elongate housing end 1650 enclosed by an end cap 1607.

Figure 17A:
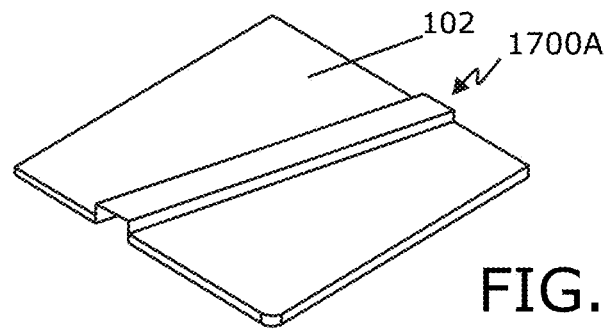
FIGS. 17A, 17B, and 17C illustrate in overhead perspective view three different light fixture embodiments, each with specific elongate portions joined to produce distinct linear, curved, and angled geometries respectively.
Figure 17B:
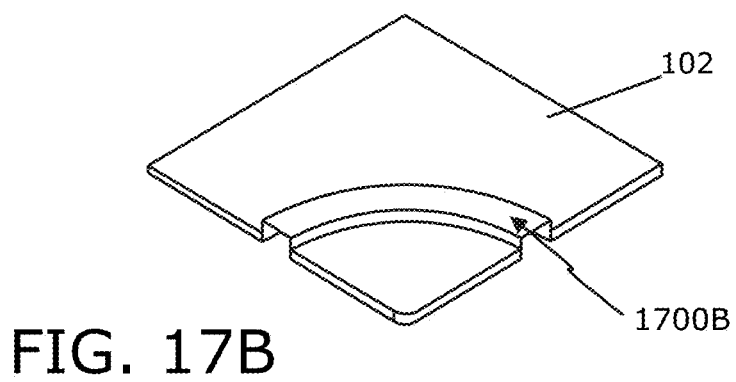
Figure 17C:
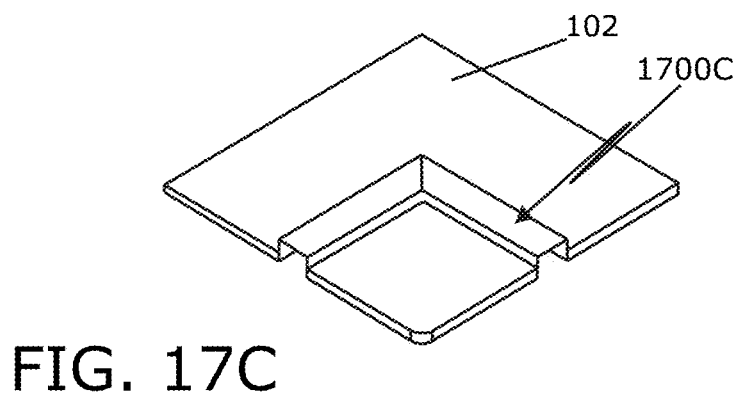

FIGS. 17A, 17B, and 17C, show schematic illustrations of embodiment fixtures, each with specific elongate portions; FIG. 17A with linear form factor fixture 1700A, FIG. 17B with curved (arcuate) form factor fixture 1700B, and FIG. 17C with angled form factor fixture 1700C.

Figure 18A:
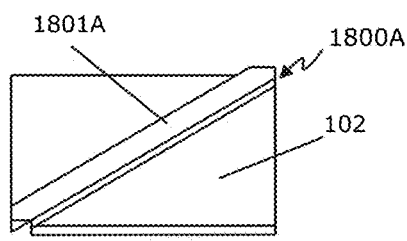
FIGS. 18A-18F illustrate in overhead perspective view six different light fixture embodiments, each with specific elongate portions joined to produce distinct geometries configured to fit within a T-bar cell of a suspended ceiling grid.
Figure 18D:
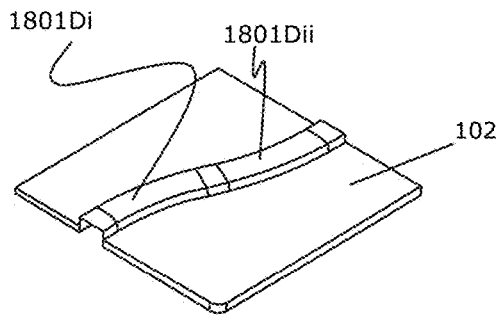
Figure 18B:
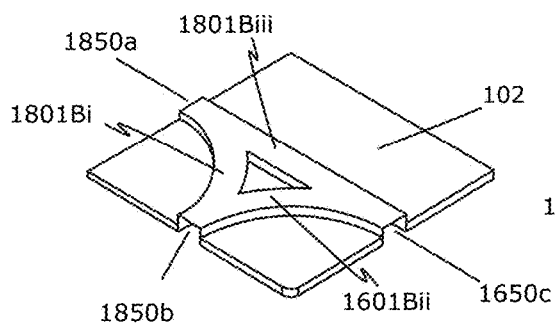

FIGS. 18A, 18B, 18C, 18D, 18E, and 18F show schematic illustrations of embodiment fixtures, each with specific elongate portion configurations and configured with ceiling panel sections 102 configured to fill a T-bar cell within a ceiling grid system. Light fixture components not shown in FIGS. 18A-18F are end plates or end caps that enclose the elongate housing body ends 1850. In FIG. 18A, the elongate fixture portion 1801A is linearly elongate and mountable diagonally between two T-bar-junctions of a given cell of the suspended ceiling arrangement. In FIG. 18B, the elongate portion 1801B includes two arcuate portions 1801Bi and 1801Bii and a linear portion 1801Biii, which merge and create three support ends 1850 that are arranged to be supportable at three T-Bars forming a periphery of a given cell of the suspended ceiling arrangement.

Figure 18E:
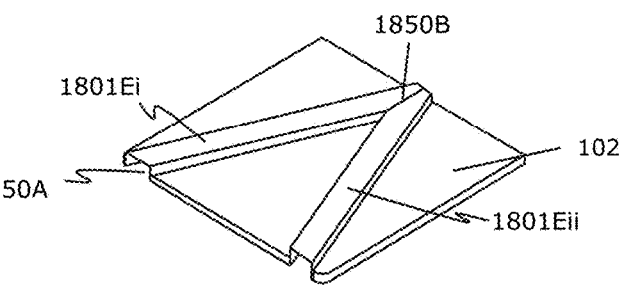
Figure 18C:
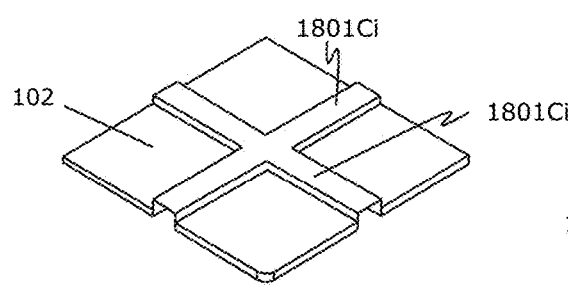

In FIG. 18C, the elongate portion 1801 includes two linear portions 1801Ci and 1801Cii that are mutually conjoined at a middle location in an orthogonal manner, such that the elongate portion has four ends that are supportable on four corresponding T-Bars of a given cell of the suspended ceiling arrangement.

Figure 18F:
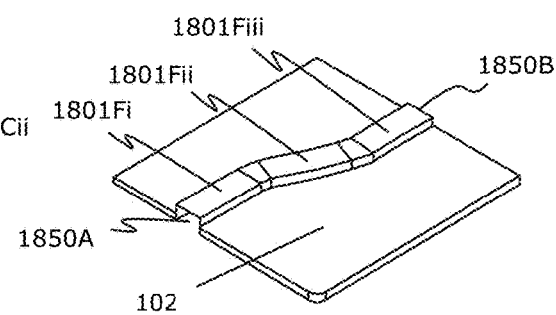

In FIG. 18D, the elongate portion 1801 includes substantially curved "S" shape portions 1801Di and 1801Dii, such that ends of the "S"-shape portion are supportable on mutually parallel T-Bars of a given cell of the 35 suspended ceiling arrangement. In FIG. 18E, the elongate portion is "V" shaped and includes two co-joined linear portions 1801Ei and 1801Eii that are mountable at a middle position of a T-bar of a given cell of the suspended ceiling arrangement forming a "V" shape joined at elongate housing ends 1850B. In FIG. 18F, the elongate portion includes three linear portions 1801Fi, 1801Fii, and 1801Fiii which connect and form support ends 1850A and 1850B arranged to be supportable at opposing T-bars of a suspended ceiling arrangement. Herein, optionally, an angle subtended between the elongate portion and the first and second ends are non-orthogonal. Furthermore, herein, optionally, an angle subtended between the elongate portion and the first and second ends are orthogonal.

Figure 19A:
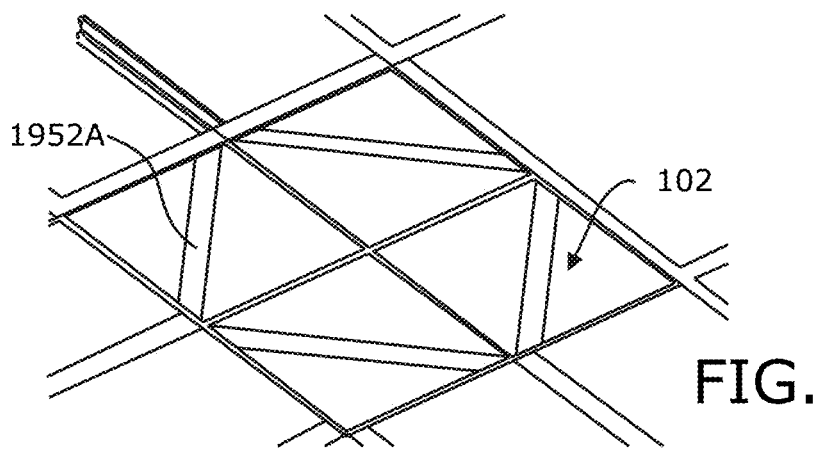
FIGS. 19A, 19B, and 19C illustrate in overhead perspective view three different light fixture embodiments, each with elongate housing portions configured to produce distinct rectangular, triangular, and circular geometries respectively.
Figure 19B:
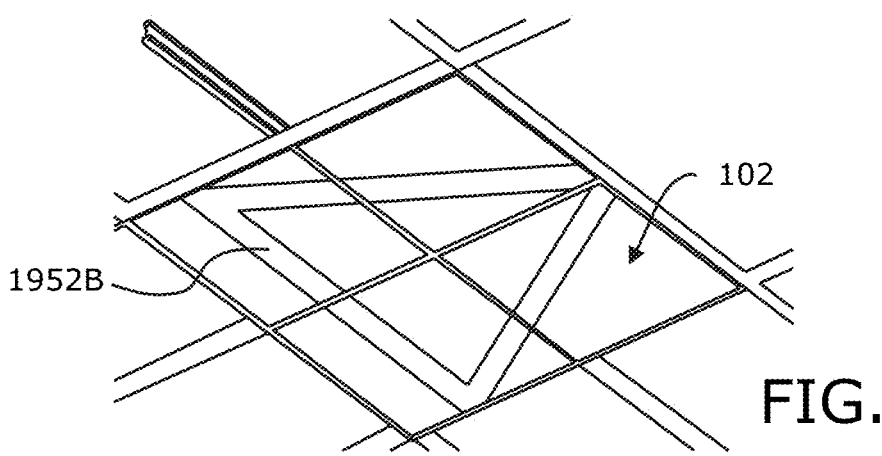
Figure 19C:
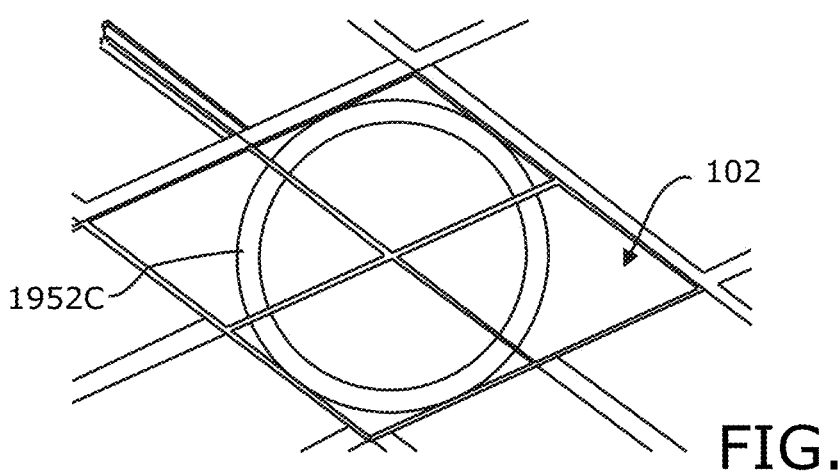
Figure 19D:
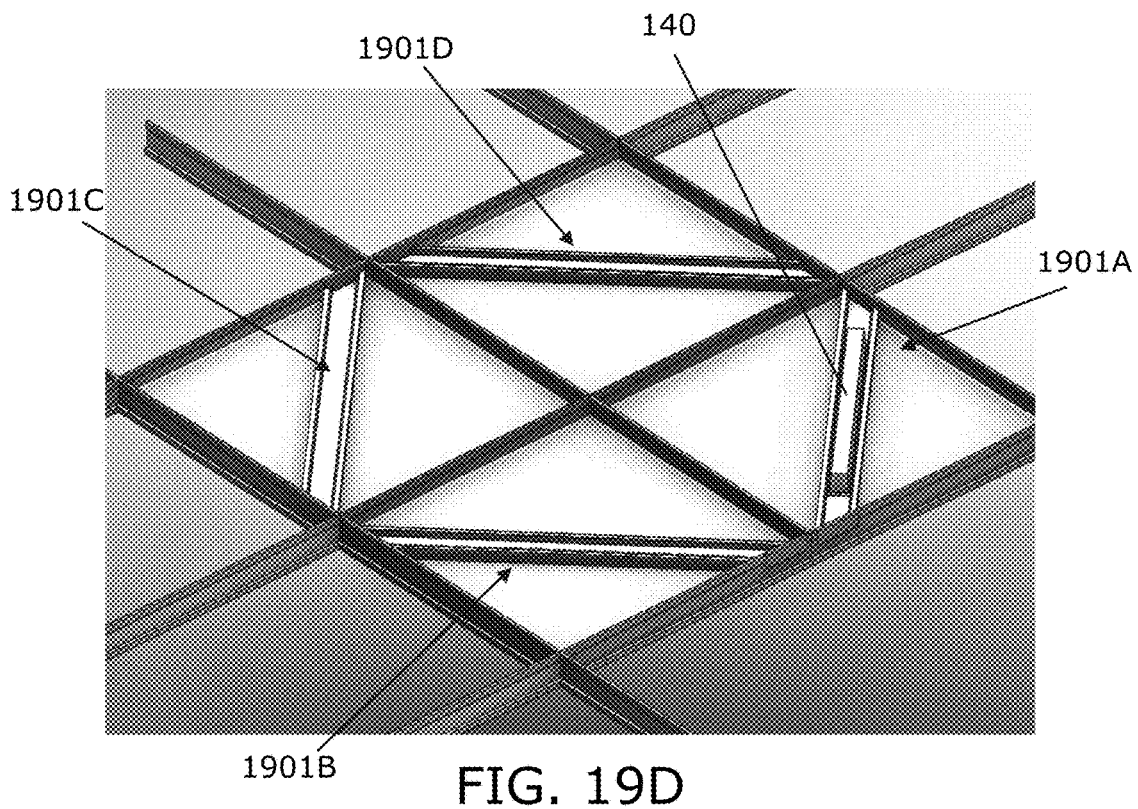
FIG. 19D is an above ceiling plane perspective view of an array of four embodiment light fixtures in a ceiling grid system to produce a rectangular geometry with one electronic driver attached to one light fixture and powering all four light fixtures.

Referring to FIGS. 19A, 19B and 19C, there are shown schematic illustrations of exemplary patterns made by three differing fixture embodiments installed in a suspended ceiling arrangement along with ceiling tile 102 sections. Optionally, an overall geometric shape 1950 of the reconfigurable fixture is at least one of square or rectilinear in form 1952A (as shown in FIG. 19A), triangular in form 1952B (as shown in FIG. 19B), round or curved in form 1952C (as shown in FIG. 19C). Furthermore, it will be appreciated that the overall shape of the reconfigurable fixture is optionally shaped in various other possible forms, including, but not limited to, "S" shaped, zig-zag shaped, spiral shaped, etc., without any FIG. 19D is an above ceiling plane perspective view of an array of four embodiment light fixtures 1901A-D installed in a ceiling grid system to produce a rectangular geometry. An electronic controller 140 is attached on top of one of the light fixtures and is configured to power all four light fixtures.

Figure 19E:
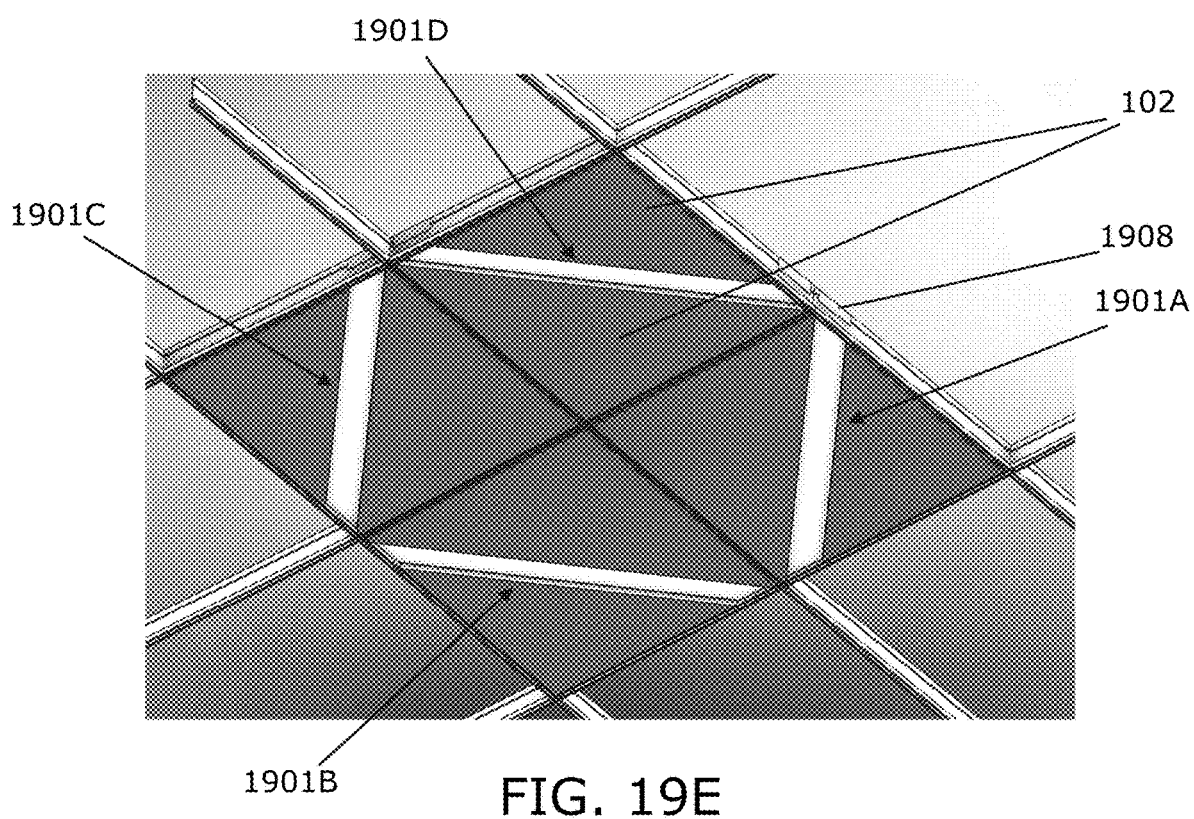
FIG. 19E is a below ceiling plane perspective view of an array of four embodiment light fixtures in a ceiling grid system to produce a rectangular geometry with one electronic driver attached to one light fixture and powering all four light fixtures.

FIG. 19E shows a below ceiling plane perspective view of an array of four embodiment light fixtures 1901A-D installed in a ceiling grid system with attachment from mounting features 1908 to produce a rectangular geometry. Ceiling panel 102 sections fill the T-bar cells.

Figure 20:
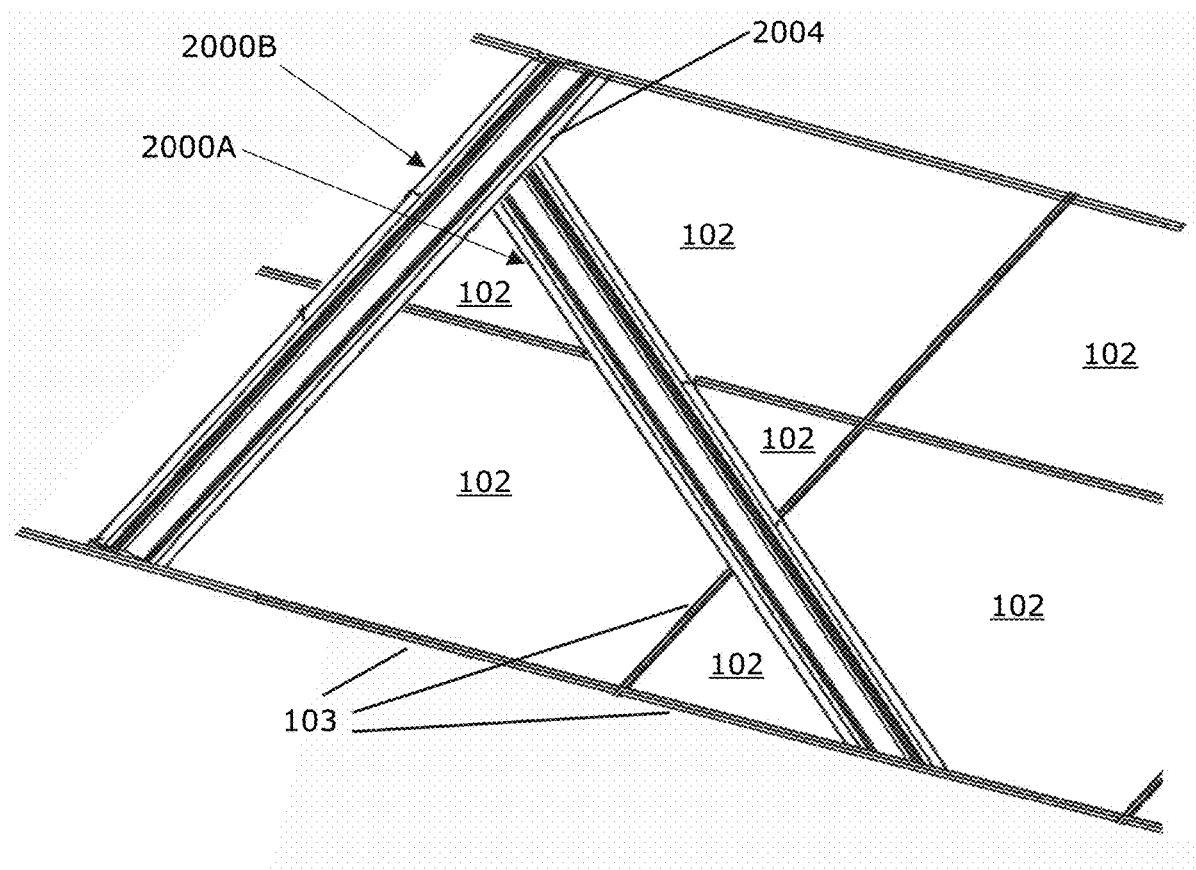
FIG. 20 is an overhead perspective view of a ceiling grid arrangement wherein an embodiment light fixture is longitudinally mounted to both a ceiling grid T-bar and also the side portion support element of another embodiment light fixture.

FIG. 20 is an overhead perspective view of a ceiling grid arrangement wherein an embodiment light fixture 2000A is longitudinally mounted to both a ceiling grid T-bar 103 and also the elongate body side portion support element feature 2004 of another embodiment light fixture 2000B. Areas between light fixtures within the ceiling grid T-bar cells are filled with ceiling panels 102.

Figure 21A:
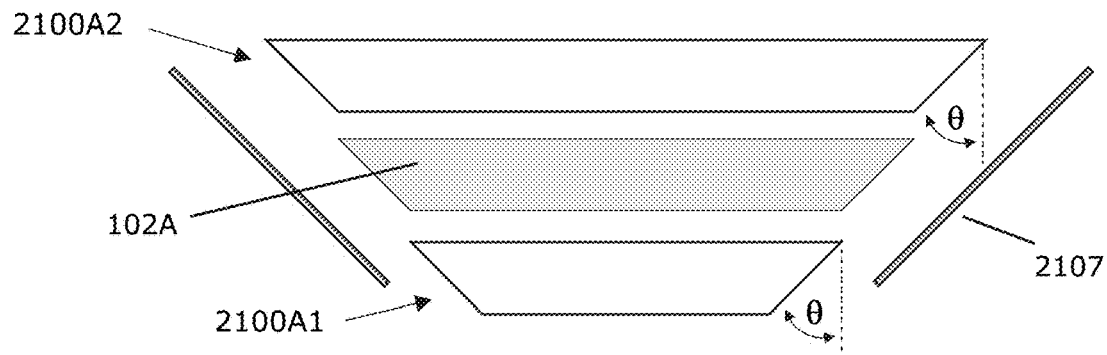
FIG. 21A is a bottom plan view of embodiment light fixture and end plate components used to construct the light fixture assembly of FIG. 21B.
Figure 21B:
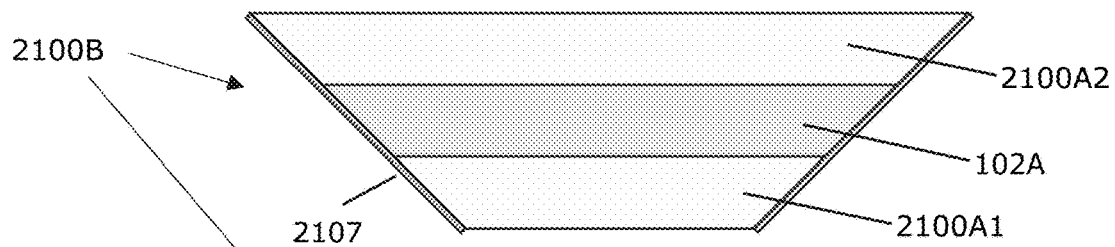
FIG. 21B is a bottom plan view of an embodiment light fixture assembly comprising two light fixtures positioned in parallel alignment by common end plates with each light fixture having a common configured angle cut of 45 degrees on both ends.

FIG. 21A is a bottom plan view of embodiment light fixtures 2100A1 and 2100B and end plate 2107 used to construct the light fixture assembly of FIG. 21B. Light fixture 2100A1 and 21001B cut on both ends with a configured cut angle θ of 45 degrees. Panel 102A is configured to a size to fit between the two light fixtures.

FIG. 21B is a bottom plan view of an embodiment light fixture assembly 2100B comprising two light fixtures 2101A1 and 2101A2 positioned in parallel alignment by common end plates 2107 with each light fixture having a common configured angle cut of 45 degrees on both ends. Positioned between the two light fixtures 2101A and 2101B is a panel 102A.

Figure 21C:
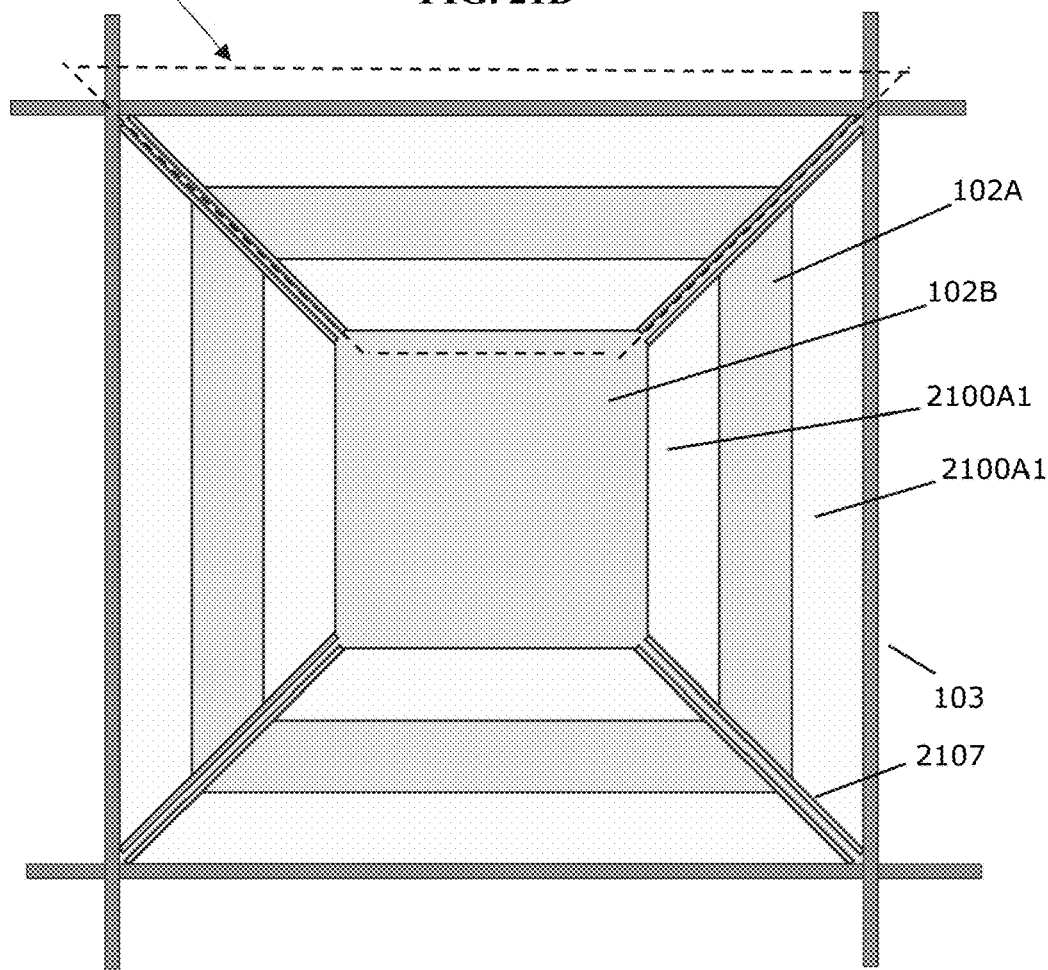
FIG. 21C is a bottom plan view of an arrangement of embodiment light fixture assemblies of FIG. 21B within a single ceiling grid T-bar cell.

FIG. 21C is a bottom plan view of an arrangement of four embodiment light fixture assemblies 2100B of FIG. 21B within a single ceiling grid T-bar cell framed by T-bar cells 103. The arrangement of the trapezoid shaped light fixture assemblies 2100B are combined with panel 21002B to fill the square space with a visually interesting geometry of concentric squares. Functionally, individual fixtures and the concentric layers of light fixtures 2101A1 and 2101A2 can be connected with independently controlled electrical channels to adjust the light output of the arrangement, specifically including light distribution, color temperature, glare, and circadian lighting effects.

Figure 21D:
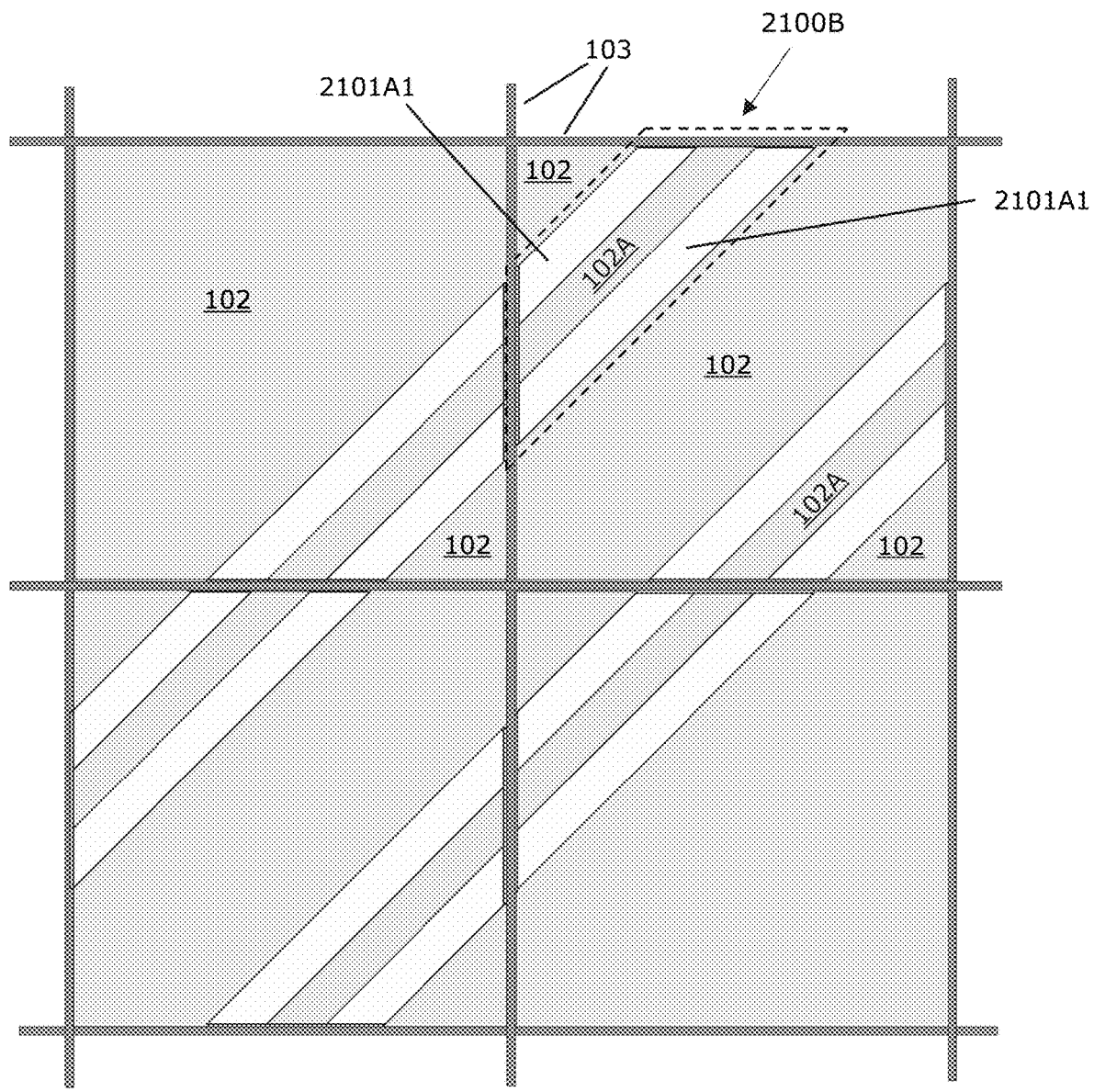
FIG. 21D is bottom plan view of an alternative ceiling grid arrangement of light fixture assemblies of FIG. 21B which spans multiple ceiling grid T-bar cells.

FIG. 21D is a bottom plan view of an alternative ceiling grid arrangement of trapezoidal light fixture assemblies 2100B of FIG. 21B which spans multiple ceiling grid T-bar cells and produces a linear geometry rotated 45 degrees offset from the ceiling grid T-bars 103.

Figure 22A:
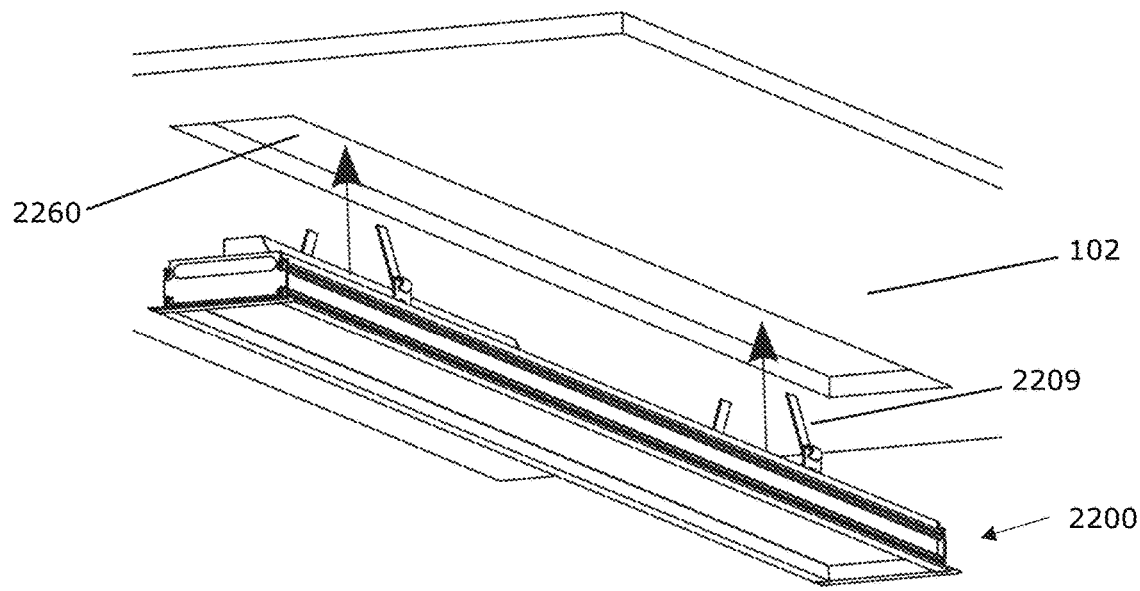
FIG. 22A is a bottom perspective view of an embodiment light fixture configured with spring loaded clips for installation into a drywall ceiling.
Figure 22B:
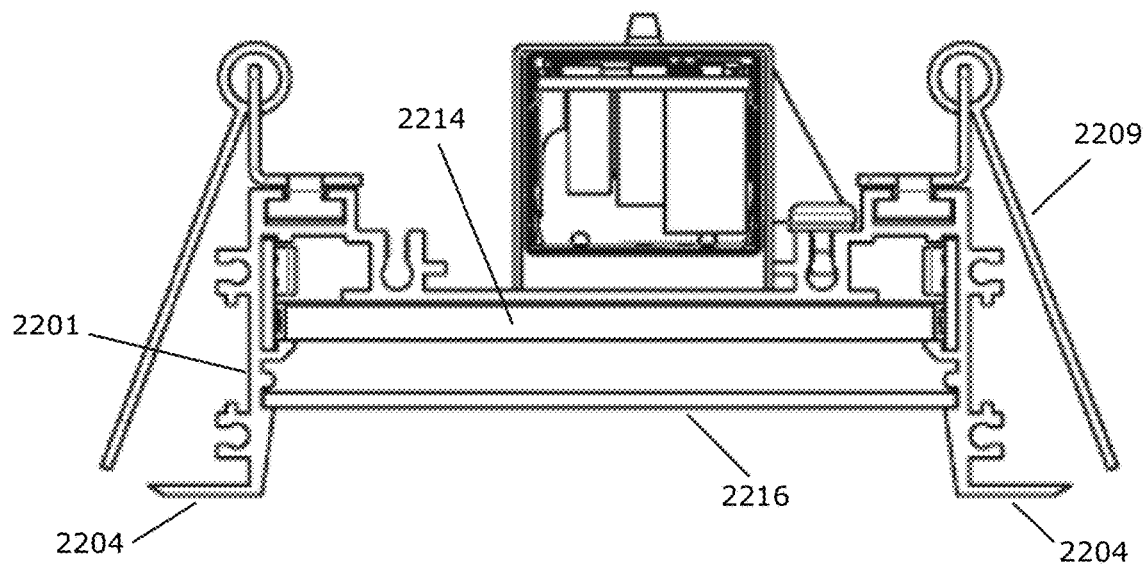
FIG. 22B is a cross section view of the light fixture embodiment of FIG. 20A configured with spring loaded clips for installation into a drywall ceiling.

FIG. 22A is a bottom perspective view of an embodiment light fixture configured with spring loaded clips 2209 for installation into a drywall ceiling 102 and FIG. 22B is a cross section view of the same light fixture 2200. For installation, the light fixture 2200 is lifted into the drywall ceiling cut out 2260 and the spring clip is activated to press down and hold together the drywall panel 102 and support the feature 2204 of the elongate housing body 2201.

Figure 23:
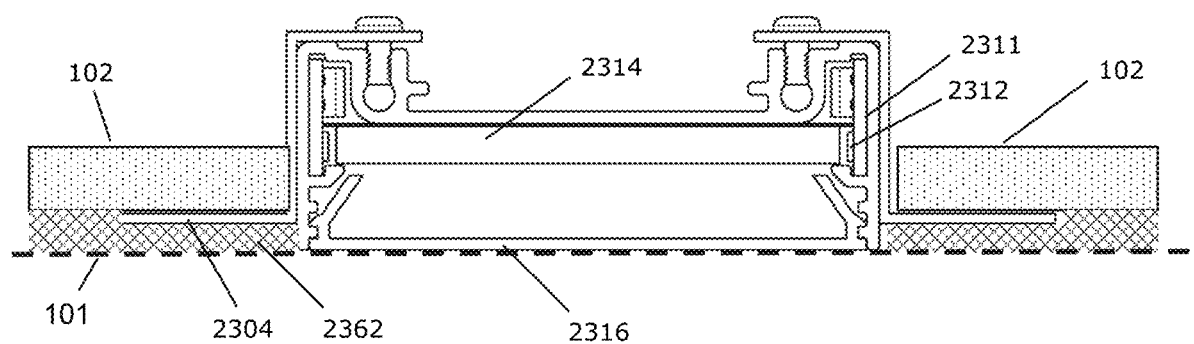
FIG. 23 is a cross section view of a light fixture embodiment with attachable/detachable side portions configured for "mud-in" type installation into a drywall ceiling or wall.

FIG. 23 is a cross section view of a light fixture embodiment configured for "mud-in" type installation into a drywall ceiling or wall panel 102. The lateral support feature 2304 is shown as detachably mounted to the elongate housing body 2301 but could alternatively be integrally configured. The later support feature 2304 is positioned above the ceiling grid plane 101 so that the volume between the lateral support feature and ceiling plane can be filled with drywall mud 2362 as part to the drywall panel installation process.

What is claimed is:

1. A light fixture for use in an installed panel system comprising;
   a) an optical assembly comprising;
      i) at least one LED board comprising one or more LEDs mounted and positioned on at least one face of a printed circuit board and further comprising one or more arranged electrical circuits;
      ii) at least one reflector or reflective surface;
      iii) a primary optical element comprising a bulk light transmissive material and internal or surface light scattering features and further comprising at least one input face and an output face; wherein the primary optical element modifies the light distribution from the at least one LED when light is transmitted through the primary optical element;
   b) at least one elongate housing body retaining and aligning the optical assembly comprising;
      i) a longitudinally extended 2-dimensional x-y cross-sectional profile shape with two side portions joined by a backplane and configured to position and retain the optical assembly components in optical alignment, and collectively defining an internal cavity extended longitudinally wherein the longitudinal ends of the elongate housing body are cut at configured angles with respect to the longitudinal direction, wherein the lengths of each side portion corresponds to the configured cut angles;
      ii) at least one support feature extending from at least one side portion of the elongate housing body and configured to support and conceal the edge of a panel of the installed panel system;
   c) at least one end plate or end cap mounted to an end of the elongate housing body to enclose the internal cavity;
   wherein the peak intensity and light distribution from the light fixture are configured by selecting the amount of primary optical element light scattering and by controlling the electrical power distributed to the one or more LEDs via the arranged electrical circuits of at least one LED board.

2. The light fixture of claim 1 comprising two or more arranged electrical circuits wherein a ratio of electrical power applied to multiple individual arranged electrical circuits is used to control the degree of asymmetry or symmetry in the light distribution.

3. The light fixture of claim 1 comprising two or more arranged electrical circuits wherein a ratio of electrical power applied to differing arranged electrical circuits is used to create one or more peak intensities or lobes in the light distribution.

4. The light fixture of claim 3 wherein the electrical power is used to control the peak intensities of one or more lobes.

5. The light fixture of claim 1 wherein the primary optical element is edge lit and comprises a single input face which is positioned adjacent to and receiving light from the at least one LED board.

6. The light fixture of claim 5 wherein the height of the LED is less than the thickness of the primary optical element.

7. The light fixture of claim 5 further comprising a reflector positioned adjacent to an opposing face of the primary optical element to reflect light emitted from the opposing face back into the primary optical element.

8. The light fixture of claim 1 wherein the primary optical element is edge lit and comprised of two input faces, each adjacent to and receiving light from at least one LED board.

9. The light fixture of claim 1 wherein an inner face of the primary optical element is configured to act as an input face and receives light from the LED light source.

10. The light fixture of claim 1 wherein the LED board is positioned on the backplane of the elongate body and inputs light into the inner face of the primary optical element.

11. The light fixture of claim 1 wherein the primary optical element has an optical haze greater than 80 or a clarity less than 25 when measured using ASTM D1003 standard techniques.

12. The light fixture of claim 1 wherein light scattering features comprise dispersed regions of refractive index differing from that of the bulk light transmissive material.

13. The light fixture of claim 12 wherein the dispersed regions are comprised of polymer beads.

14. The light fixture of claim 1 wherein the light scattering features are surface features upon one or both of the input face and output face of the primary optical element.

15. The light fixture of claim 1 wherein the primary optical element comprises light redirecting surface features with a lenticular, sawtooth or prism profile.

16. The light fixture of claim 1 further comprising an auxiliary optical element positioned at a configured distance beyond the output face of the primary optical element and retained in position by the longitudinally extended support features of the elongate housing body.

17. The light fixture of claim 16 wherein light distribution from the auxiliary optical element is different than light distribution from the output face of the primary optical element.

18. The light fixture of claim 16 wherein light distribution output from an external face of the auxiliary optical element is less asymmetric than light output from the outer face of the primary optical element.

19. The light fixture of claim 16 wherein the auxiliary optical element comprises a light scattering region, lenticular pattern, fresnel lens pattern, or other microlens pattern.

20. The light fixture of claim 1 further comprising an extended edge feature in the form of a leg, prong, clip to aid in retaining and aligning the primary or auxiliary optical element.

21. The light fixture of claim 1 wherein the elongate fixture body and primary optical element are in parallel alignment.

22. The light fixture of claim 1 wherein a primary optical element end face is positioned parallel and adjacent to the end plate or end cap.

23. The light fixture of claim 1 wherein a primary optical element output face is retained in parallel alignment with an installed panel system plane or acoustic panel or drywall panel.

24. The light fixture of claim 1 wherein a primary optical element output face is retained at an oblique angle or tilted alignment with an installed panel system plane or acoustic or drywall panel.

25. The light fixture of claim 1 wherein the installed panel system is from a group including a suspended ceiling grid system, a drywall or wood ceiling installation, or a drywall or wood wall installation.

26. The light fixture of claim 1 comprising support features on two transverse sides of the elongate body.

27. The light fixture of claim 1 wherein the lateral support feature is configured in a 9/16" or 15/16" T-bar flat shape.

28. The light fixture of claim 1 wherein the support feature is configured in a T-bar slotted profile shape.

29. The light fixture of claim 1 wherein the support feature is configured with a vertical fin or spine further comprising a slot or aperture.

30. A light fixture of claim 29 configured to attach to T-bar anchor clips of T-bars within a multi T-bar cell array.

31. The light fixture of claim 1 wherein the end plate or end cap is configured to mount onto the support feature of another light fixture of claim 1.

32. The light fixture of claim 1 wherein the support feature is integral to the elongate housing body.

33. The light fixture of claim 1 wherein the support feature is detachably mounted to the elongate housing body.

34. The light fixture of claim 1 wherein the height of the light fixture is less than or equal to the height of a ceiling grid T-bar within the installed panel system.

35. The light fixture of claim 1 wherein the elongate housing body extends longitudinally along a linear longitudinal axis.

36. The light fixture of claim 1 wherein the elongate housing body extends longitudinally along a non-linear radius.

37. The light fixture of claim 1 wherein the elongate housing body is manufactured by a continuous extrusion process and cut to length.

38. The light fixture of claim 1 wherein the primary optical element is manufactured by a continuous extrusion process and cut to length.

39. The light fixture of claim 38 wherein the primary optical element additionally comprises a coextruded region of reflective material on one or more of its edges.

40. The light fixture of claim 39 wherein the region of reflective material is configured in the form of a leg, prong, clip, or other extended edge feature to aid in retaining and aligning the optical element.

41. The light fixture of claim 1 wherein the ends of the primary optical element are cut at a configured angle corresponding to a configured cut angle of the elongate housing body.

42. The light fixture of claim 1 wherein the configured angle cut on one elongate end is not 90 degrees.

43. The light fixture of claim 1 wherein each end of the elongate body is cut at a configured angle that is not 90 degrees.

44. The light fixture of claim 43 mounted in a ceiling grid cell such that its elongate housing body is at an oblique angle to the T-bar of a ceiling grid cell.

45. The light fixture of claim 43 wherein the elongate housing body is substantially triangular.

46. The light fixture of claim 43 mounted in the corner of a ceiling grid cell such that an end plate or end cap rests on a T-bars that are connected within the ceiling grid system.

47. The light fixture of claim 43 wherein the length of each side portion of the elongate housing body has a different length.

48. The light fixture of claim 1 wherein the end plate or end cap comprises a mounting feature configured to attach over the vertical portion of a ceiling grid T-bar.

49. The light fixture of claim 48 wherein the mounting feature is offset from the longitudinal centerline axis to allow two light fixtures of claim 1 to be attached in longitudinal alignment to the same ceiling grid T-bar without mechanical interference.

50. The light fixture of claim 1 wherein the configured angle cut is selected to enable multiple elongate housing bodies to be joined at the configured angle cut and the non-joined ends to be enclosed by one or more end plates or end caps.

51. The light fixture of claim 50 wherein the light fixture is configured as an "L" shape.

52. The light fixture of claim 50 wherein the light fixture is configured as a "V" or "U" shape.

53. The light fixture of claim 50 wherein the light fixture is configured in an "X" shape.

54. The light fixture of claim 1 wherein the end plate or end cap encloses the longitudinal end of multiple elongate housing bodies.

55. The light fixture of claim 54 wherein the multiple elongate housing bodies are in a parallel arrangement.

56. The light fixture of claim 55 wherein the configured angle cut of the longitudinal end of multiple elongate housing bodies is not 90 degrees and the end plate or end cap is mounted non-perpendicular to the elongate housing bodies.

57. The light fixture of claim 56 mounted across a ceiling grid cell of an installed panel system such that the elongate housing bodies are obliquely aligned with ceiling grid T-bars of the ceiling grid cell.

58. A light fixture assembly comprising multiple light fixtures of claim 1 arranged to produce a geometric shape.

59. The light fixture of claim 58 wherein the geometric shape is selected from the group consisting of; a square, rectangle, triangle, rhombus, circle, or oval.

60. The light fixture of claim 58 wherein an electronic controller is attached to one of the light fixtures and supplies power to all of the light fixtures comprising the geometric shape.

61. The light fixture of claim 58 wherein a geometric pattern of concentrically arranged light fixtures are produced.

62. The light fixture of claim 61 wherein differing layers of the concentrically arranged light fixtures have differing light distributions.

63. The light fixture of claim 61 wherein an electronic controller adjusts power to individual concentric layers of light fixtures within the multi-fixture geometric shape to control overall system light distribution.

64. A method of configuring a light fixture for an installed panel system comprising;
a) manufacturing by a continuous extrusion process a primary optical element comprising a bulk light transmissive material with internal or surface light scattering features and further comprising at least one input face and an outer output face;
b) cutting first and second ends of the primary optical element at respective configured angles $\theta_1$ and $\theta_2$ in relation to the axis of extrusion;
c) manufacturing by a continuous extrusion process an elongate housing body comprising;
i) a longitudinally extended 2-dimensional x-y cross-sectional profile shape with two side portions joined by a backplane and collectively defining an internal cavity extended longitudinally in relation to the axis of extrusion;
ii) at least one support feature extending from at least one side portion of the elongate housing body and configured to support and conceal the edge of a panel of the installed panel system;
d) cutting first and second ends of the elongate housing body at respective configured angles $\theta_1$ and $\theta_2$ in relation to the axis of extrusion;
e) Inserting a LED board within the internal cavity of the elongate body housing wherein;
i) the LED board and primary optical element are held and retained in optical alignment by internal support features of the elongate housing body; and wherein
ii) the LED board comprises one or more LEDs mounted and positioned on at least one face of a printed circuit board and further comprising one or more arranged electrical circuits;
f) assembling the light fixture by attaching end plates or end caps at the longitudinal ends of the elongate housing body,
wherein the peak intensity and light distribution from the light fixture are configured by selecting the amount of primary optical element light scattering and by controlling the electrical power distributed to the one or more LEDs via the arranged electrical circuits of at least one LED board.

65. The method of claim 64 wherein lengths of each side portion of the elongate housing body, L1 and L2, are not equal and correspond to the configured cut angles $\theta_1$ and $\theta_2$.

66. The method of claim 64 comprising two or more arranged electrical circuits wherein a ratio of electrical power applied to multiple individual arranged electrical circuits is used to control the degree of asymmetry or symmetry in the light distribution.

67. The method of claim 64 comprising two or more arranged electrical circuits wherein a ratio of electrical power applied to differing arranged electrical circuits is used to create one or more peak intensities or lobes in the light distribution.

68. The method of claim 64 wherein the configured angle cut is selected to enable multiple elongate housing bodies to be joined at the configured angle cut and the non-joined ends to be enclosed by one or more end plates or end caps.

69. The method claim 68 wherein the light fixture is configured as an "L", "V", "U", or "X" shape.

70. The method of claim 64 further comprising the arrangement of multiple light fixtures to produce a geometric shape.

71. The light fixture of claim 70 wherein the geometric shape is selected from the group consisting of; a square, rectangle, triangle, rhombus, circle, or oval.

* * * * *